(12) United States Patent
Oba

(10) Patent No.: US 11,572,085 B2
(45) Date of Patent: Feb. 7, 2023

(54) INFORMATION PROCESSING DEVICE, MOBILE DEVICE, INFORMATION PROCESSING SYSTEM, AND METHOD

(71) Applicant: SONY SEMICONDUCTOR SOLUTIONS CORPORATION, Kanagawa (JP)

(72) Inventor: Eiji Oba, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 157 days.

(21) Appl. No.: 17/046,856

(22) PCT Filed: Mar. 12, 2019

(86) PCT No.: PCT/JP2019/010021
§ 371 (c)(1),
(2) Date: Oct. 12, 2020

(87) PCT Pub. No.: WO2019/202881
PCT Pub. Date: Oct. 24, 2019

(65) Prior Publication Data
US 2021/0370983 A1    Dec. 2, 2021

(30) Foreign Application Priority Data

Apr. 20, 2018 (JP) .............................. JP2018-081283

(51) Int. Cl.
*B60W 60/00* (2020.01)
*B60W 50/16* (2020.01)
(Continued)

(52) U.S. Cl.
CPC ........ *B60W 60/0057* (2020.02); *B60W 50/16* (2013.01); *B60W 60/0053* (2020.02);
(Continued)

(58) Field of Classification Search
None
See application file for complete search history.

(56) References Cited

U.S. PATENT DOCUMENTS

| 5,774,069 A | 6/1998 | Tanaka |
| 2015/0253772 A1 | 9/2015 | Solyom |

(Continued)

FOREIGN PATENT DOCUMENTS

| CN | 105313895 A | 2/2016 |
| CN | 105365823 A | 3/2016 |

(Continued)

OTHER PUBLICATIONS

International Search Report and Written Opinion of PCT Application No. PCT/JP2019/010021, dated Jun. 18, 2019, 09 pages of ISRWO.

*Primary Examiner* — Alan D Hutchinson
*Assistant Examiner* — Andy Schneider
(74) *Attorney, Agent, or Firm* — Chip Law Group

(57) ABSTRACT

To implement a configuration to calculate a manual driving recoverable time required for a driver who is executing automatic driving in order to achieve a requested recovery ratio (RRR) for each road section, and issue a manual driving recovery request notification on the basis of the calculated time. A data processing unit is included, which calculates a manual driving recoverable time required for a driver who is executing automatic driving in order to achieve a predefined requested recovery ratio (RRR) from automatic driving to manual driving and determines notification timing of a manual driving recovery request notification on the basis of the calculated time. The data processing unit acquires the requested recovery ratio (RRR) for each road section set as ancillary information of a local dynamic map (LDM), and calculates the manual driving
(Continued)

recoverable time for each road section scheduled to travel, using learning data for each driver.

20 Claims, 22 Drawing Sheets

(51) Int. Cl.
    *G01C 21/36*     (2006.01)
    *B60W 50/14*     (2020.01)

(52) U.S. Cl.
    CPC ............ *G01C 21/3697* (2013.01); *B60W 2050/143* (2013.01); *B60W 2050/146* (2013.01); *B60W 2540/10* (2013.01); *B60W 2540/12* (2013.01); *B60W 2540/18* (2013.01); *B60W 2540/229* (2020.02)

(56) References Cited

U.S. PATENT DOCUMENTS

| | | |
|---|---|---|
| 2016/0033964 A1 | 2/2016 | Sato et al. |
| 2016/0041553 A1 | 2/2016 | Sato et al. |
| 2017/0075349 A1 | 3/2017 | Sato et al. |
| 2017/0248954 A1 | 8/2017 | Tomatsu |
| 2017/0297587 A1 | 10/2017 | Mimura |
| 2017/0334453 A1 | 11/2017 | Mimura |
| 2017/0364070 A1 | 12/2017 | Oba |
| 2017/0368936 A1 | 12/2017 | Kojima |
| 2018/0329414 A1* | 11/2018 | Igarashi ............ G05D 1/0088 |
| 2019/0056732 A1 | 2/2019 | Aoi et al. |

FOREIGN PATENT DOCUMENTS

| | | |
|---|---|---|
| CN | 107179767 A | 9/2017 |
| CN | 107207013 A | 9/2017 |
| CN | 107499311 A | 12/2017 |
| CN | 107848538 A | 3/2018 |
| CN | 108137062 A | 6/2018 |
| CN | 108349507 A | 7/2018 |
| DE | 112016005314 T5 | 8/2018 |
| EP | 2979914 A2 | 2/2016 |
| EP | 2982565 A2 | 2/2016 |
| EP | 3378722 A1 | 9/2018 |
| JP | 2001023094 A | 1/2001 |
| JP | 2016-034782 A | 3/2016 |
| JP | 2016-038768 A | 3/2016 |
| JP | 2016-090274 A | 5/2016 |
| JP | 2016-139204 A | 8/2016 |
| JP | 2016200472 A | 12/2016 |
| JP | 2016215658 A | 12/2016 |
| JP | 2017-097518 A | 6/2017 |
| JP | 2017123054 A | 7/2017 |
| WO | WO-2016092796 A1 | 6/2016 |
| WO | 2017/085981 A1 | 5/2017 |
| WO | 2017/086079 A1 | 5/2017 |

* cited by examiner

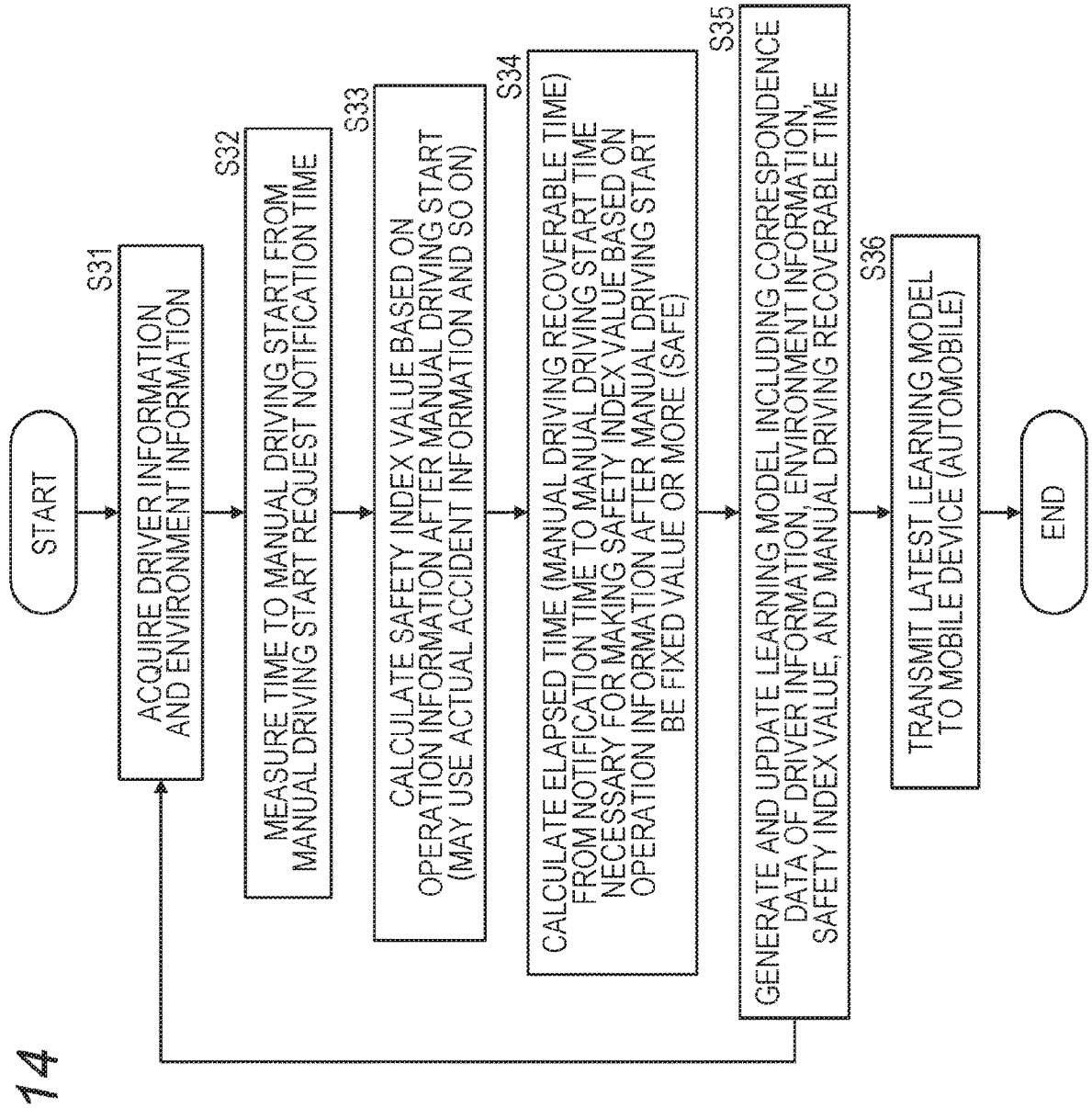

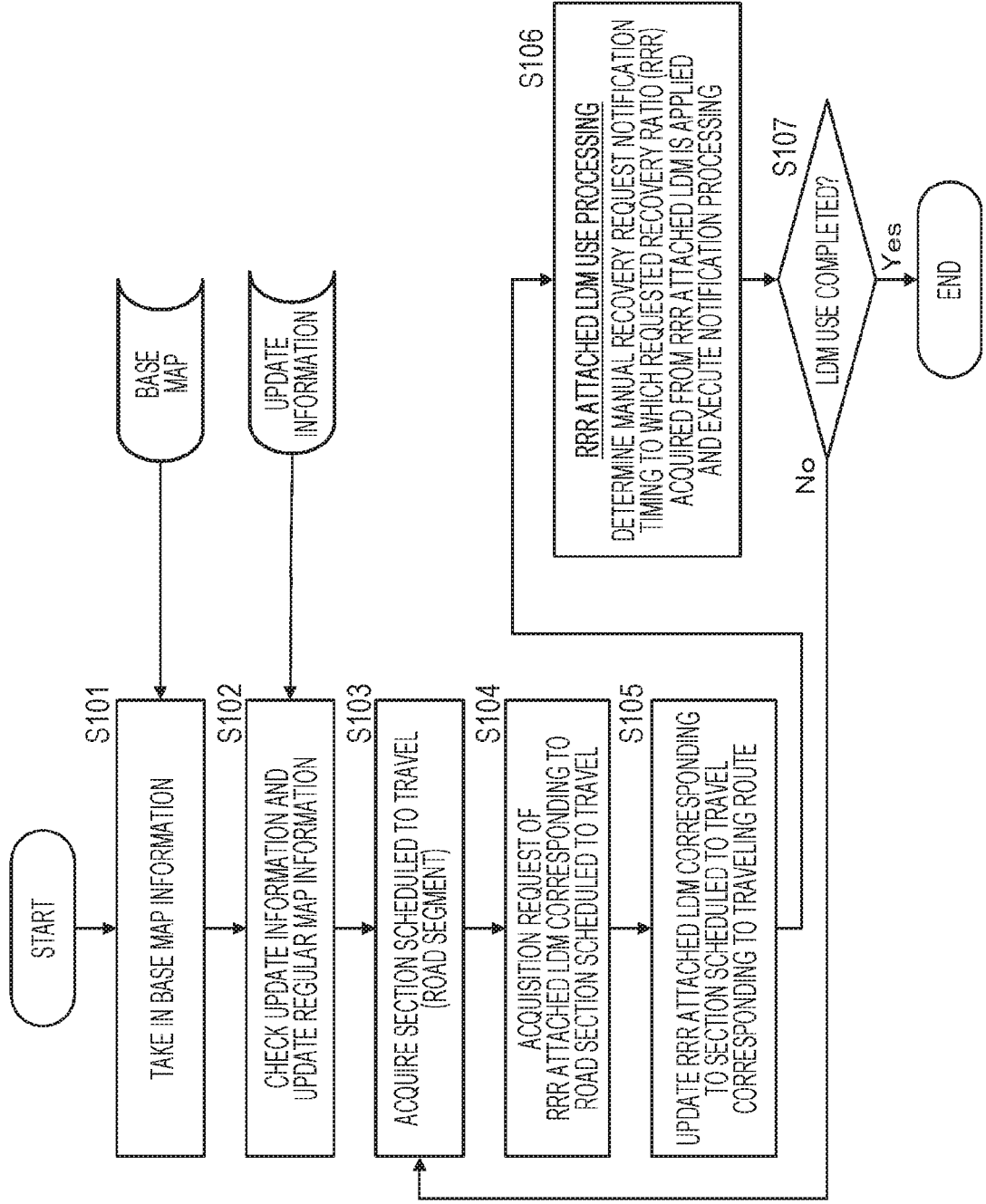

FIG. 21
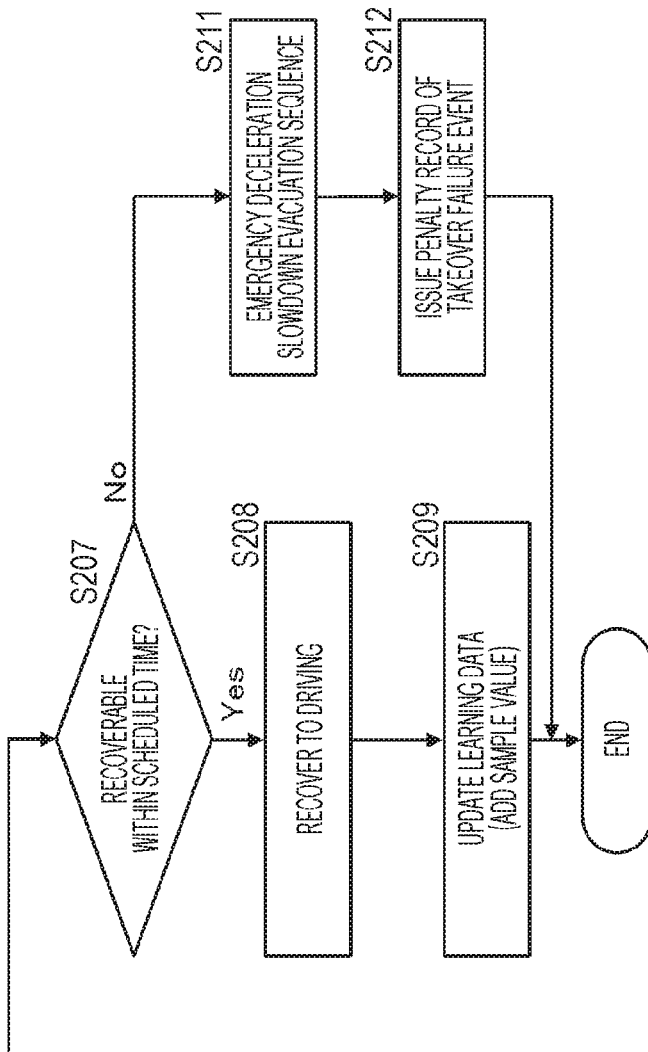
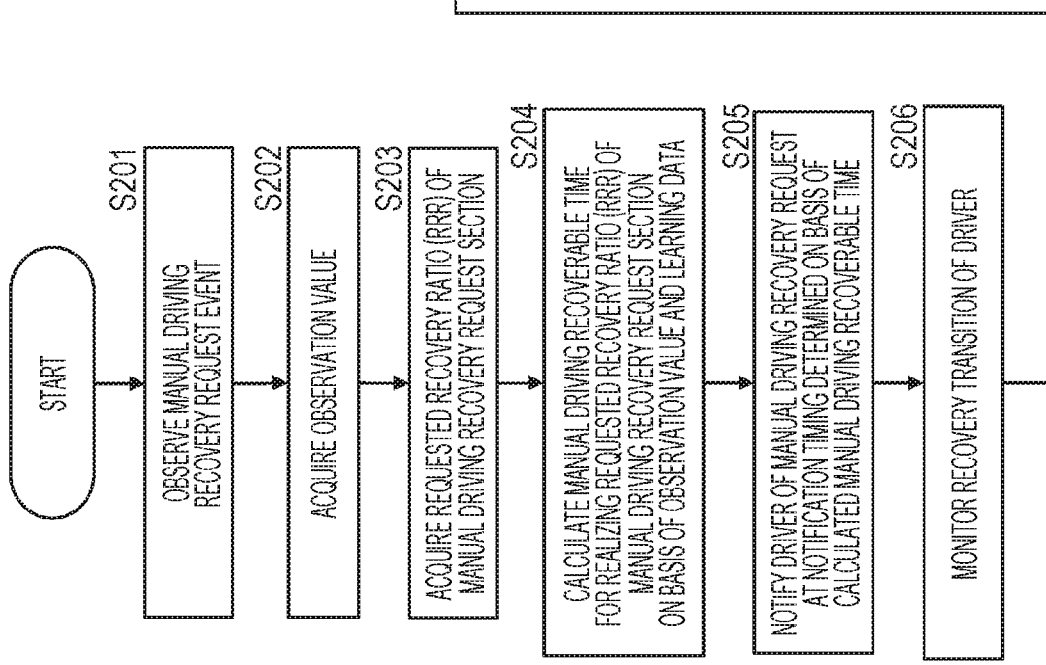

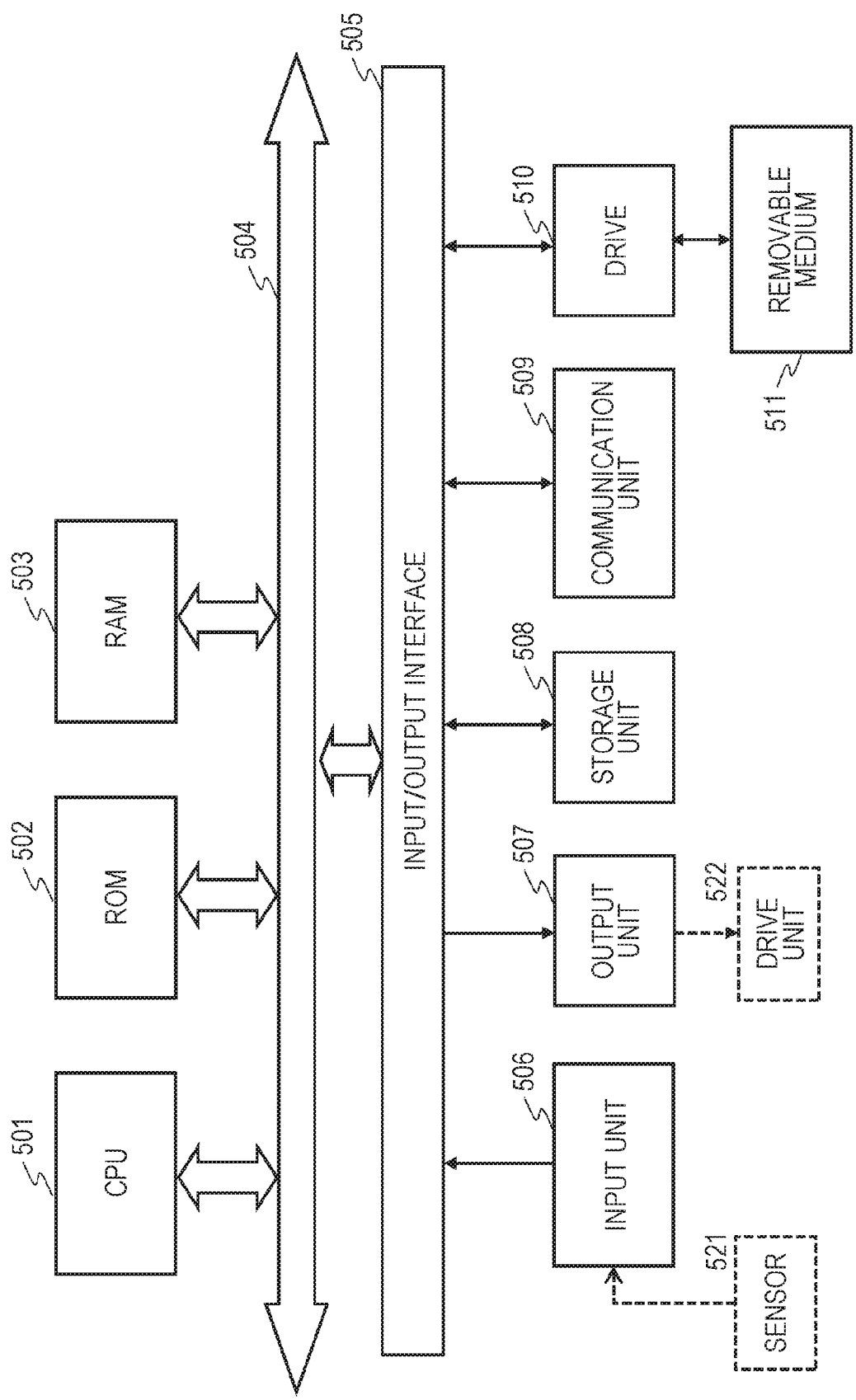

INFORMATION PROCESSING DEVICE, MOBILE DEVICE, INFORMATION PROCESSING SYSTEM, AND METHOD

CROSS REFERENCE TO RELATED APPLICATIONS

This application is a U.S. National Phase of International Patent Application No. PCT/JP2019/010021 filed on Mar. 12, 2019, which claims priority benefit of Japanese Patent Application No. JP 2018-081283 filed in the Japan Patent Office on Apr. 20, 2018. Each of the above-referenced applications is hereby incorporated herein by reference in its entirety.

TECHNICAL FIELD

The present disclosure relates to an information processing device, a mobile device, an information processing system, a method, and a program. More specifically, the present disclosure relates to an information processing device, a mobile device, an information processing system, a method, and a program for performing switching control of automatic driving and manual driving.

BACKGROUND ART

In recent years, for the purpose of improving safety of vehicle traveling, reducing a load on a driver, and the like, automatic steering systems are being developed, which automatically control travel of the vehicle and support the travel without a driver's traveling and steering operation of the vehicle. When the entire travel control of a vehicle becomes able to be automatically performed in the future, a user who is using the vehicle in an automatic drive mode is expected to be free from all the driving and steering operations during the vehicle's automatic driving and is expected to be permitted to execute another secondary task with respect to the steering operation that is an original primary task. However, in the case where the driver who was originally involved in driving completely drops out of a control loop of the vehicle and lefts the control of the vehicle to an automatic drive system of the vehicle, grasp of a surrounding situation, which is essential for the driver's driving, is not performed while the driver is dropping out of the control loop, resulting in complete disconnection of the surrounding situation grasp and recognition, which is necessary for the driver for the driving and steering operation.

If the driver starts automatic steering traveling using a system capable of automatic driving of the vehicle, in a case where the traveling controlled by the system continues or a situation where recovery by the driver is required occurs, the vehicle needs to be safely taken over to the driver because the driver is away from the original primary task operation of recognizing the surrounding environment necessary for steering, but situation grasp and an operation ability required for the driver's traveling are not necessarily recovered within a limited time. That is, once the vehicle automatically enters a traveling state using the automatic steering system, measures that can be taken by the system are limited for the safety of the vehicle thereafter, such as a surrounding event that can be recognized and handled by the automatic steering system being held, the driver normally grasping a road traveling situation instead of the automatic steering system while the system safely functions and taking over the traveling and steering control, or the system suspending the traveling of the vehicle and urgently stopping the vehicle.

In this case, when a situation where the driver does not voluntarily take over the steering control occurs, the system urgently stops the traveling vehicle for safety when the vehicle approaches a section on a traveling route where the driver needs to take over the steering control. However, if a vehicle is urgently stopped or decelerated on a road, it may result in a bottleneck in an allowable traffic volume on the road, which may lead to deterioration of a basic function of social infrastructure, such as congestion, and it cannot be said to be a desirable use mode from the viewpoint of social activities.

In other words, to make the automatic drive system socially available in a wide area and to introduce the automatic drive system without negatively affecting basic functions of society, it can be said that the system is required to have a function that enables the driver to almost reliably and accurately recover to control in a vehicle that is started for traveling in the automatic driving state by the driver.

The automatic driving system cannot return the control of the vehicle to the driver unless the system can determine driver's ability to recover to driving as to whether or not the control of the vehicle can be safely taken over to the driver. Therefore, a use mode in which the automatic driving is completely used in a closed space is considered to be one use. Meanwhile, an advantage of a car is that the car can freely move from an arbitrary point to any different point. If the automatic driving is introduced in such a use mode, the driver needs to recover from the automatic driving in a case where there is a section that cannot be passed by the automatic driving. Even if the vehicle is pulled over to a shoulder to a road or the like in a case where the driver has a difficulty in recovering, and it may lead to a traffic congestion, as described above.

In fact, even if the automatic driving is introduced in the social infrastructure where general vehicles travel, a state in which a section requiring the driver to intervene and a section where the automatic driving is available are alternately mixed is assumed as the road infrastructure for the time being from the perspective of infrastructure investment that the society allows. In particular in an initial introduction period, an introduction mode where the sections alternately appear in patches throughout an itinerary section is assumed. Therefore, to enable the driver to favorably execute the secondary task when the driver using a vehicle capable of automatic driving, a driving recovery notification needs to be given to the driver at appropriate timing.

For example, Patent Document 1 discloses a technology of displaying danger levels for a plurality of dangers on a road on which a driver's own vehicle is planned to travel. Furthermore, for example, Patent Document 2 discloses a technology of displaying and notifying the driver who is focusing on a mobile terminal that the driver is in a situation to start manual driving on a screen of the mobile terminal in the case of causing the driver to start manual driving during automatic driving. These known technologies are uniform notification methods for known predetermined points that can be acquired in advance as map information as a travel environment.

CITATION LIST

Patent Document

Patent Document 1: Japanese Patent Application Laid-Open No. 2016-139204

Patent Document 2: Japanese Patent Application Laid-Open No. 2016-090274

SUMMARY OF THE INVENTION

Problems to be Solved by the Invention

There is an increasing momentum for using automatic driving of vehicles in a real world space with vehicle surrounding environment recognition technologies for automatic driving have been matured, and introduction of a so-called local dynamic map (LDM) in which traveling map information of roads where vehicles travel is updated with high density and on a constant basis. Certainly, with these experimental technical advances of today, numerous experiments show that technologies for allowing vehicles to automatically drive on ordinary roads are already present and traveling itself of the vehicles is possible.

One of the technologies supporting traveling of automatic driving vehicles in urban areas and highways is the local dynamic map (LDM). Provision of a local dynamic map (LDM) is sought, which is configured by an information group of a plurality of hierarchical layers and which provides information such as surrounding pedestrians, classifications, and predicted moving directions, by using original map information generated on the basis of maps and the like by Geographical Survey Institute, which are updated in the medium to long term, and further, fixed map information periodically updated and corrected on the basis of the original map information, for route planning and route navigation, and further using high-density live information such as layer information of fixed environment reference infrastructure with actual driving, and road restriction information such as road related signs and traffic lights, for example. However, simply constantly providing the LDM map information to a vehicle capable of controlling automatic driving does not guarantee traveling in all sections of an itinerary by the automatic driving. Furthermore, there are some cases where the information cannot be timely updated as the LDM, and the driver may be required to recover to driving and steering on the basis of an actual situation that cannot be obtained from the LDM.

The LDM does not guarantee the traveling by the automatic driving relying on the information for the entire process of the itinerary, like a track of a railroad vehicle. Then, a defect may occur in the constant update of all the time and temporary data obsolescence may occur. Moreover, there are some cases where the vehicles cannot travel in the automatic driving mode due to unexpected events such as falling objects, earthquakes, or fog even if the LDM information is provided. Furthermore, even if it is not an extreme case and even in a case of organizing an itinerary of automatic driving, which is determined by arbitrary two points using the today's technologies, there may be a section where the automatic driving is possible, a section where safe traveling and passage is difficult if the driver does not watch the automatic travel control, and a section where the automatic driving cannot handle an event that may occur and manual driving is essential to pass through safely.

Therefore, when the driver moves between other points using the vehicle, an operation to take over the driving from the automatic driving to the manual driving occurs a plurality of times in the middle of the movement. Here, when the use of automatic driving is widespread, users begin to execute secondary tasks that are separated from their thinking and consciousness on driving and steering, and are one of benefits of the automatic driving. In that case, when the system prompts the driver to recover, and the driver actually suspends the execution and concentration of consciousness on the secondary task and recovers to driving and steering, a delay occurs from the notification to the recovery, and the delay greatly changes depending on the content of the secondary task being executed and a deviation state of the driver's consciousness from the steering at that time. As a result, even if the system notifies the driver of the request to recover from the automatic driving to the manual driving for the above reason, the driver does not recover in a fixed time, and a certain temporal distribution determined according to a situation judgment and recognition ability required for driving, the consciousness deviation level by the secondary task, and the like is exhibited. Due to the reaction time distribution, there are cases where the reaction is quick and cases where it takes time.

Then, another problem arises in the handling time distribution from the recovery notification. When the system always repeatedly executes an early notification regardless of the driving state, the user gets accustomed to the extremely early notification from recovery required timing. Then, recognition of the need for early recovery of the notification gradually fades, and if the early notification is repeatedly issued even if it is not always the case, the driver unknowingly regards the notification as unnecessary noise, and the consciousness of importance decreases. Furthermore, the driver consciously reduce a notification sound or sound filtering unknowingly progresses for the notification sound because the driver bothers the notification too much.

In other words, the vehicle control system that cannot perform driver recovery timing notification according to an exact situation affects behavioral characteristics of the user and produces a risk accidentally causes the driver not to recover at required timing.

Furthermore, when focusing on a road infrastructure, it is desirable to set a "traveling under caution section" in which traveling under driver's predetermined caution is required before entering a "manual driving section" in which the manual driving is required from an "automatic driving section" in which the automatic driving is allowed for an automatically driving vehicle, and 100% of drivers desirably recover to the manual driving within a travel period of the "traveling under caution section".

However, 100% recovery cannot be expected depending on the content of the secondary task, which is an operation other than driving and steering performed by the driver in the "automatic driving section". Therefore, instead, when the driver of the vehicle traveling in the automatic driving mode fails to recover, measures such as deceleration of the vehicle, emergency deceleration and slow down, slow evacuation, pulling over to the shoulder, and the like, while the automatic drive system controls the vehicle, are proposed.

From the perspective of ensuring the safety of traveling of the vehicle itself, it can be said that these are very natural measures and proper control. However, when the vehicle stops on a main road, which can be an arterial route for social activities, and if this emergency stop occurs on a main route where bypass does not work, it paralyzes higher-level activities as social activities and incurs induction of major social issues.

Therefore, it is necessary to minimize the load on the road infrastructure, taking into account human behavioral characteristics and considering the harmful effects of long-term use. To implement it, a mechanism to enable the driver of the vehicle during the automatic driving to promptly recover to the manual driving at a high success rate is necessary when the driver is required to recover to the manual driving, and a new mechanism to issue a recovery notification at recovery timing according to road conditions and to produce a cycle in which the user can start a recovery operation at more accurate timing is necessary.

The present disclosure has been made in view of the above-described problems, for example, and an object of the present disclosure is to provide an information processing device, a mobile device, an information processing system, a method, and a program that implement a mechanism for enabling a driver of a vehicle during automatic driving to promptly recover to manual driving at a success ratio according to a requested recovery ratio (RRR) in the case where the driver is required to recover to the manual driving.

Solutions to Problems

The first aspect of the present disclosure resides in an information processing device including:

a data processing unit configured to calculate a manual driving recoverable time required for a driver who is executing automatic driving in order to achieve a predefined requested recovery ratio (RRR) from automatic driving to manual driving and determine notification timing of a manual driving recovery request notification on the basis of the calculated time.

Moreover, the second aspect of the present disclosure resides in an information processing device as a server that provides a local dynamic map (LDM) to a mobile device, the information processing device including:

an RRR information attached LDM generation and update unit configured to generate and update a requested recovery ratio (RRR) attached local dynamic map (LDM) in which a requested recovery ratio (RRR) from automatic driving to manual driving is set for each road section.

Moreover, the third aspect of the present disclosure resides in a mobile device including:

a driver information acquisition unit configured to acquire driver information of the mobile device;

an environment information acquisition unit configured to acquire requested recovery ratio (RRR) attached local dynamic map (LDM) in which a requested recovery ratio (RRR) from automatic driving to manual driving is set for each road section; and a data processing unit configured to calculate a manual driving recoverable time required by a driver who is executing automatic driving in order to achieve the requested recovery ratio (RRR) and determine notification timing of a manual driving recovery request notification on the basis of the calculated time.

Moreover, the fourth aspect of the present disclosure resides in an information processing system including a server and a mobile device, in which the server is a server that provides a local dynamic map (LDM) to the mobile device, and generates and updates a requested recovery ratio (RRR) attached local dynamic map (LDM) in which a requested recovery ratio (RRR) from automatic driving to manual driving is set for each road section, and transmits the requested recovery ratio (RRR) attached local dynamic map (LDM) to the mobile device, and the mobile device calculates a manual driving recoverable time required for a driver who is executing the automatic driving in order to achieve the requested recovery ratio (RRR) recorded in the requested recovery ratio (RRR) attached local dynamic map (LDM) received from the server, and determines notification timing of a manual driving recovery request notification on the basis of the calculated time.

Moreover, the fifth aspect of the present disclosure resides in an information processing method executed in an information processing device, the information processing method including by a data processing unit, calculating a manual driving recoverable time required for a driver who is executing automatic driving in order to achieve a predefined requested recovery ratio (RRR) from automatic driving to manual driving and determining notification timing of a manual driving recovery request notification on the basis of the calculated time.

Moreover, the sixth aspect of the present disclosure resides in a program for causing an information processing device to execute information processing including causing a data processing unit to calculate a manual driving recoverable time required for a driver who is executing automatic driving in order to achieve a predefined requested recovery ratio (RRR) from automatic driving to manual driving and determine notification timing of a manual driving recovery request notification on the basis of the calculated time.

Note that the program according to the present disclosure is, for example, a program that can be provided by a storage medium or a communication medium provided in a computer readable format to an information processing device or a computer system that can execute various program codes. By providing such a program in the computer readable format, processing according to the program is implemented on the information processing device or the computer system.

Still other objects, features, and advantages of the present disclosure will become clear from more detailed description based on examples and attached drawings of the present disclosure to be described below. Note that a system in the present specification is a logical aggregate configuration of a plurality of devices, and is not limited to devices having respective configurations within the same housing.

Effect of the Invention

According to a configuration of an embodiment of the present disclosure, a configuration to calculate a manual driving recoverable time required for a driver who is executing automatic driving in order to achieve a requested recovery ratio (RRR) for each road section, and issue a manual driving recovery request notification on the basis of the calculated time is implemented.

Specifically, for example, included is a data processing unit configured to calculate a manual driving recoverable time required for a driver who is executing automatic driving in order to achieve a predefined requested recovery ratio (RRR) from automatic driving to manual driving and determine notification timing of a manual driving recovery request notification on the basis of the calculated time. The data processing unit acquires the requested recovery ratio (RRR) for each road section set as ancillary information of a local dynamic map (LDM), and calculates the manual driving recoverable time for each road section scheduled to travel, using learning data for each driver.

With the present configuration, the configuration to calculate a manual driving recoverable time required for a driver who is executing automatic driving in order to achieve a requested recovery ratio (RRR) for each road section, and issue a manual driving recovery request notification on the basis of the calculated time is implemented.

Note that the effects described in the present specification are merely examples and are not limited, and additional effects may be exhibited.

BRIEF DESCRIPTION OF DRAWINGS

FIG. 13 is a diagram for describing a communication configuration example and processing between the LDM event method provision server and the mobile device and the like.

FIG. 14 is a diagram illustrating a flowchart for describing a sequence example of learning processing.

FIG. 20 is a diagram illustrating a flowchart for describing a processing sequence of acquiring and using a local dynamic map (LDM) and a requested recovery ratio (RRR).

FIG. 21 is a diagram illustrating a flowchart for describing an example of a sequence of processing executed when switching the automatic driving mode to the manual driving mode.

FIG. 22 is a diagram for describing a hardware configuration example of an information processing device.

MODE FOR CARRYING OUT THE INVENTION

Hereinafter, an information processing device, a mobile device, an information processing system, a method, and a program of the present disclosure will be described in detail with reference to the drawings. Note that the description will be given according to the following items.

1. Outline of Local Dynamic Map (LDM) and Configuration of Present Disclosure
2. Outline of Configurations and Processing of Mobile Device and Information Processing Device
3. Specific Configuration and Processing Example of Mobile Device
4. Mode Switching Sequence from Automatic Driving Mode to Manual Driving Mode
5. Operation Sequence Example of Automatic Driving
6. Safety Determination Processing and Manual Driving Recoverable Time Estimation Processing Executed by Mobile Device
7. Information Processing Sequence Executed by Mobile Device, Information Processing Device, or Server of Present Disclosure
8. Sequence of Processing of Acquiring and Using Local Dynamic Map (LDM) and Requested Recovery Ratio (RRR)
9. Sequence of Manual Driving Recovery Notification Processing Using Requested Recovery Ratio (RRR)
10. Configuration Example of Information Processing Device
11. Conclusion of Configurations of Present Disclosure

[1. Outline of Local Dynamic Map (LDM) and Configuration of Present Disclosure]

First, an outline of a local dynamic map (LDM) will be described with reference to FIG. 1 and the subsequent drawings. A local dynamic map (LDM) is one of information required for automatic driving.

Figure 1:
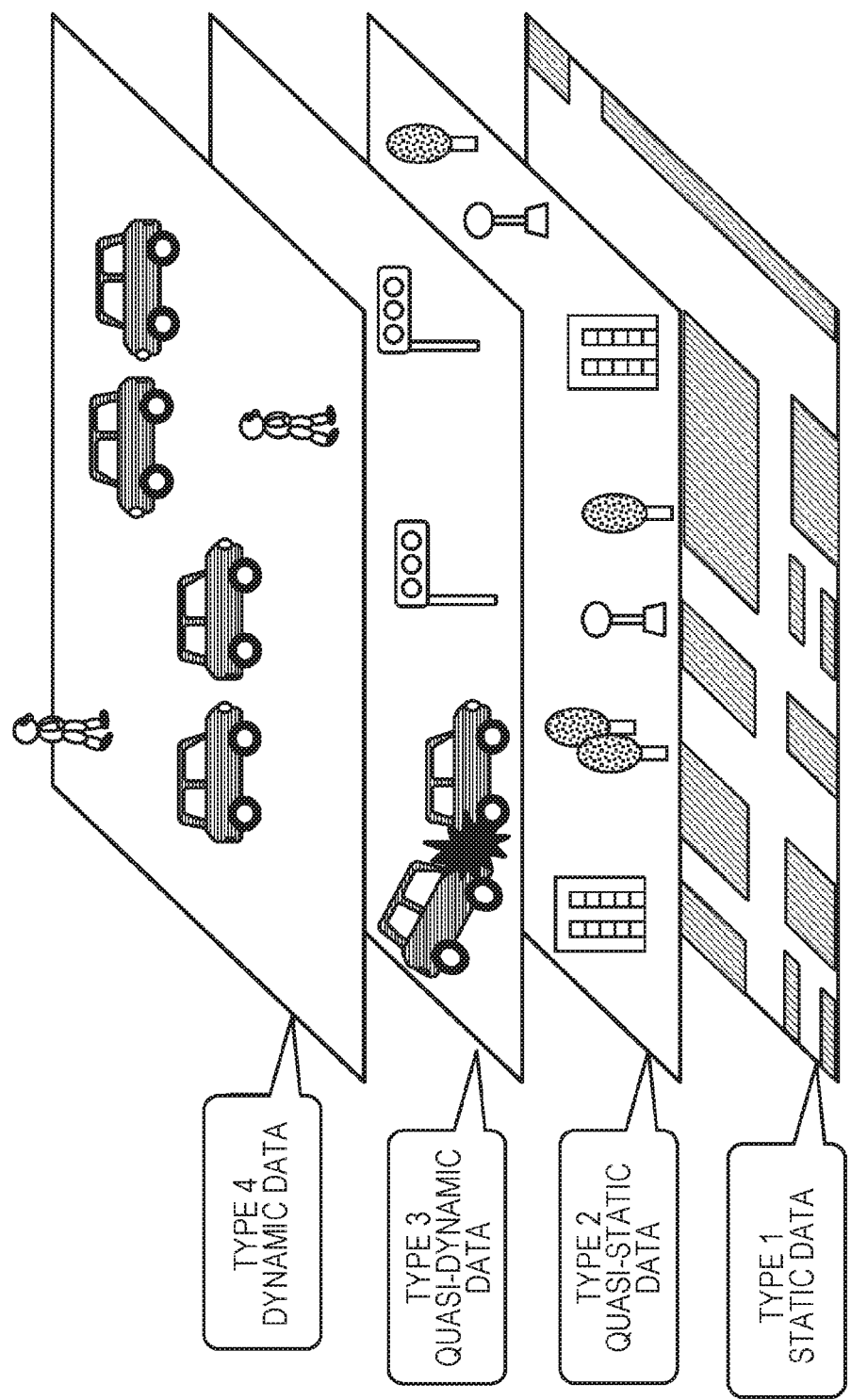
FIG. 1 is a diagram illustrating an outline of a local dynamic map (LDM).

As illustrated in FIG. 1, the LDM is configured by an information group of a plurality types of hierarchical layers. That is, the LDM includes the following four types of information:

Type 1=static data;
Type 2=quasi-static data;
Type 3=quasi-dynamic data; and
Type 4=dynamic data.

Type 1=static data includes data of map information and the like generated on the basis of maps and the like by Geographical Survey Institute, which are updated in the medium to long term, for example.

Type 2=quasi-static data includes data that changes in the long term although no big change in the short term, such as structures such as buildings, trees, and signs, for example.

Type 3=quasi-dynamic data includes data that can change in a certain time unit, such as traffic lights, traffic jams, and accidents.

Type 4=dynamic data includes data such as traffic information of vehicles, people, and the like, and which sequentially changes.

The local dynamic map (LDM) including these data is transmitted from a server to each automobile, for example, and the automobile analyzes and uses the LDM for control of the automatic driving such as setting a traveling route, and controlling traveling speed and lane.

Note that the server continuously executes local dynamic map (LDM) update processing based on update information, and each automobile acquires the latest information from the server and use the information at the time of using the LDM.

However, in the present situation, a section where an automatically driving vehicle can travel with automatic driving using the LDM information is limited to, for example, part of highway, and there are many sections where the manual driving by the driver is required. Furthermore, information of the current LDM may not be timely updated, and in such a case, the manual driving by the driver is required.

As described above, in the case of using a current infrastructure, the driver who performs the automatic driving by the automatically driving vehicle is required to recover to the manual driving from the automatic driving at various timings or points.

However, there are many cases where the driver is in a low arousal level state where the driver falls asleep, for example, that is, in a low consciousness level state. Even if the driver is requested to recover to the manual driving in such a state, there is a high possibility of failure in recovery. The recovery unsuccessful vehicle can take measures such as an emergency stop in an evacuation space beside a road. However, if a large number of recovery unsuccessful vehicles occurs, the evacuation space may become insufficient.

The configuration of the present disclosure described below solves such a problem. In the configuration of the present disclosure, a requested recovery ratio (RRR) that is a target success ratio for recovery from the automatic driving to the manual driving is set for each road section. Moreover, timing of a recovery request notification to the manual driving for the automatically driving vehicle is controlled according to the requested recovery ratio (RRR) for each road section.

For example, in a road section with a high requested recovery ratio (RRR), the timing of the recovery request notification to the manual driving for the automatically driving vehicle is set earlier than a road section with a low requested recovery ratio (RRR). By the control, the recovery ratio to the manual driving can approximate the requested value in the road section with a high requested recovery ratio (RRR).

Note that the requested recovery ratio (RRR) is information that sequentially changes according to the road conditions, and the requested recovery ratio (RRR) is set as configuration information of the local dynamic map (LDM), for example. That is, a local dynamic map (LDM) provision server generates and transmits the local dynamic map (LDM) including the sequentially updated requested recovery ratio (RRR) to the automatically driving vehicle. Each automatically driving vehicle controls notification timing of the recovery request from the automatic driving to the manual driving according to the requested recovery ratio (RRR) included in the LDM. Hereinafter, details of configurations and processing of the present disclosure will be described.

[2. Outline of Configurations and Processing of Mobile Device and Information Processing Device]

An outline of configurations and processing of a mobile device and an information processing device will be described with reference to FIG. 2 and the subsequent drawings.

The mobile device of the present disclosure is an automobile capable of traveling while switching the automatic driving and the manual driving, for example.

In such an automobile, in a case where necessity to switch the automatic driving mode to the manual driving mode occurs, it is necessary to cause a driver to start the manual driving.

However, there are various types of processing (secondary tasks) performed by the driver during execution of the automatic driving.

For example, there are a case where the driver is looking at the front of the vehicle while the driver is merely releasing a steering wheel, similarly to the case of driving, a case where the driver is reading a book, and a case where the driver falls asleep.

The arousal level (consciousness level) of the driver varies depending on the difference in these types of processing.

For example, falling asleep reduces the driver's arousal level. That is, the consciousness level is lowered. In such a state where the arousal level is lowered, normal manual driving cannot be performed, and if the mode is switched to the manual driving mode in the state, an accident may occur in the worst case.

To secure the safety of driving, it is necessary to cause the driver to start the manual driving in a state where the driver's arousal level is high, that is, in a state where the driver is clearly conscious.

Therefore, it is necessary to change the notification timing for requesting switching from the automatic driving to the manual driving according to the arousal level of the driver who is executing the automatic driving.

For example, in a case where the driver looks forward and is looking at the road while executing the automatic driving, the driver's arousal level is high, that is, the driver can start the manual driving at any time.

In such a case, notification for switching to the manual driving is simply issued immediately before the time when the manual driving is required. This is because the driver can immediately start safe manual driving.

However, in a case where the driver falls asleep during execution of the automatic driving, the driver's arousal level is extremely low.

In such a case, if the notification for switching to the manual driving is provided at timing immediately before the time when the manual driving is required, the driver is forced to start the manual driving in the state where consciousness is unclear. As a result, the possibility of causing an accident increases. Therefore, in the case where the arousal level is low, as described above, it is necessary to issue notification of the switching to the manual driving at an earlier stage.

As described above, at present, the infrastructure for enabling automatic driving in all of traveling sections has not been constructed. There are sections where the driver's manual driving is required, and the driver is required to recover to the manual driving from the automatic driving at various timings and points.

However, when the driver is in the state where the arousal level is lowered by falling asleep or the like at the time of executing the automatic driving, the possibility of failure in recovery is high even if the driver is required to recover to the manual driving. The recovery unsuccessful vehicle is forced to take measures such as emergency stop, but occurrence of a large number of such vehicles causes traffic congestion and accidents.

To solve such problems, in the configuration of the present disclosure, the requested recovery ratio (RRR) that is a target success ratio for recovery from the automatic driving to the manual driving is set for each road section, and the timing of the recovery request notification to the manual driving for the automatically driving vehicle is controlled according to the requested recovery ratio (RRR).

Configurations and processing of the mobile device and an information processing device mountable to the mobile device of the present disclosure will be described with reference to FIG. 2 and the subsequent drawings.

Figure 2:
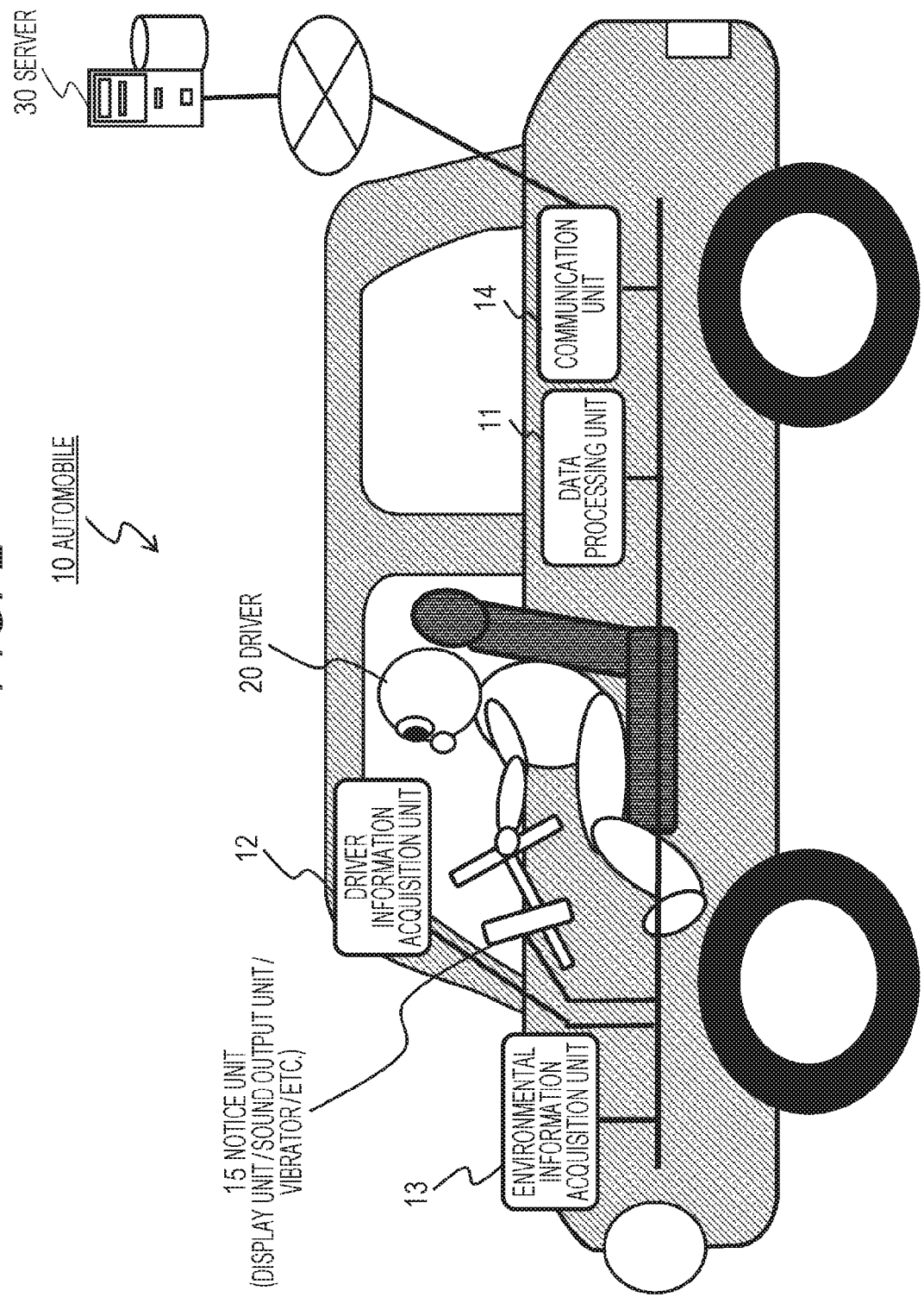
FIG. 2 is a diagram for describing a configuration example of a mobile device of the present disclosure.

FIG. 2 is a diagram illustrating a configuration example of an automobile 10 that is an example of the mobile device of the present disclosure.

An information processing device of the present disclosure is mounted to the automobile 10 illustrated in FIG. 2.

The automobile 10 illustrated in FIG. 2 is an automobile capable of driving in two driving modes of the manual driving mode and the automatic driving mode.

In the manual driving mode, traveling based on an operation of a driver 20, that is, an operation of a steering wheel (steering), an operation of an accelerator, a brake, or the like is performed.

Meanwhile, in the automatic driving mode, the operation by the driver 20 is unnecessary, and driving based on sensor information such as a position sensor and other ambient information detection sensors is performed.

The position sensor is, for example, a GPS receiver or the like, and the ambient information detection sensor is, for example, a camera, an ultrasonic sensor, a radar, a light detection and ranging or a laser imaging detection and ranging (LiDAR), a sonar, or the like.

Note that FIG. 2 is a diagram for describing an outline of the present disclosure and schematically illustrates main configuration elements. Detailed configurations will be described below.

As illustrated in FIG. 2, the automobile 10 includes a data processing unit 11, a driver information acquisition unit 12, an environment information acquisition unit 13, a communication unit 14, and a notification unit 15.

The driver information acquisition unit 12 acquires, for example, information for determining the arousal level of the driver, such as biometric information of the driver, and operation information of the driver. Specifically, for example, the driver information acquisition unit 12 includes a camera that captures a face image of the driver, a sensor that acquires motions of eyeballs and pupils or the like, a measurement sensor for temperature or the like, and an operation information acquisition unit for the operation units (steering wheel, accelerator, brake, and the like), and the like.

The environment information acquisition unit 13 acquires traveling environment information of the automobile 10. Examples of the traveling environment information include image information of the front, rear, right, and left of the automobile, position information by the GPS, and surrounding obstacle information from the radar, the light detection and ranging or the laser imaging detection and ranging (LiDAR), the sonar, or the like.

The data processing unit 11 receives the driver information acquired by the driver information acquisition unit 12 and the environment information acquired by the environment information acquisition unit 13 as inputs, and calculates safety index values indicating whether or not the driver in the automatic driving vehicle is in a safe manual driving executable state, and moreover, whether or not the driver in the manual driving is executing safe driving, for example.

Moreover, for example, in the case where necessity of switching from the automatic driving mode to the manual driving mode arises, the data processing unit 11 executes processing of issuing notification for switching to the manual driving mode via the notification unit 15.

This notification processing timing is optimum timing calculated using the inputs from the driver information acquisition unit 12 and the environment information acquisition unit 13, for example.

That is, it is the timing when the driver 20 can start safe manual driving.

Specifically, in the case where the arousal level of the driver is high, the notification is issued immediately before the manual driving start time, for example, five seconds before. In the case where the arousal level of the driver is low, the notification is issued twenty seconds before the manual driving start time with a margin, for example. Specific calculation of the optimum timing for the notification will be described below.

The notification unit 15 includes a display unit that displays the notification, a sound output unit, a handle, or a vibrator of a seat. An example of warning display displayed on the display unit constituting the notification unit 15 is illustrated in FIG. 3.

Figure 3:
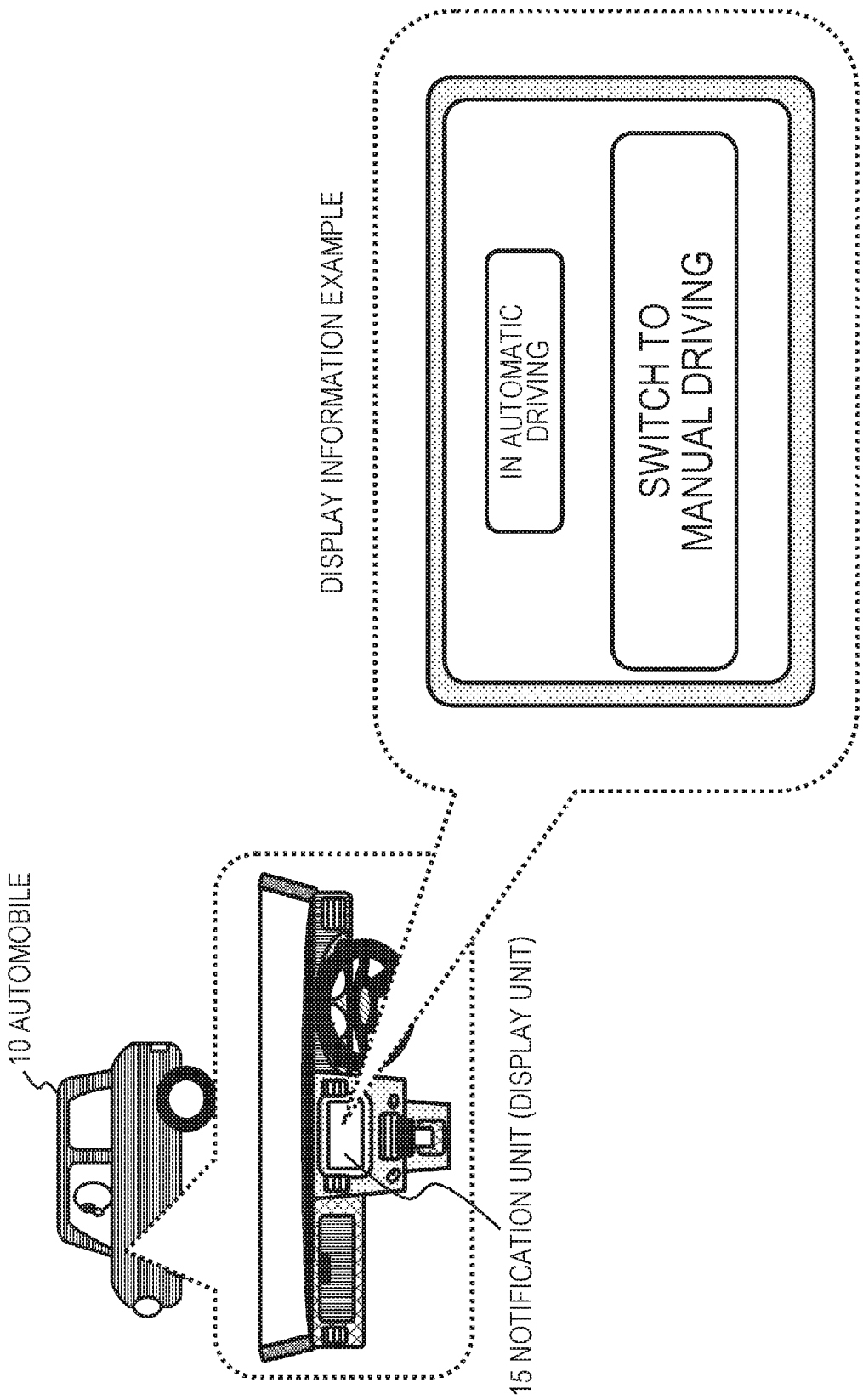
FIG. 3 is a diagram for describing an example of data displayed on a display unit of the mobile device of the present disclosure.

As illustrated in FIG. 3, the notification unit (display unit) 15 displays the following items.

Driving mode information="In automatic driving",

Warning display="Please switch driving to manual driving"

"In automatic driving" is displayed at the time of executing the automatic driving mode, and "In manual driving" is displayed at the time of executing the manual driving mode, in a display area of the driving mode information.

The display area of the warning display information is a display area where the following item is displayed while the automatic driving is executed in the automatic driving mode.

"Please switch driving to manual driving"

Note that the automobile 10 has a configuration capable of communicating with a server 30 via the communication unit 14, as illustrated in FIG. 2.

For example, part of processing of calculating appropriate time of a notification output in the data processing unit 11 can be performed by the server 30.

A specific example of the processing will be described below.

Figure 4A:
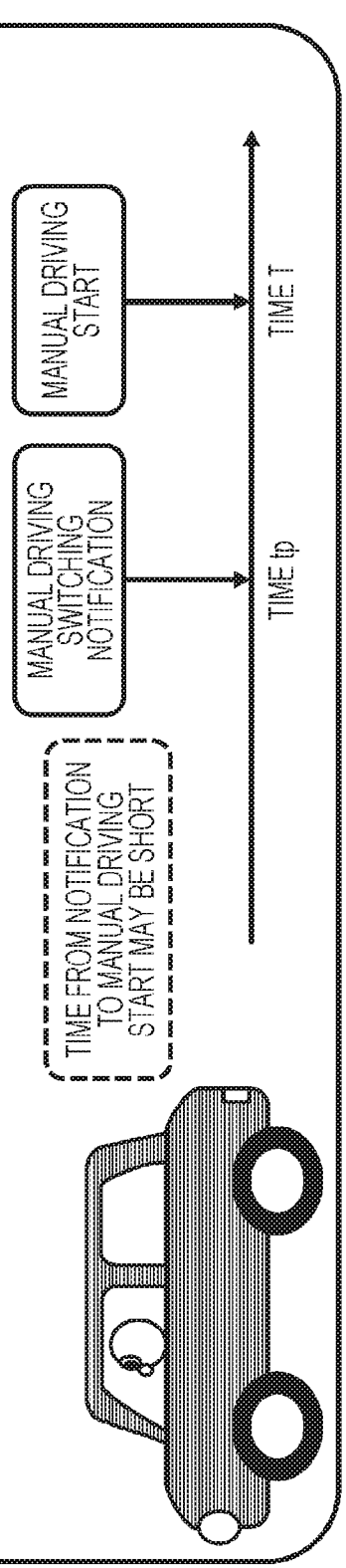
FIGS. 4A and 4B are diagrams illustrating processing executed by the mobile device of the present disclosure.
Figure 4B:
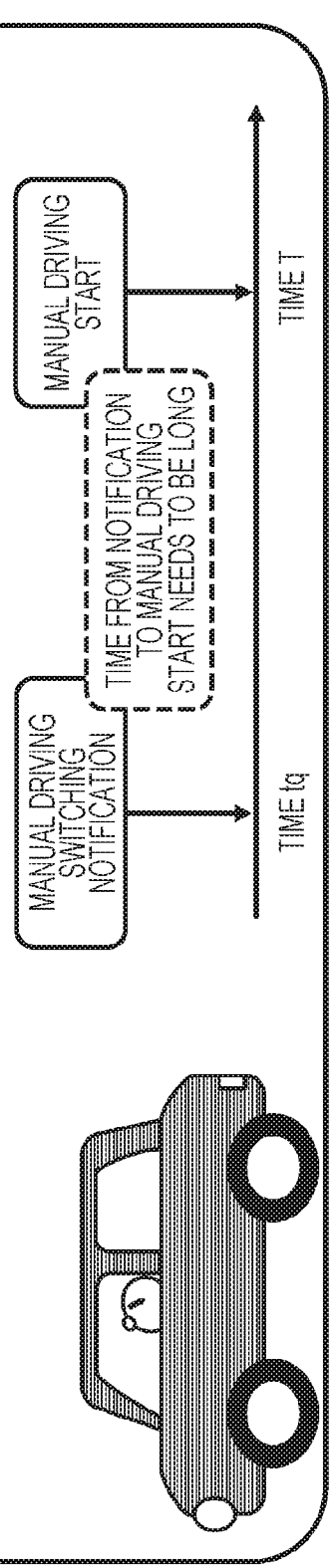

FIGS. 4A and 4B are diagrams illustrating a specific example of processing executed by the mobile device and the information processing device of the present disclosure.

FIGS. 4A and 4B are diagrams illustrating a setting example of appropriate timing of the notification for requesting switching to the manual driving while the automatic driving is executed in the automatic driving mode, and illustrates the following two notification processing examples.

FIG. 4A, Notification processing in the case where the driver's arousal level during the automatic driving is high FIG. 4B, Notification processing in the case where the driver's arousal level during the automatic driving is low FIG. 4A is an example in which the driver is looking at the road in front while executing the automatic driving. In this case, the driver's arousal level is high, that is, the user can start the manual driving at any time.

In such a case, even if the notification for switching to the manual driving is issued at timing immediately before the time when the manual driving is required, the driver can start safe manual driving soon.

FIG. 4B is an example in which the driver's arousal level is extremely low in a case where the driver falls asleep while executing the automatic driving.

In such a case, if the notification for switching to the manual driving is issued at timing immediately before the time when the manual driving is required, the driver starts the manual driving in the state where consciousness is unclear, and there is a high possibility of causing an accident. Therefore, in the case where the arousal level is low, as described above, it is necessary to issue the notification of the switching to the manual driving at an earlier stage.

Moreover, in the configuration of the present disclosure, the requested recovery ratio (RRR) that is a target success ratio for recovery from the automatic driving to the manual driving is set for each road section, and the timing of the recovery request notification to the manual driving for the automatic driving vehicle is controlled according to the requested recovery ratio (RRR). A specific control example will be described below.

[3. Specific Configuration and Processing Example of Mobile Device]

Next, a specific configuration and a processing example of the mobile device corresponding to the automobile 10 of the present disclosure will be described with reference to FIG. 5 and the subsequent drawings.

Figure 5:
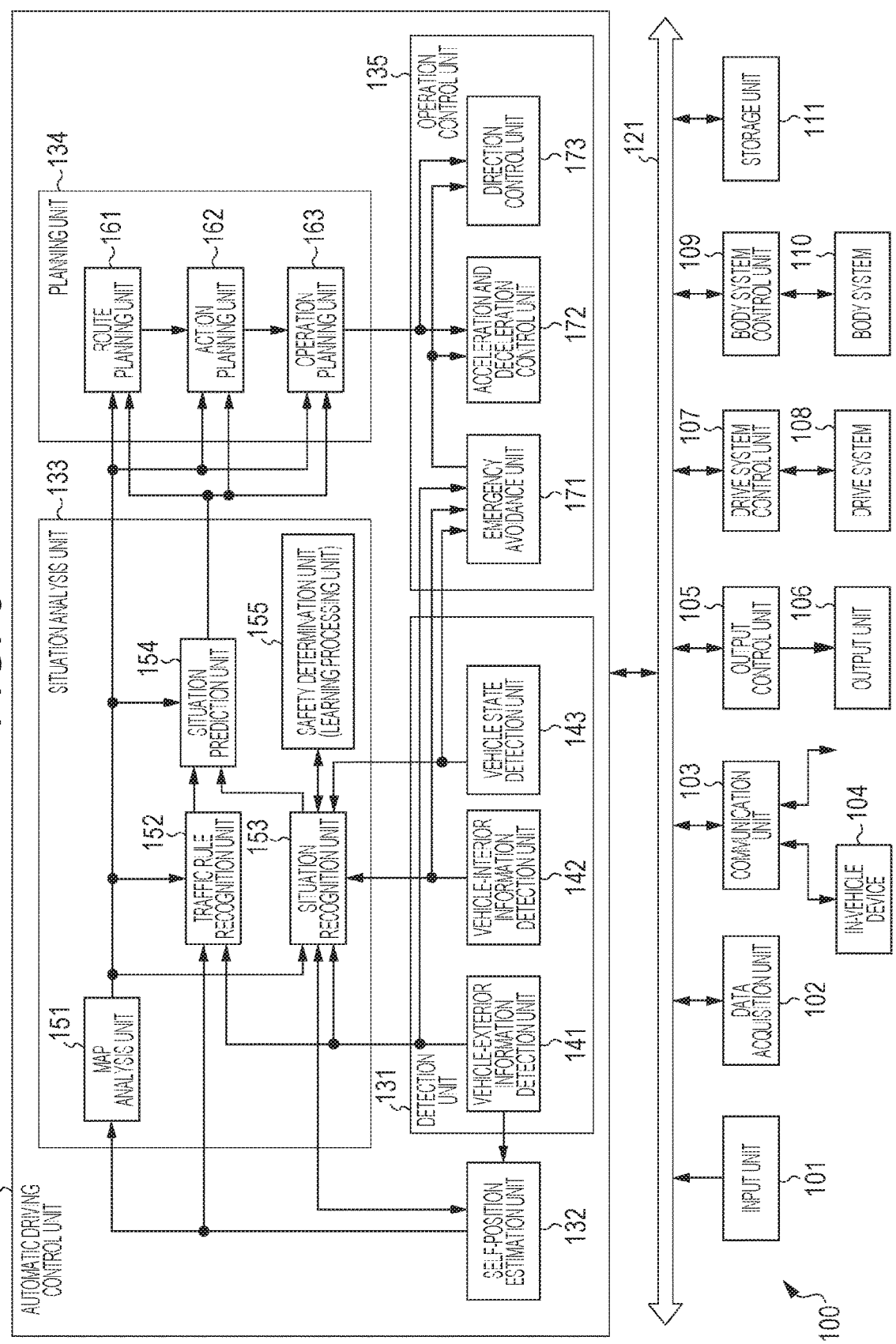
FIG. 5 is a diagram for describing a configuration example of the mobile device according to the present disclosure.

FIG. 5 illustrates a configuration example of a mobile device 100. Note that, hereinafter, in a case of distinguishing a vehicle provided with the mobile device 100 from other vehicles, the vehicle is referred to as user's own car or user's own vehicle.

The mobile device 100 includes an input unit 101, a data acquisition unit 102, a communication unit 103, an in-vehicle device 104, an output control unit 105, an output unit 106, a drive system control unit 107, a drive system 108, a body system control unit 109, a body system 110, a storage unit 111, and an automatic driving control unit 112.

The input unit 101, the data acquisition unit 102, the communication unit 103, the output control unit 105, the drive system control unit 107, the body system control unit 109, the storage unit 111, and the automatic driving control unit 112 are connected to one another via a communication network 121. The communication network 121 includes, for example, an on-board communication network conforming to an arbitrary standard such as a controller area network (CAN), a local interconnect network (LIN), a local area network (LAN), or FlexRay (registered trademark), a bus, and the like. Note that the units of the mobile device 100 may be directly connected without the communication network 121.

Note that, hereinafter, the case where the units of the mobile device 100 perform communication via the communication network 121, the description of the communication network 121 is omitted. For example, the case where the input unit 101 and the automatic driving control unit 112 perform communication via the communication network 121 will be simply described as the input unit 101 and the automatic driving control unit 112 performing communication.

The input unit 101 includes a device used by a passenger to input various data and instructions. For example, the input unit 101 includes operation devices such as a touch panel, a button, a microphone, a switch, and a lever, and an operation device capable of inputting data and instructions by a method other than a manual operation, such as voice or gesture. Furthermore, for example, the input unit 101 may be a remote control device using infrared rays or other radio waves, or an externally connected device such as a mobile device or a wearable device corresponding to the operation of the mobile device 100. The input unit 101 generates an input signal on the basis of the data, instructions, and the like input by the passenger, and supplies the input signal to each unit of the mobile device 100.

The data acquisition unit 102 includes various sensors that acquire data to be used for the processing of the mobile device 100, and supplies the acquired data to each unit of the mobile device 100.

For example, the data acquisition unit 102 includes various sensors for detecting the state of the user's own car. Specifically, for example, the data acquisition unit 102 is a gyro sensor, an acceleration sensor, an inertial measurement device (IMU), and sensors for detecting an operation amount of an accelerator pedal, an operation amount of a brake pedal, a steering angle of a steering wheel, an engine speed, a motor speed, a rotation speed of wheels, or the like.

Furthermore, for example, the data acquisition unit 102 includes various sensors for detecting information outside the user's own car. Specifically, for example, the data acquisition unit 102 includes imaging devices such as a time of flight (ToF) camera, a stereo camera, a monocular camera, an infrared camera, and other cameras. Furthermore, for example, the data acquisition unit 102 includes an environment sensor for detecting a weather, a meteorological phenomenon, or the like, and an ambient information detection sensor for detecting an object around the user's own car. The environment sensor includes, for example, a raindrop sensor, a fog sensor, a sunshine sensor, a snow sensor, and the like. The ambient information detection sensor includes, for example, an ultrasonic sensor, a radar device, a light detection and ranging or laser imaging detection and ranging (LiDAR) device, or a sonar.

Figure 6:
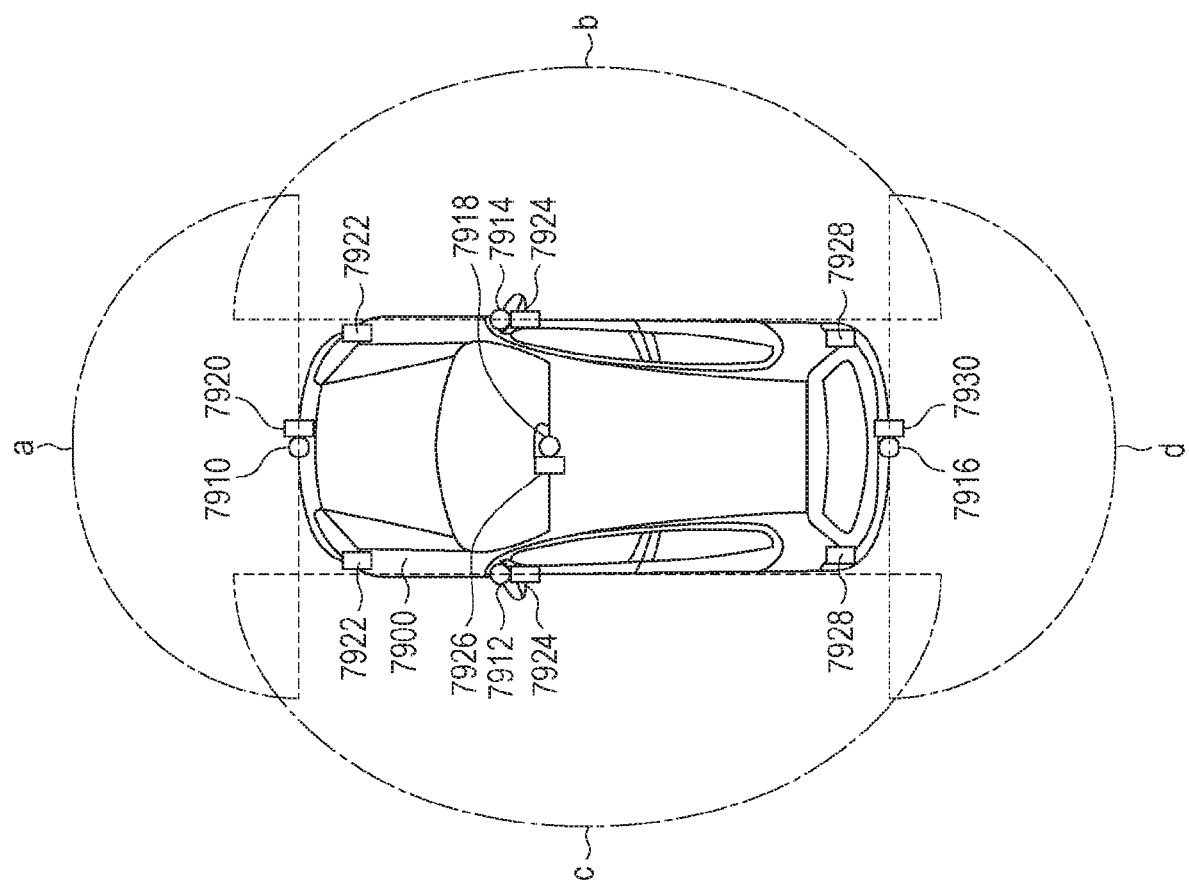
FIG. 6 is a diagram for describing a configuration example of the mobile device according to the present disclosure.

For example, FIG. 6 illustrates an installation example of the various sensors for detecting external information of the user's own car. Each of imaging devices 7910, 7912, 7914, 7916, and 7918 is provided at at least one position of a front nose, side mirrors, a rear bumper, a back door, or an upper portion of a windshield in an interior of a vehicle 7900, for example.

The imaging device 7910 provided at the front nose and the imaging device 7918 provided at an upper portion of the windshield in an interior of the vehicle mainly acquire front images of the vehicle 7900. The imaging devices 7912 and 7914 provided at the side mirrors mainly acquire side images of the vehicle 7900. The imaging device 7916 provided at the rear bumper or the back door mainly acquires a rear image of the vehicle 7900. The imaging device 7918 provided at the upper portion of the windshield in the interior of the vehicle is mainly used for detecting a preceding vehicle, a pedestrian, an obstacle, a traffic signal, a traffic sign, a lane, or the like. Furthermore, in the future automatic driving, when the vehicle turns right or left, the imaging devices may be used in an extended manner up to pedestrians crossing a road beyond the right or left-turn road in a wider range or an object range near a crossing road when the vehicle turns right or left.

Note that FIG. 6 illustrates an example of capture ranges of the imaging devices 7910, 7912, 7914, and 7916. An imaging range a indicates an imaging range of the imaging device 7910 provided at the front nose, imaging ranges b and c respectively indicate imaging ranges of the imaging devices 7912 and 7914 provided at the side mirrors, and an imaging range d indicates an imaging range of the imaging device 7916 provided at the rear bumper or the back door. For example, a bird's-eye view image of the vehicle 7900 as viewed from above, an all-round stereoscopic display image surrounding a vehicle periphery with a curved plane, and the like can be obtained by superimposing image data imaged in the imaging devices 7910, 7912, 7914, and 7916.

Sensors 7920, 7922, 7924, 7926, 7928, and 7930 provided at the front, rear, side, corner, and upper portion of the windshield in the interior of the vehicle 7900 may be ultrasonic sensors or radars, for example. Sensors 7920, 7926, and 7930 provided at the front nose, the rear bumper, the back door, and the upper portion of the windshield in the interior of the vehicle 7900 may be an LiDAR, for example. These sensors 7920 to 7930 are mainly used for detecting a preceding vehicle, a pedestrian, an obstacle, and the like. Results of the detections may be further applied to improvement of stereoscopic object display of the bird's-eye view display and the all-round stereoscopic display.

Description of the configuration elements will be continued returning to FIG. 5. The data acquisition unit 102 includes various sensors for detecting a current position of the user's own car. Specifically, for example, the data acquisition unit 102 includes a global navigation satellite system (GNSS) receiver that receives a GNSS signal from a GNSS satellite.

Furthermore, for example, the data acquisition unit 102 includes various sensors for detecting information inside the vehicle. Specifically, for example, the data acquisition unit 102 includes an imaging device that images a driver, a biosensor that detects biometric information of the driver, a microphone that collects sound in a vehicle interior, and the like. The biosensor is provided on, for example, a seating surface, a steering wheel, or the like, and detects a sitting state of an occupant sitting on a seat or biometric information of the driver holding the steering wheel. As a vital signal, diversified observable data is available such as heart rate, pulse rate, blood flow, respiration, mind-body correlation, visual stimulation, EEG, sweating state, head posture behavior, eye, gaze, blink, saccade, microsaccade, fixation, drift, gaze, and iris pupil reaction. These activity observable information reflecting an observable driving state is aggregated as observable evaluation values estimated from observations, and recovery delay time characteristics associated with logs of the evaluation values are used as specific characteristics to a recovery delay case of the driver for calculating the recovery notification timing by a safety determination unit (learning processing unit) 155 to be described below.

Figure 7:
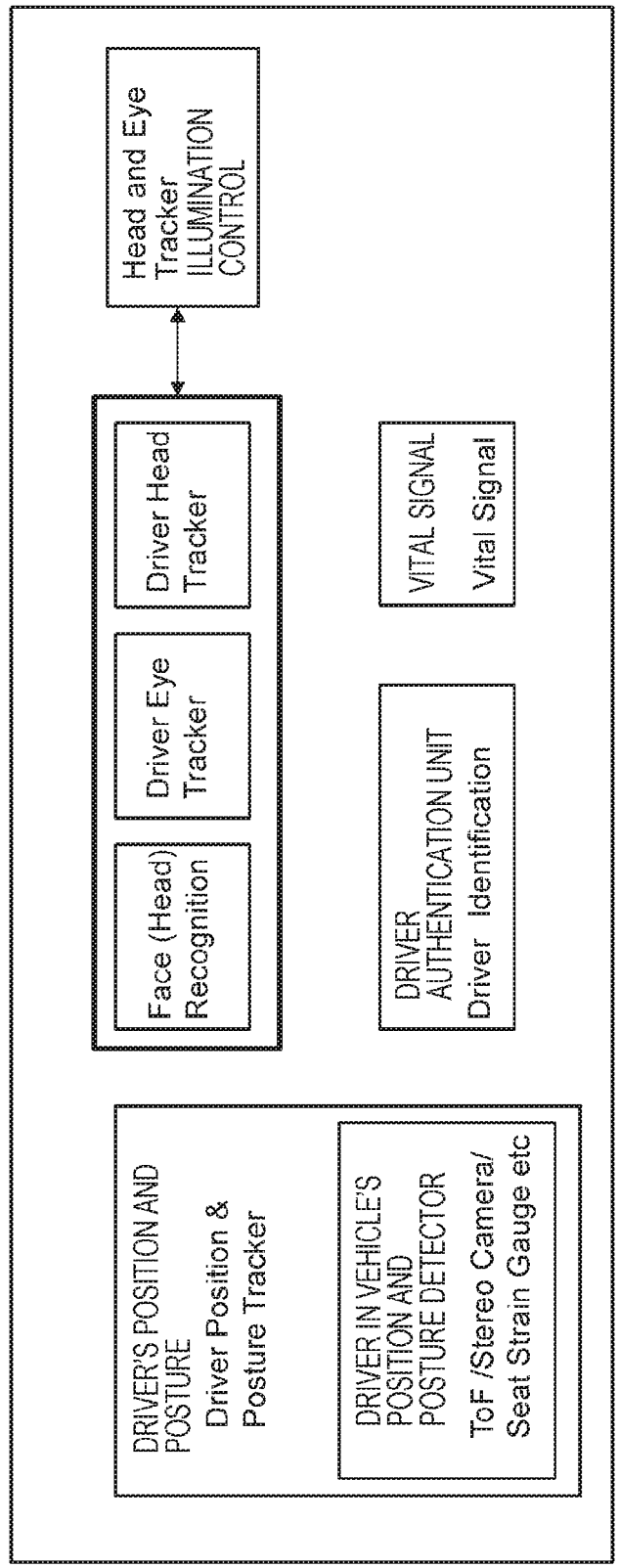
FIG. 7 is a diagram for describing a sensor configuration example of the mobile device according to the present disclosure.

FIG. 7 illustrates an example of various sensors for obtaining information of the driver inside the vehicle included in the data acquisition unit 102. For example, the data acquisition unit 102 includes a ToF camera, a stereo camera, a seat strain gauge, and the like as detectors for detecting the position and posture of the driver. Furthermore, the data acquisition unit 102 includes a face recognition device (face (head) recognition), a driver eye tracker, a driver head tracker, and the like, as detectors for obtaining the activity observable information of the driver.

Furthermore, the data acquisition unit 102 includes a vital signal detector as a detector for obtaining activity observable information of the driver. Furthermore, the data acquisition unit 102 includes a driver authentication (driver identification) unit. Note that, as an authentication method, biometric authentication using a face, a fingerprint, an iris of a pupil, a voiceprint, or the like can be considered in addition to knowledge authentication using a password, a personal identification number, or the like.

The communication unit 103 communicates with the in-vehicle device 104 and various devices outside the vehicle, a server, a base station, and the like, transmits data supplied from each unit of the mobile device 100, and supplies received data to each unit of the mobile device 100. Note that a communication protocol supported by the communication unit 103 is not especially limited, and the communication unit 103 can support a plurality of types of communication protocols.

For example, the communication unit 103 performs wireless communication with the in-vehicle device 104, using a wireless LAN, Bluetooth (registered trademark), near field communication (NFC), a wireless USB (WUSB), or the like. Furthermore, for example, the communication unit 103 performs wired communication with the in-vehicle device 104, using a universal serial bus (USB), a high-definition multimedia interface (HDMI) (registered trademark), mobile high-definition link (MHL), or the like via a connection terminal (not illustrated) (and a cable if necessary).

Moreover, for example, the communication unit 103 communicates with a device (for example, an application server or a control server) existing on an external network (for example, the Internet, a cloud network, or a company specific network) via a base station or an access point. Furthermore, for example, the communication unit 103 communicates with a terminal (for example, a terminal of a pedestrian or a shop, or a machine type communication (MTC) terminal) existing in the vicinity of the user's own car, using a peer to peer (P2P) technology.

Moreover, for example, the communication unit 103 performs V2X communication such as vehicle to vehicle communication, vehicle to infrastructure communication, vehicle to home communication, and vehicle to pedestrian communication. Furthermore, for example, the communication unit 103 includes a beacon reception unit, and receives a radio wave or an electromagnetic wave transmitted from a wireless station or the like installed on a road, and acquires information such as a current position, congestion, traffic regulation, or required time. Note that pairing may be made with a vehicle traveling ahead while traveling in a section, which can be a leading vehicle, through the communication unit, and information acquired by a data acquisition unit mounted on the vehicle ahead may be acquired as pre-travel information and may be complementarily used as the data of the data acquisition unit 102 of the user's own car. In particular, this will be a means to secure the safety of following platooning vehicles, using platooning travel by the leading vehicle, for example.

The in-vehicle device 104 includes, for example, a mobile device (a tablet, a smartphone, or the like) or a wearable device of a passenger, an information device carried in or attached to the user's own car, and a navigation device for searching for a route to an arbitrary destination. Note that, considering that an occupant is not always fixed at a seat fixing position due to the spread of the automatic driving, the in-vehicle device 104 may be expanded to a video player, a game device, or any other devices that can be installed and removed from the vehicle in the future. In the present embodiment, an example in which presentation of information of points requiring intervention of the driver is limited to an appropriate driver has been described. However, the information may be further provided to a subsequent vehicle in platooning travel or the like, or the information provision may be combined with remote travel support by constantly providing the information to an operation management center of passenger transportation shared buses and long-distance logistics commercial vehicles, as appropriate.

The output control unit 105 controls output of various types of information to the passenger of the user's own car or to the outside of the vehicle. The output control unit 105 controls output of visual information (for example, image data) and auditory information (for example, sound data) from the output unit 106 by generating an output signal including at least one of the visual information or the auditory information and supplying the output signal to the output unit 106, for example. Specifically, for example, the output control unit 105 synthesizes image data captured by different imaging devices of the data acquisition unit 102 to generate a bird's-eye view image, a panoramic image, or the like, and supplies an output signal including the generated image to the output unit 106. Furthermore, for example, the output control unit 105 generates sound data including a warning sound, a warning message, or the like for dangers of collision, contact, entry to a dangerous zone, or the like and supplies an output signal including the generated sound data to the output unit 106.

The output unit 106 includes a device capable of outputting the visual information or the auditory information to the passenger of the user's own car or to the outside of the vehicle. For example, the output unit 106 includes a display device, an instrument panel, an audio speaker, headphones, a wearable device such as a glasses-type display worn by the passenger, a projector, a lamp, or the like. The display device included in the output unit 106 may be, for example, a head-up display, a transmission-type display, or a display for displaying the visual information in a field of view of the driver, such as a device having an augmented reality (AR) display function, in addition to a device having a normal display.

The drive system control unit 107 controls the drive system 108 by generating various control signals and supplying the control signals to the drive system 108. Furthermore, the drive system control unit 107 supplies a control signal to each unit other than the drive system 108 to issue notification of a control state of the drive system 108, or the like, as needed.

The drive system 108 includes various devices related to the drive system of the user's own car. For example, the drive system 108 includes a drive force generation device for generating a drive force such as an internal combustion engine or a drive motor, a drive force transmission mechanism for transmitting the drive force to the wheels, a steering mechanism for adjusting the steering angle, a braking device for generating a braking force including regenerative braking, an antilock brake system (ABS), an electronic stability control (ESC), an electric power steering device, and the like.

The body system control unit 109 controls the body system 110 by generating various control signals and supplying the control signals to the body system 110. Furthermore, the body system control unit 109 supplies a control signal to each unit other than the body system 110 and notifies a control state of the body system 110, or the like, as needed.

The body system 110 includes various body-system devices mounted on a vehicle body. For example, the body system 110 includes a keyless entry system, a smart key system, a power window device, a power seat, a steering wheel, an air conditioner, various lamps (for example, headlights, backlights, brake lights, blinkers, fog lights, and the like), and the like.

The storage unit 111 includes, for example, a magnetic storage device such as a read only memory (ROM), a random access memory (RAM), and a hard disc drive (HDD), a semiconductor storage device, an optical storage device, a magneto-optical storage device, and the like. The storage unit 111 stores various programs, data, and the like used by each unit of the mobile device 100. For example, the storage unit 111 stores map data such as a three-dimensional high-precision map such as a dynamic map, a global map having less accuracy than the high-precision map but covering a large area, and a local map including information around the user's own car.

The automatic driving control unit 112 performs control related to the automatic driving such as autonomous driving or driving support. Specifically, for example, the automatic driving control unit 112 performs cooperative control for the purpose of implementing an advanced driver support system (ADAS) function including collision avoidance or shock mitigation of the user's own car, following travel based on a vehicular gap, vehicle speed maintaining travel, collision warning of the user's own car, lane out warning of the user's own car, and the like. Furthermore, for example, the automatic driving control unit 112 performs the cooperative control for the purpose of automatic driving of autonomous travel without depending on an operation of the driver. The automatic driving control unit 112 includes a detection unit 131, a self-position estimation unit 132, a situation analysis unit 133, a planning unit 134, and an operation control unit 135.

The detection unit 131 detects various types of information necessary for controlling the automatic driving. The detection unit 131 includes a vehicle exterior information detection unit 141, a vehicle interior information detection unit 142, and a vehicle state detection unit 143.

The vehicle exterior information detection unit 141 performs processing of detecting information outside the user's own car on the basis of data or signals from each unit of the mobile device 100. For example, the vehicle exterior information detection unit 141 performs detection processing, recognition processing, and tracking processing, for an object around the user's own car, and processing of detecting a distance to the object and a relative speed. Objects to be detected include, for example, vehicles, people, obstacles, structures, roads, traffic lights, traffic signs, road markings, and the like.

Furthermore, for example, the vehicle exterior information detection unit 141 performs processing of detecting an environment around the user's own car. The surrounding environment to be detected includes, for example, weather, temperature, humidity, brightness, road surface condition, and the like. The vehicle exterior information detection unit 141 supplies data indicating results of the detection processing to the self-position estimation unit 132, a map analysis unit 151, a traffic rule recognition unit 152, and a situation recognition unit 153 of the situation analysis unit 133, and an emergency avoidance unit 171 and the like of the operation control unit 135.

The information acquired by the vehicle exterior information detection unit 141 can be mainly supplied and received from an infrastructure in the case of a section stored in the local dynamic map, the section being constantly and importantly updated as a section where traveling by the automatic driving is available. Alternatively, the user's own vehicle may travel by constantly receiving information update in advance before entering a section, from a vehicle or a vehicle group traveling ahead in the section. Furthermore, in particular, for the purpose of more safely obtaining road information immediately before entering a section in a platooning travel, such as a case where the latest local dynamic map is not constantly updated by the infrastructure, road environment information obtained from a leading vehicle having entered the section may be further supplementarily used. In many cases, the section where the automatic driving is available depends on the presence or absence of prior information provided by these infrastructures. The information regarding availability of automatic driving on a route provided by an infrastructure is equivalent to providing an unseen track as so-called "information". Note that the vehicle exterior information detection unit 141 is illustrated on the assumption that the vehicle exterior information detection unit 141 is mounted on the user's own vehicle for the sake of convenience. Pre-predictability at the time of traveling may be further improved by using information captured by a preceding vehicle as "information".

The vehicle interior information detection unit 142 performs processing of detecting information inside the vehicle on the basis of data or signals from each unit of the mobile device 100. For example, the vehicle interior information detection unit 142 performs driver authentication processing and recognition processing, driver state detection processing, passenger detection processing, vehicle interior environment detection processing, and the like. The state of the driver to be detected includes, for example, physical condition, arousal level, concentration level, fatigue level, line-of-sight direction, detailed eyeball behavior, and the like.

Moreover, in the future, the driver is expected to completely taking the driver's hands off from driving and steering operation in the automatic driving, and the driver temporarily goes to sleep or starts doing another work, and the system needs to grasp how far the arousal recovery of consciousness required for driving recovery is progressing. That is, in a conventional driver monitoring system, a main detection means detects a decrease in consciousness such as drowsiness. However, in the future, the driver will be completely uninvolved in the driving and steering. Therefore, the system has no means for directly observing an intervention level of the driver from steering stability of a steering device and the like, and needs to observe a consciousness recovery transition required for driving from a state where an accurate consciousness level of the driver is unknown, grasp an accurate internal arousal state of the driver, and proceed in intervention in the manual driving of steering from the automatic driving.

Therefore, the vehicle interior information detection unit 142 mainly has two major roles. The first role is passive monitoring of the driver's state during the automatic driving. The second role is to detect the driver's periphery recognition, perception, judgment, and an operation ability of the steering device up to the level at which the manual driving is possible from when the recovery request is issued from the system to when the vehicle approaches a section of driving under caution. As control, a failure self-diagnosis of the entire vehicle may be further performed, and in a case where the function of the automatic driving is deteriorated due to partial malfunction of the automatic driving, the driver may be similarly prompted to recover to the manual driving early. The passive monitoring here refers to a type of detection means that does not require a conscious response reaction from the driver, and does not exclude devices that detect a response signal by transmitting physical radio waves, light, or the like from the device. That is, the passive monitoring refers to monitoring of the driver's unconscious state, such as during a nap, and classification that is not the driver's cognitive response is a passive system. The passive monitoring does not exclude active response devices that analyze and evaluate reflected or diffused signals obtained by emitting radio waves, infrared rays, or the like. Meanwhile, devices requesting the driver to give a conscious response requesting a response reaction are active systems.

The environment in the vehicle to be detected includes, for example, temperature, humidity, brightness, odor, and the like. The vehicle interior information detection unit 142 supplies data indicating results of the detection processing to the situation recognition unit 153 of the situation analysis unit 133 and the operation control unit 135. Note that, in the case where it is revealed that the driver cannot achieve the manual driving within an appropriate deadline after the driving recovery instruction to the driver is issued from the system, and it is determined that the takeover will not be in time even if deceleration control is performed in self-operation to give a time, an instruction is given to the emergency avoidance unit 171 and the like of the system, and deceleration, evacuation, and stop procedures are started for evacuating the vehicle. That is, even in a situation where the takeover cannot be in time as an initial state, it is possible to earn time to reach a takeover limit by starting the deceleration of the vehicle early.

The vehicle state detection unit 143 performs processing of detecting the state of the user's own car on the basis of data or signals from each unit of the mobile device 100. The state of the user's own car to be detected includes, for example, speed, acceleration, steering angle, presence or absence of abnormality, content of abnormality, state of driving operation, position and tilt of a power seat, a state of door lock, states of other in-vehicle devices, and the like. The vehicle state detection unit 143 supplies data indicating results of the detection processing to the situation recognition unit 153 of the situation analysis unit 133, the emergency avoidance unit 171 of the operation control unit 135, and the like.

The self-position estimation unit 132 performs processing of estimating the position, posture, and the like of the user's own car on the basis of the data and signals from the units of the mobile device 100, such as the vehicle exterior information detection unit 141 and the situation recognition unit 153 of the situation analysis unit 133. Furthermore, the self-position estimation unit 132 generates a local map (hereinafter referred to as self-position estimation map) to be used for estimating the self-position, as needed.

The self-position estimation map is a high-precision map using a technology such as simultaneous localization and mapping (SLAM), or the like. The self-position estimation unit 132 supplies data indicating a result of the estimation processing to the map analysis unit 151, the traffic rule recognition unit 152, and the situation recognition unit 153 of the situation analysis unit 133, and the like. Furthermore, the self-position estimation unit 132 causes the storage unit 111 to store the self-position estimation map.

The situation analysis unit 133 performs processing of analyzing the situation of the user's own car and its surroundings. The situation analysis unit 133 includes the map analysis unit 151, the traffic rule recognition unit 152, the situation recognition unit 153, a situation prediction unit 154, and a safety determination unit (learning processing unit) 155.

The map analysis unit 151 performs processing of analyzing various maps stored in the storage unit 111, using the data or signals from the units of the mobile device 100, such as the self-position estimation unit 132 and the vehicle exterior information detection unit 141, as needed, and builds a map including information necessary for automatic driving processing. The map analysis unit 151 supplies the built map to the traffic rule recognition unit 152, the situation recognition unit 153, the situation prediction unit 154, and a route planning unit 161, an action planning unit 162, and an operation planning unit 163 of the planning unit 134, and the like.

The traffic rule recognition unit 152 performs processing of recognizing a traffic rule around the user's own car on the basis of the data or signals from the units of the mobile device 100, such as the self-position estimation unit 132, the vehicle exterior information detection unit 141, and the map analysis unit 151. By the recognition processing, for example, the position and state of signals around the user's own car, the content of traffic regulation around the user's own car, a travelable lane, and the like are recognized. The traffic rule recognition unit 152 supplies data indicating a result of the recognition processing to the situation prediction unit 154 and the like.

The situation recognition unit 153 performs processing of recognizing the situation regarding the user's own car on the basis of the data or signals from the units of the mobile device 100, such as the self-position estimation unit 132, the vehicle exterior information detection unit 141, the vehicle interior information detection unit 142, the vehicle state detection unit 143, and the map analysis unit 151. For example, the situation recognition unit 153 performs processing of recognizing the situation of the user's own car, the situation around the user's own car, the situation of the driver of the user's own car, and the like. Furthermore, the situation recognition unit 153 generates a local map (hereinafter referred to as situation recognition map) used for recognizing the situation around the user's own car, as needed. The situation recognition map is, for example, an occupancy grid map.

The situation of the user's own car to be recognized is, for example, the position, posture, and motion of the user's own car (for example, speed, acceleration, moving direction, and the like), and a cargo load capacity and movement of the center of gravity of the vehicle body accompanying cargo loading, a tire pressure, a braking distance movement accompanying wear of a braking pad, allowable maximum deceleration braking to prevent cargo movement caused by load braking, and a centrifugal relaxation limit speed at the time of traveling on a curve with a liquid load, which are specific to the vehicle and determining motion characteristics of the user's own car. Moreover, the recovery start timing required for control is different depending on the conditions specific to the loading cargo, the characteristics specific to the vehicle itself, the load, and the like even if the road environment such as a friction coefficient of a road surface, a road curve, or a slope is exactly the same. Therefore, such various conditions need to be collected and learned, and reflected in the optimal timing for performing control. Simply observing and monitoring the presence or absence and content of abnormality of the user's own vehicle, for example, is not sufficient in determining the control timing according to the type of the vehicle and the load. To secure a certain level of safety in the transportation industry, or the like, according to unique characteristics of the load, parameters for determining addition of time for desired recovery may be set as a fixed value in advance, and it is not always necessary to uniformly set all notification timing determination conditions by self-accumulation learning.

The situation around the user's own car to be recognized include, for example, types and positions of surrounding stationary objects, types of surrounding moving objects, positions and motions (for example, speed, acceleration, moving direction, and the like), configurations of surrounding roads and conditions of road surfaces, as well as surrounding weather, temperature, humidity, brightness, and the like. The state of the driver to be recognized includes, for example, physical condition, arousal level, concentration level, fatigue level, line-of-sight motion, traveling operation, and the like. To cause the vehicle to safely travel, a control start point requiring measures greatly differs depending on a loading capacity mounted in a state specific to the vehicle, a chassis fixed state of a mounting unit, a decentered state of the center of gravity, a maximum decelerable acceleration value, a maximum loadable centrifugal force, a recovery response delay amount according to the state of the driver, and the like.

The situation recognition unit 153 supplies data indicating a result of the recognition processing (including the situation recognition map, as needed) to the self-position estimation unit 132, the situation prediction unit 154, and the like. Furthermore, the situation recognition unit 153 causes the storage unit 111 to store the situation recognition map.

The situation prediction unit 154 performs processing of predicting the situation regarding the user's own car on the basis of the data or signals from the units of the mobile device 100, such as the map analysis unit 151, the traffic rule recognition unit 152, and the situation recognition unit 153. For example, the situation prediction unit 154 performs processing of predicting the situation of the user's own car, the situation around the user's own car, the situation of the driver, and the like.

The situation of the user's own car to be predicted includes, for example, a behavior of the user's own car, occurrence of abnormality, a travelable distance, and the like. The situation around the user's own car to be predicted includes, for example, a behavior of a moving body around the user's own car, a change in a signal state, a change in the environment such as weather, and the like. The situation of the driver to be predicted includes, for example, a behavior and physical conditions of the driver, and the like.

The situation prediction unit 154 supplies data indicating a result of the prediction processing together with the data from the traffic rule recognition unit 152 and the situation recognition unit 153 to the route planning unit 161, the action planning unit 162, the operation planning unit 163 of the planning unit 134, and the like.

The safety determination unit (learning processing unit) 155 has a function as a learning processing unit that learns optimal recovery timing according to a recovery action pattern of the driver, the vehicle characteristics, and the like, and provides learned information to the situation recognition unit 153 and the like. As a result, for example, it is possible to present to the driver statistically determined optimum timing required for the driver to normally recover from the automatic driving to the manual driving at a predetermined ratio or more.

The route planning unit 161 plans a route to a destination on the basis of the data or signals from the units of the mobile device 100, such as the map analysis unit 151 and the situation prediction unit 154. For example, the route planning unit 161 sets a route to a destination specified from a current position on the basis of the global map. Furthermore, for example, the route planning unit 161 appropriately changes the route on the basis of situations of congestion, accidents, traffic regulations, construction, and the like, the physical conditions of the driver, and the like. The route planning unit 161 supplies data indicating the planned route to the action planning unit 162 and the like.

The action planning unit 162 plans an action of the user's own car for safely traveling in the route planned by the route planning unit 161 within a planned time on the basis of the data or signals from the units of the mobile device 100 such as the map analysis unit 151 and the situation prediction unit 154. For example, the action planning unit 162 makes a plan of starting, stopping, traveling directions (for example, forward, backward, turning left, turning right, turning, and the like), driving lane, traveling speed, passing, and the like. The action planning unit 162 supplies data indicating the planned action of the user's own car to the operation planning unit 163 and the like.

The operation planning unit 163 plans an operation of the user's own car for implementing the action planned by the action planning unit 162 on the basis of the data or signals from the units of the mobile device 100, such as the map analysis unit 151 and the situation prediction unit 154. For example, the operation planning unit 163 plans acceleration, deceleration, a traveling track, and the like. The operation planning unit 163 supplies data indicating the planned motion of the user's own car to an acceleration and deceleration control unit 172 and a direction control unit 173 of the operation control unit 135, and the like. While the operation planning unit plans a traveling track in a short-term period, a traveling road selection route may be reset in a longer-term period because the road conditions change with the start of an itinerary and changes in traveling over time, that is, the need of intervention of the driver changes during the period. The selectable route of movement between two points is not necessarily uniquely determined, and desirable needs for the driver change according to a secondary task of the driver, such as the frequency of occurrence of route selection giving a priority to an arrival time or the needs of intervention of the driver during the route, and a route with certain maximized continuity of non-intervention. That is, the operation planning unit 163 may appropriately issue notification of a proposal of resetting of a traveling road selection route in a case where the change occurs more than a certain amount in response to the successive changes.

The operation control unit 135 controls the operation of the user's own car. The operation control unit 135 includes the emergency avoidance unit 171, the acceleration and deceleration control unit 172, and the direction control unit 173.

The emergency avoidance unit 171 performs processing of detecting an emergency situation such as collision, contact, entry into a danger zone, driver's abnormality, vehicle's abnormality, and the like on the basis of the detection results of the vehicle exterior information detection unit 141, the vehicle interior information detection unit 142, and the vehicle state detection unit 143. In the case where the emergency avoidance unit 171 detects occurrence of the emergency situation, the emergency avoidance unit 171 plans the operation of the user's own car for avoiding the emergency situation, such as sudden stop or sharp turn. The emergency avoidance unit 171 supplies data indicating the planned operation of the user's own car to the acceleration and deceleration control unit 172, the direction control unit 173, and the like. Note that the emergency avoidance unit is mainly a control function between the system and the driver when the driver fails in taking over the manual driving in response to the manual driving request, but the emergency avoidance unit may further has a mode in which a third person inside or outside the vehicle or the driver himself/herself senses physical condition abnormality and deals with the vehicle in emergency situations using an external trigger for the system. More specifically, as intentional emergency stop measures, use of the emergency stop in various use cases may be included, such as a case where the driver is attacked by a sudden seizure during an itinerary, and the manual driving recovery cannot be expected in the traveling on that point afterwards, and an operation as emergency measures and SOS transmission is made, preventive measures taken by a passenger who cannot drive a vehicle when the passenger sees a decrease in a recovery possibility by the driver, and emergency stop instruction for the vehicle in traveling by a third person due to earthquake, rockfall, falling of flying objects from the sky, system abnormalities, or user's lost of consciousness, which occurs beyond the scope of the assumption by the system.

The acceleration and deceleration control unit 172 performs acceleration and deceleration for implementing the operation of the user's own car planned by the operation planning unit 163 or the emergency avoidance unit 171. For example, the acceleration and deceleration control unit 172 calculates a control target value of a drive force generation device or a braking device for implementing the planned acceleration, deceleration, or sudden stop, and supplies a control command indicating the calculated control target value to the drive system control unit 107. Note that, there are two main cases where an emergency situation occurs. That is, there are a case where an unexpected event has occurred due to a sudden reason during the automatic driving on a road on a traveling route, which is originally supposed to be safe according to the local dynamic map or the like acquired from an infrastructure and an emergency recovery cannot be in time, and a case where the driver has a difficulty in accurately recovering to the manual driving from the automatic driving. Note that, in the case of the emergency stop instruction by the third person, the purpose is to stop the vehicle, and the basic procedure is to decelerate, slow down, and stop the vehicle at a safe zone such as a shoulder. In the case of a delay in a recovery sequence by the driver, the vehicle is decelerated to delay arrival to a takeover point and gain time to arrive, so that the takeover can be achieved in the extended time. That is, avoidance of emergency is not simply limited to stop of the vehicle.

The direction control unit 173 controls a direction for implementing the operation of the user's own car planned by the operation planning unit 163 or the emergency avoidance unit 171. For example, the direction control unit 173 calculates a control target value of a steering mechanism for implementing the traveling track or sharp turn planned by the operation planning unit 163 or the emergency avoidance unit 171, and supplies a control command indicating the calculated control target value to the drive system control unit 107.

[4. Mode Switching Sequence from Automatic Driving Mode to Manual Driving Mode]

Next, a takeover sequence from the automatic driving mode to the manual driving mode will be described.

Figure 8:
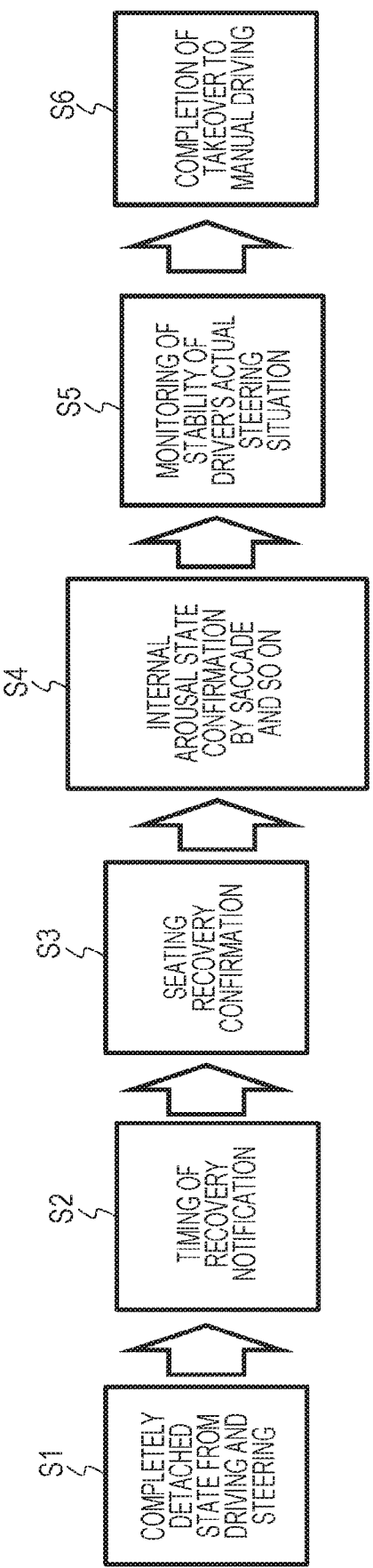
FIG. 8 is a diagram illustrating an example of a mode switching sequence from an automatic driving mode to a manual driving mode executed by the mobile device of the present disclosure.

FIG. 8 schematically illustrates an example of a mode switching sequence from the automatic driving mode to the manual driving mode in the automatic driving control unit 112.

In step S1, the driver is in a state of being completely detached from the driving and steering. In this state, for example, the driver can execute a secondary task such as taking a nap, watching a video, concentrating on a game, and working with a visual tool such as a tablet or a smartphone. The work using the visual tool such as a tablet or a smart phone may be performed, for example, in a state where the driver's seat is displaced or in a seat different from the driver's seat.

When the vehicle approaches a section requiring manual driving recovery on the route, it is assumed that the time until the driver recovers greatly varies depending on the operation content at that time. With the notification just before the approach to the event, the time is insufficient to recover. In a case where the notification is made too early with respect to the approach of the event with a margin, the time to the timing actually required for recovery may be too long, depending on the state of the driver. As a result, if the situation where the notification is not performed at appropriate timing repeatedly occurs, the driver loses the reliability for the notification timing of the system, and the driver's consciousness for the notification decreases, and as a result, the driver's accurate treatment is neglected. As a result, the risk of failing in takeover is increased, and at the same time, it becomes a factor to hinder comfort execution of the secondary task. Therefore, to enable the driver to start accurate driving recovery to the notification, the system needs to optimize the notification timing.

Step S2 is the timing of the manual driving recovery request notification described above with reference to FIG. 3. Notification of the driving recovery is issued to the driver using dynamic puptics such as vibration or a visual or auditory manner. The automatic driving control unit 112 monitors a steady state of the driver, for example, grasps the timing to issue the notification, and issues the notification at appropriate timing. That is, the system passively and constantly monitors the driver's secondary task execution state during the former passive monitoring period and can calculate optimal timing of optimal timing of the notification. It is desirable to continuously and constantly perform the passive monitoring in the period of step S1 and to calculate the recovery timing and issue the recovery notification according to recovery characteristics unique to the driver.

That is, it is desirable to learn the optimal recovery timing according to the recovery action pattern of the driver, the vehicle characteristics, and the like, and to present, to the driver, the statistically obtained optimal timing, which is required for the driver to normally recover from the automatic driving to the manual driving at a predetermined rate or higher. In this case, for example, in a case where the driver does not respond to the notification at a desired point of the start of recovery for a certain period of time, a warning with high stimulus such as sounding an alarm or vibration of the seat causing discomfort is given.

In step S3, whether or not the driver has been seated and recovered is confirmed. In step S4, a driver's recognition start situation is confirmed according to behavior determination for the driver who has started confirmation operation of surroundings, using face and line-of-sight evaluation, and moreover, an internal arousal state of the driver required for traveling environment recognition is confirmed by analyzing a pupil behavior characteristic or an eyeball behavior such as saccade or fixation. In particular, the detailed eyeball behavior analysis shows a regression reaction that affects cognitive judgment and understanding in the brain. Therefore, observation of the internal arousal state becomes possible, which can be a great clue for the system to determine the arousal level of the driver immediately before the takeover. Then, at a stage where the system can grasp a certain arousal recovery situation, the system transfers the control to the driver in a short term and in stages. In step S5, the system monitors stability of the actual steering situation of the driver during the operation transfer. This operation transfer process may be completely passive transfer, and driver's corrected steering quality may be evaluated by slightly adding an active traveling noise (such as acceleration or deceleration, or meandering) that requires the driver to consciously or unconsciously perform corrected steering. Further, the active steering confirmation occurs depending on the road condition obtained from the LDM, and may be selectively applied only in a section where a driver's passive steering response is hard to detect such as a straight road. Then, in step S6, in the case where the system detects favorable steering recovery in the arousal state of the driver, the takeover from the automatic driving to the manual driving is completed.

[5. Operation Sequence Example of Automatic Driving]

Next, an example of an operation sequence of the automatic driving will be described with reference to the flowchart illustrated in FIG. 9.

Figure 9:
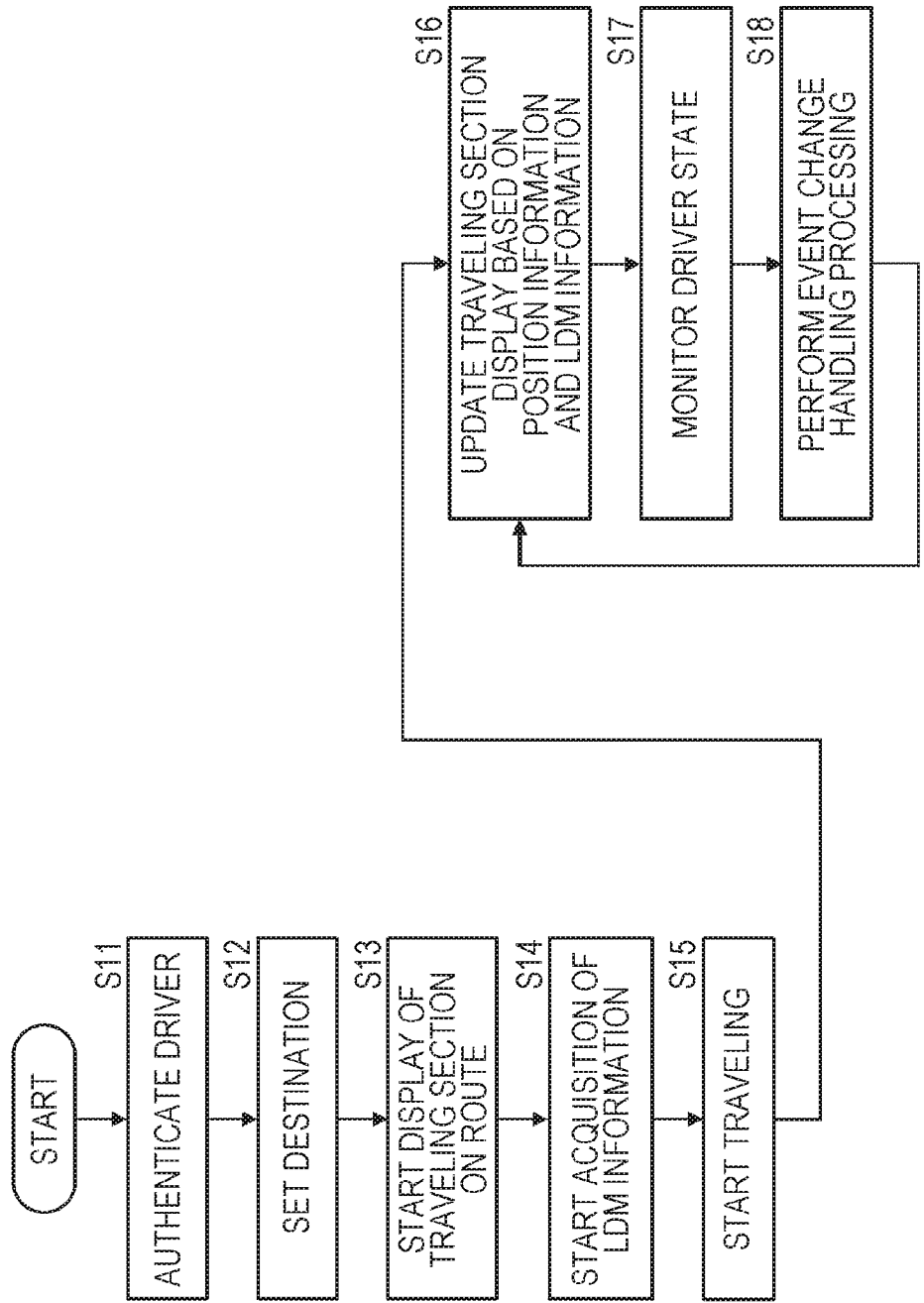
FIG. 9 is a diagram illustrating a flowchart for describing an example of an operation sequence of automatic driving.

The flowchart illustrated in FIG. 9 is a flowchart for describing the operation sequence of the automatic driving executed by the mobile device.

First, in step S11, driver authentication is performed. This driver authentication is performed using knowledge authentication using a password, a PIN, or the like, biometric authentication using the face, a fingerprint, an iris of a pupil, a voice print, or the like, or the knowledge authentication and the biometric authentication together. By performing the driver authentication in this way, information for determining the notification timing can be accumulated in association with each driver even in a case where a plurality of drivers drives the same vehicle.

Next, in step S12, the driver operates the input unit 101 to set a destination. In this case, the driver's input operation is performed on the basis of display on an instrument panel.

Note that the present embodiment has been described assuming the case where the driver gets in the vehicle and sets the itinerary. However, the driver may remotely make a reservation in advance using a smartphone before getting in the vehicle or using a personal computer before leaving home, for example. Moreover, the system of the vehicle may perform preplanning along a schedule assumed by the driver according to a schedule table, update and acquire the LDM information of the road environment, that is, the so-called local dynamic map (LDM) in which road traveling map information of the vehicle is updated with high density and on a constant basis, and display an advice of actual traveling at the time of or before getting in the vehicle, like a concierge, for example.

Next, in step S13, display of a traveling section on a traveling route is started. This traveling section is displayed on the instrument panel and is also displayed with a work window on a tablet or the like on which the driver performs a secondary task, for example. As a result, the driver working on the work window can easily recognize a driver intervention required section and an automatically drivable section on the traveling route on a predicted arrival time axis from the current point.

In the traveling section display, a forward schedule and approach information to each point are presented. In the traveling section display, the driver intervention required section and the automatically drivable section on the traveling route are displayed on the predicted arrival time axis from the current point. Then, the driver intervention required section includes a manual driving section, a takeover section from the automatic driving to the manual driving, and a cautioned traveling section from the automatic driving. Details of the traveling section display will be described below.

Next, in step S14, acquisition of LDM update information is started. With the acquisition of LDM update information, content of the traveling section display can be changed to the latest state. Next, in step S15, traveling is started. Next, in step S16, display of the traveling section display is updated on the basis of the position information of the user's own car and the acquired LDM update information. As a result, the traveling section display is scrolled such that each section approaches the user's own car as the vehicle travels.

The means for presenting the information such as the relatively approaching front traveling environment and the timing necessary for takeover of the user's own vehicle is not limited to the scrolling means. As another means, it is favorable to use an intuitive and explicit means for issuing notification of an imminent time interval and a means for notifying the driver when to start the driving with less misunderstanding. For example, a time presentation method imitating an hourglass, or a means for directly presenting a takeover remaining time to a device worn by the user in the form of a chronograph wristwatch may be used.

Next, in step S17, the driver's state is monitored. Next, in step S18, event change handling processing is performed. The event change handling processing includes mode switching processing for responding to a case where a switching point between the automatic driving mode and the manual driving mode existing on the traveling route or the cautioned traveling section is approaching, event occurrence processing for responding to a case where the mode switching point or the driver intervention required section of the cautioned traveling section newly occurs on the traveling route, and the like. Hereinafter, the processes of steps S16 to S18 are appropriately repeated.

"Details of Traveling Section Display"

Figure 10:
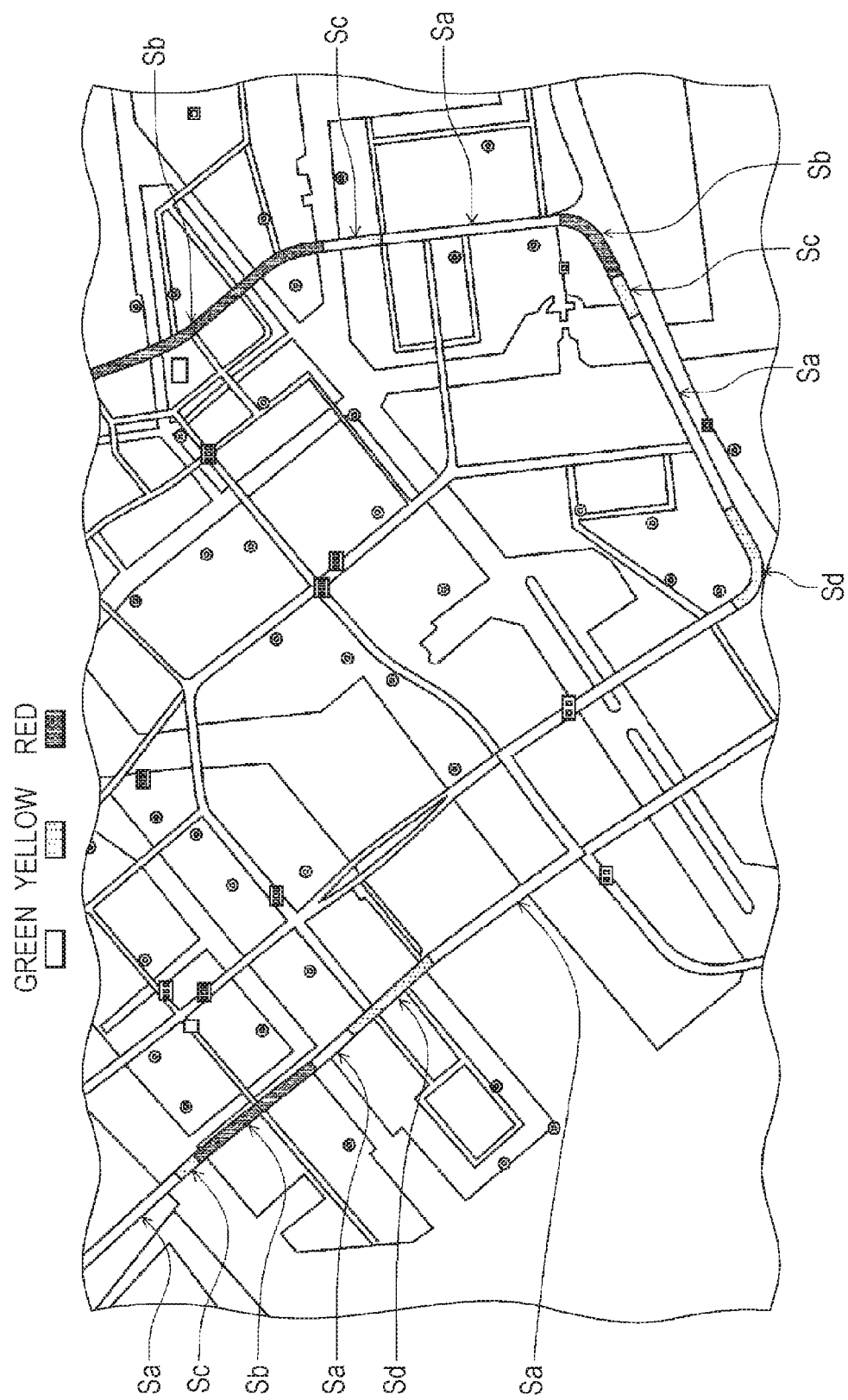
FIG. 10 is a diagram illustrating an example of a traveling route in which automatic driving available and unavailable sections determined as a driver sets a destination are set or determined in spots.

FIG. 10 illustrates an example of the traveling route determined as the destination is determined by the driver. At least an automatically drivable section Sa and a manual driving section Sb are set for the traveling route. Moreover, the example in FIG. 10 illustrates a configuration in which a takeover section Sc from the automatic driving to the manual driving and a cautioned traveling section Sd from the automatic driving are set as a route traveling counter-clockwise. The traveling section information is information recorded in the local dynamic map (LDM).

Here, the takeover section Sc exists immediately before the manual driving section Sb, and the driver needs to be in a recoverable state to the manual driving. Furthermore, the cautioned traveling section Sd is a section in which the vehicle can travel and pass through at a constant cruising speed or while decelerating while keeping the automatic driving under caution of the driver who is in the recoverable state to the manual driving. Since the cautioned traveling section is a section where the system is not versatile for dealing with events, the driver is asked to determine the situation and handle the events. Therefore, in the case where the system cannot handle the situation in the automatic driving, the driver needs to handle the situation as appropriate. The driver needs to recover the posture and the arousal level to the extent of capable of handling the events before entering the section.

In the illustrated example, the automatically drivable section Sa is illustrated in green, the manual driving section Sb is illustrated in red, and the takeover section Sc and the cautioned traveling section Sd are illustrated in yellow. Note that, for the sake of convenience, each color is represented by a different pattern.

In the traveling section display in a display device such as a center information display or a tablet, each section on the traveling route is displayed on the predicted arrival time axis from the current point. The automatic driving control unit 112 processes the information for displaying the traveling sections on the traveling route on the basis of the traveling route information and traffic information.

[6. Safety Determination Processing and Manual Driving Recoverable Time Estimation Processing Executed by Mobile Device]

Next, safety determination processing and manual driving recoverable time estimation processing executed by a mobile device will be described.

This processing is mainly executed by the safety determination unit 155 configured in the automatic driving control unit 112 of the mobile device 100 described with reference to FIG. 5.

As described above, the safety determination unit 155 has a function as a learning processing unit that learns optimal recovery timing according to the recovery action pattern of the driver, the vehicle characteristics, and the like, and provides the learned information to the situation recognition unit 153 and the like. As a result, for example, it is possible to present to the driver statistically determined optimum timing required for the driver to normally recover from the automatic driving to the manual driving at a predetermined ratio or more.

Figure 11:
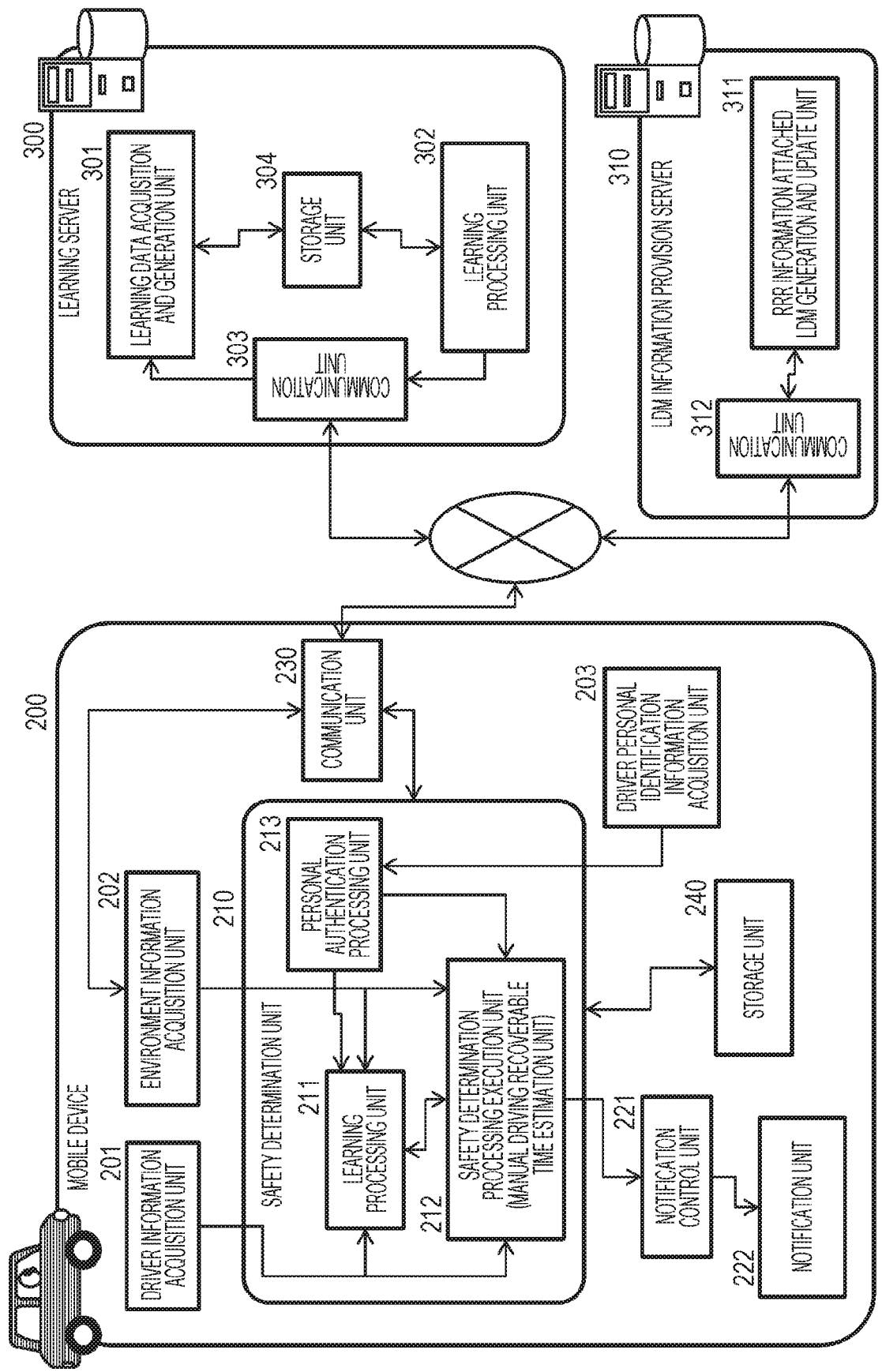
FIG. 11 is a diagram for describing specific configuration example and processing of a safety determination unit.

FIG. 11 is a diagram for describing specific configuration example and processing of the safety determination unit 155.

A mobile device 200 such as an automobile is illustrated on the left, and a learning server 300 that communicates with the mobile device 100 via a network and a local dynamic map (LDM) information provision server 310 are illustrated on the right. Note that FIG. 11 illustrates one mobile device, one learning server, and one LDM information provision server. However, a large number of these devices are connected via a network. For example, the LDM information provision server 310 can be configured by a plurality of servers each set for each local area. Furthermore, the learning server and the LDM information provision server may be configured in one server.

The mobile device 200 includes a driver information acquisition unit 201, an environment information acquisition unit 202, a driver personal identification information acquisition unit 203, a safety determination unit 210, a notification control unit 221, a notification unit 222, a communication unit 230, and a storage unit 240.

Note that the safety determination unit 210 corresponds to the safety determination unit 155 configured in the situation analysis unit 133 illustrated in FIG. 5.

The safety determination unit 210 includes a learning processing unit 211, a safety determination processing execution unit (manual driving recoverable time estimation unit) 212, and a personal authentication processing unit 213.

The learning server 300 includes a learning data acquisition and generation unit 301, a learning processing unit 302, a communication unit 303, and a storage unit 304.

First, processing of each configuration unit of the mobile device 200 will be described.

The driver information acquisition unit 201 includes a camera and various sensors, and acquires driver information.

The driver information acquired by the driver information acquisition unit 201 is, for example, a line-of-sight direction, an eyeball behavior, and a pupil diameter acquired from an image including an eyeball area, a facial expression acquired from an image including a face area, and the like.

These pieces of information acquired by the driver information acquisition unit 201 are used as information for determining the arousal level of the driver, for example.

Note that the above example is simplified description of the driver's arousal level determination, the detailed state of the driver cannot be determined from acquisition of the simple information of the eyes, face, and the like. The driver's arousal level determination includes a detailed analysis of prior history information and behaviors of the eyes, face, and the like, and comprehensive and hierarchical determination of the internal arousal level required for the driver's manual driving recovery using observable values. Hereinafter, some examples of biometric information used for the determination will be described.

As a means for observing the arousal level of the driver by observing an activity state of a portion to be recognized or determined by observing an activity area in the brain, there are large-scale measurement devices such as electroencephalography observation for electrically detecting a potential, observation of head surface blood flow using infrared rays, and brain function evaluation by fMRI. However, such devices are far from daily and ordinary use with today's technology when mounted on a vehicle. Use of offline learning based on a correlation with other biometric information such as heartbeat waveforms and EOG under an experimental environment and the biometric information is limited.

In addition, there are some pieces of information that can be used for arousal recovery prediction in advance by continuously acquiring mid- to long-term prior log information in advance, although it is difficult to be directly used for short-term arousal level determination in a stage where takeover is suddenly required. The time required for recovery after receiving the recovery notification from the system varies according to various factors such as the depth of sleep at the time of receiving the notification, the degree of fatigue accumulation, an elapsed time from the start of a nap, and personal characteristics. These pieces of prior information act as affectors for the arousal recovery although it is difficult to directly provide a recovery time. Therefore, acquirable observable information is used for learning as affectors for estimating the arousal recovery time.

Logs of the driver information acquired by the driver information acquisition unit 201 are acquired according to the driver's state, and the arousal state is observed in response to reception of the recovery notification, approach of a takeover event, or the like as a trigger. The long-term log observation may include a life log before getting in the vehicle in the case where the driver wears and uses an observable device such as a wristwatch, for example. In that case, prior information such as a rest state and extra or insufficient sleep can also be a help for determination. In the normal use case where logs cannot be acquired in advance, the user gets in the vehicle, and the degree of distraction such as fatigue and drowsiness can be observed by Lorentz plot evaluation of the electrocardiogram, for example, using various sensors mounted on the vehicle. Further, states of tension and fatigue can be estimated from mid- to long-term change logs of heart rate/pulse wave/blood flow information and blood pressure, as well as breathing, expiration, and body odor. Further, the driver's state can be estimated by analyzing the user's utterance tone and response delay by means of verbal response with the system. Moreover, a behavioral analysis means for facial expression, occurrence of downward-look or look-aside state, or the like can be adopted.

Furthermore, state determination by agility evaluation using gestures or active evaluation using an activity amount, which shows an instruction response characteristic, may be performed.

The driver information acquired by the driver information acquisition unit 201 is required for determining the internal arousal level with high accuracy in order to execute final takeover determination while monitoring the arousal recovery affector in advance by the prior log observation. From another point of view that the driver wakes up and can recover from the automatic driving to the manual driving, the situation of the driver changes in time series according to the following sequence.

1. Occurrence of an event to be taken over is recognized,
2. The situation necessary for the takeover is grasped and recognized, and
3. Response is made to the notification in the case where grasping and recognition of the notification is by sound. The response may be wake up, may be recognition and confirmation by a switch, may be response confirmation by gesture, may be detection by action recognition putting a hand on the steering wheel, or may be detection of recovery of the driver's seat being seated.
4. Usually, the driver who has finally returned to the recovery posture in response to the recovery notification is assumed to start device steering after going through state recognition and inspection procedures necessary for the manual driving recovery prior to starting the operation of steering devices such as the steering wheel, brake, and accelerator, and thus one of main information acquisition means is visual information acquisition.
5. The driver starts to operate the appropriate steering device when the driver can visually recognize the situation. However, for safety, the system does not instantaneously take over the whole steering but rather carries out a procedure to gradually take over the steering to the stage where the driver's proper steering intervention and muscular steering response can be confirmed. As a procedure for the system to confirm whether or not the steering stability of the steering device is obtained, it is also possible to confirm functional response of the body by adding steering noise that requires steering correction by the driver and checking a response to the steering noise in the control stage of the automatic control system.

The driver information acquired by the driver information acquisition unit 201 includes a function to perform observation in the series of processing.

Regarding the driver information acquired by the driver information acquisition unit 201, the visual situation is further grasped, as described above. Preparation for manual steering becomes ready only after further visually performing recognition, determination, and planning in the process of 4. Only by capturing the information necessary for determination in a central visual field of the line-of-sight, the steering action taken by the driver cannot be determined and planned. Therefore, a line-of-sight is directed to a target necessary for risk judgment, and usually captures the target in a peripheral visual field, and is directed to a central visual field=line-of-sight in that direction, an agile movement of an eyeball turning due to the saccade appears. When the target comes to the central visual field of the line-of-sight, fixation is mainly started to promote understanding of the target. When the judgment of the target is completed by referring to knowledge information in the brain while grasping the characteristics of the target, ignition of understanding occurs. When the understanding of the target is completed, a saccade operation of the eyeball is performed in a new direction to advance grasping of the next target which needs to be grasped in parallel, or pursuit tracking rotation that cancels relative direction movement is performed to advance action judgment of the captured target.

That is, when judgment is made in the cycle of involuntary eye movement during fixation of knowledge cognition and cognition confirmation from initial visual acquisition such as wide area saccade search that appears as visual information search behavior of these eyeballs, pursuit movement that follows the flow accompanying traveling, involuntary eye movement during fixation and its range and fluctuation stability that occur when the fixation is retained until the cognition of the target of interest to which the line-of-sight is directed, residence time to saccade to the point of interest, a slight time delay that causes the ignition of judgment affects the amount of activity in the brain, and the effect can be observed in the short term. There is such a phenomenon. Here, in particular, in a visual reflex action, it is assumed that the driver starts the risk judgment from visually captured poor information by referring to his own visual memory, and supplements additional supplementary information necessary for confirming the judgment while performing involuntary eye movement during fixation until unconsciously reaching the risk judgment. Therefore, a sequence of evaluating initial visual information immediately after turning the eyeball with a saccade and repeating the driving action judgment unconsciously and intricately to confirm the judgment necessary to continue driving, and repeating the saccade to get the information to check next is intermittently repeated. These series of eye movements necessary for information acquisition for driving and steering are an action under cognition of awakening. Therefore, it appears as a detailed behavior of the eyeball that strongly reflects the level of the internal arousal state required for recovery to manual driving.

Moreover, the driver information acquisition unit 201 includes the operation information acquisition unit that acquires the operation information of the driver. The driver information acquisition unit 201 includes a camera that captures a face image of the driver, and the operation information acquisition unit for the operation units (steering wheel, accelerator, brake, and the like), for example.

The environment information acquisition unit 202 acquires various types of environment information.

The environment information acquired by the environment information acquisition unit 202 is, for example, an image by an imaging unit installed in the mobile device 200, depth information, three-dimensional structure information, topographical information by sensors such as a radar or an LiDAR installed on a moving body, position information by a GPS, traffic light conditions, sign information, information from a communication device installed on an infrastructure such as a road and the like, and the like.

The environment information acquisition unit 202 further acquires a requested recovery ratio (RRR) information attached local dynamic map (LDM) from the LDM information provision server 310 via the communication unit 230, as needed.

The RRR information attached LDM is updated as needed, and the latest data is supplied to the mobile device 100 as needed.

Note that the local dynamic map (LDM) includes an information group of a plurality of types of hierarchical layers, as described above with reference to FIG. 1. That is, the LDM includes the following four types of information:

Type 1 (static data)=data of map information and the like generated on the basis of maps and the like by Geographical Survey Institute, which are updated in the medium to long term, for example.

Type 2 (quasi-static data)=data that changes in the long term although no big change in the short term, such as structures such as buildings, trees, and signs, for example.

Type 3 (quasi-dynamic data)=data that can change in a certain time unit, such as traffic lights, traffic jams, and accidents.

Type 4 (dynamic data)=data such as traffic information of vehicles, people, and the like, and which sequentially changes.

In the configuration of the present disclosure, an LDM to which RRR information in units of sections of roads is added is acquired in addition to the conventional LDM data from the LDM information provision server 310, as needed.

That is, the LDM information provision server 310 generates and updates the LDM to which the requested recovery ratio (RRR) that is a target success ratio for recovery from the automatic driving to the manual driving is added as information for each road section, that is, the RRR information attached local dynamic map (LDM), and provides the generated LDM to the mobile device 100.

The driver personal identification information acquisition unit 203 acquires information applicable to personal authentication such as iris authentication, fingerprint authentication, vein authentication, and voiceprint authentication, for example.

Note that the configurations of the driver information acquisition unit 201, the environment information acquisition unit 202, and the driver personal identification information acquisition unit 203 illustrated in FIG. 11 correspond to the configurations of the data acquisition unit 102 and the detection unit 131 illustrated in FIG. 5.

The safety determination unit 210 includes the learning processing unit 211, the safety determination processing execution unit (manual driving recoverable time estimation unit) 212, and the personal authentication processing unit 213.

The personal authentication processing unit 213 receives personal authentication information such as iris authentication, fingerprint authentication, vein authentication, and voiceprint authentication, for example, which has been acquired by the driver personal identification information acquisition unit 203, as inputs, and executes personal authentication processing.

Registration information necessary for the authentication processing is acquired from the storage unit 240 or the learning server 300.

For example, when the driver gets into an automobile as a mobile device, the personal authentication as personal identification processing is executed. The driver information after the personal identification, time, driving input, and environmental information such as roads are constantly or regularly recorded and transmitted to the learning server 300.

Note that, the information input from the driver personal identification information acquisition unit 203 and applicable to the personal authentication such as iris authentication, fingerprint authentication, vein authentication, and voiceprint authentication, for example, is transmitted to the learning server 300, and the personal authentication processing may be executed by the learning server 300, using the information registered in the learning server 300.

The learning processing unit 211 receives, for example, the driver information acquired by the driver information acquisition unit 201 and the environment information acquired by the environment information acquisition unit 202, as inputs, and executes learning processing for determining safety to which the input information is applied.

Specifically, for example, the learning processing unit 211 constructs a learning device capable of calculating a "safety index value" and a "manual driving recoverable time estimation value" corresponding to the "driver information" and "environmental information". Note that the learning device learns determination of not only the characteristics specific to the driver but also characteristics according to the vehicle characteristics, environmental characteristics, and the like. For example, when a driver drives a commuting automobile by a private car in consideration of safety of steering characteristics of the commuting automobile, and when a driver drives a vehicle connected with a heavy load in occupation in consideration of safety of vehicle behavior characteristics, steering start points and amounts of braking, for example, according to the driving situation greatly vary even if the drivers are identified as the same driver. Therefore, by learning variable factors contributing to the safety, a learning device that is optimized including the situations and vehicle characteristics can be obtained.

Note that the learning device refers to a set of models, algorithms, parameters, and the like, of which input and output relationship can be learned using machine learning. There are various names such as statistical learning device, learning model, machine learning model, statistical learning model, predictor, prediction model, estimator, estimation model, and the like, but all have essentially the same meaning, so here the name "learning device" is adopted. The learning device is also called classifier, classification model, identifier, identification model, regression learning device, regression learning model, generation model, and the like according to a specific application, but the name "learning device" is a superordinate concept including all the above concepts.

The safety determination processing execution unit 212 receives, for example, the driver information acquired by the driver information acquisition unit 201 and the environment information acquired by the environment information acquisition unit 202 as inputs and further uses the learning device that is a learning result in the learning processing unit 211 or the learning device acquired from the learning server 300, and calculates a safety index value based on the current driver information and environment information.

Moreover, a time required to recover safe manual driving (=manual driving recoverable time) is estimated.

Note that the time required to recover safe manual driving is calculated on the basis of a time required for the driver to start the manual driving at a fixed high rate until arrival at a point where the takeover is required but is not a time calculated by directly evaluating the safety. The timing when start of preparation for recovery to the manual driving is required is affected by various factors such as motion characteristics of the vehicle, the road environment situation, and the weather. Therefore, by taking into account such affectors, the safety can be maximized.

The notification control unit 221 controls notification timing of a manual driving start request notification, which has been described with reference to FIG. 3, on the basis of the manual driving recoverable time estimated by the safety determination processing execution unit 212, and issues notification of the notification timing via the notification unit 222.

Note that the notification unit 222 includes, for example, an alarm, a display on a window, a center console, a meter panel, a vibration processing execution unit for the steering wheel and the seat, and the like.

The communication unit 230 executes communication with an external device such as the learning server 300.

Next, processing of each configuration unit of the learning server 300 will be described.

The learning server 300 includes the learning data acquisition and generation unit 301, the learning processing unit 302, the communication unit 303, and the storage unit 304.

The learning data acquisition and generation unit 301 acquires and generates input and output data of the learning device, which are required for constructing the learning device. Specifically, for example, the learning data acquisition and generation unit 301 acquires the "driver information" and "environmental information" from various mobile devices connected to the network. Moreover, for example, the learning data acquisition and generation unit 301 generates learning data based on various obtainable data such as map data, accident occurrence situation data, traffic jam data, and the like Note that, here, the expression of "input and output data" of the learning device is used. The data is called teacher data, training data, or the like in supervised learning. Since learning possibilities by other techniques such as unsupervised learning, semi-supervised learning, and reinforcement learning are not excluded as long as a desired input and output relationship can be learned, here, the expression is generalized and the input and output data of the learning device is used.

These data are stored in the storage unit 304.

The learning processing unit 303 executes learning processing using the input and output data of the learning device acquired or generated by the input and output data acquisition and generation unit 301 of the learning device and stored in the storage unit 304.

By the learning processing, for example, input and output data of the learning device capable of calculating the "safety index value" and the "manual driving recoverable time estimation value" corresponding to the "driver information" and "environmental information" is constructed.

Next, details of the processing of the safety determination unit 210 of the mobile device 200 will be described.

The safety determination unit 210 includes the learning processing unit 211, the safety determination processing execution unit (manual driving recoverable time estimation unit) 212, and the personal authentication processing unit 213.

The learning processing unit 211 receives the driver information acquired by the driver information acquisition unit 201 and the environment information acquired by the environment information acquisition unit 202, as inputs, and executes learning processing for determining safety to which the input information is applied.

The safety determination processing execution unit (manual driving recoverable time estimation unit) 212 receives, for example, the driver information acquired by the driver information acquisition unit 201 and the environment information acquired by the environment information acquisition unit 202 as inputs and further uses the learning device that is a learning result in the learning processing unit 211 or the learning device acquired from the learning server 300, and calculates a safety index value based on the current driver information and environment information.

Moreover, a time required to recover safe manual driving (=manual driving recoverable time) is estimated.

Note that, in an initial state where the input and output data of the learning device is not present and a learned learning device cannot be acquired from the learning processing unit 211, the safety determination processing execution unit (manual driving recoverable time estimation unit) 212 acquires, from storage unit 240, a learning device that has learned an unspecified large number of data experimentally acquired in advance, for example, and executes the processing of calculating the safety index value and the processing of estimating the manual driving recoverable time, using the acquired learning device.

Alternatively, the safety determination processing execution unit (manual driving recoverable time estimation unit) 212 outputs a preset fixed manual driving recoverable time as an estimation value.

Note that the learning device generated by the learning processing using an unspecified large number of data can be acquired from the learning server 300.

After the learning processing in the learning processing unit 211 is executed, the processing of calculating the safety index value and processing of estimating the manual driving recoverable time based on the input driver information and environment information are executed using the learning device.

The learning processing unit 211 performs, for example, learning processing of constructing correspondence between the following pieces of information (a) and (b):

(a) the driver information acquired by the driver information acquisition unit 201 and the environment information acquired by the environment information acquisition unit 202; and (b) operation information as to whether or not the driver has been able to drive in a safe state after switching notification from the automatic driving mode to the manual driving mode.

Note that, as described above, for example, the driver information acquisition unit 12 has a function to acquire the operation information of the driver, that is, the operation information of the operation units (the steering wheel, accelerator, brake, and the like), in addition to the processing of acquiring information for determining the arousal level of the driver.

That is, the learning processing unit 211 acquires the driver information and the environment information and acquires driving operation information of the driver after the manual driving recovery request notification, as described above with reference to FIG. 3, at certain timing, and checks whether or not safe driving has been executed.

When the safe driving has been executed, the notification timing of the manual driving recovery request notification is determined to be further delayed in the case of obtaining the same driver information and environment information.

On the other hand, when the safe driving has not been executed, the notification timing of the manual driving recovery request notification is determined to be advanced in the case of obtaining the same driver information and environment information.

In the learning processing in the learning processing unit 211, the learning device for determining the notification timing of such a manual driving recovery request notification is constructed.

Note that, in the learning processing in the learning processing unit 211, not only the data to be applied to determination of the notification timing of the manual driving recovery request notification, but also a learning device applicable to determination processing as to whether or not the driver can execute safe manual driving in the case where certain driver information and environment information can be obtained, that is, a learning device in which "the driver information and the environment information" is associated with the "safety index value" is constructed.

As a characteristic of the learning device, the operation information of (b) whether or not the driver has been able to drive in a safe state is used as the teacher data while acquiring a transition from the characteristics of the driver prior to the recovery notification, which occurs every time an event occurs, and success/failure determination and take-over quality evaluation are performed, whereby the system includes a self-contained learning device, and the accuracy can be improved.

As described above, in the learning processing in the learning processing unit 211, the safety index value data associated with the driver information acquired by the driver information acquisition unit 201 and the environment information acquired by the environment information acquisition unit 202 can be obtained.

Moreover, the manual driving recoverable time (the time required to recover safe manual driving) corresponding to the driver information acquired by the driver information acquisition unit 201 and the environment information acquired by the environment information acquisition unit 202 can be calculated.

The notification time of the manual driving start request notification for the driver can be determined on the basis of the manual driving recoverable time.

Result data of the learning processing in the learning processing unit 211 is stored in the storage unit 240.

The data (the learning device and/or the input and output data of the learning device) stored in the storage unit 240 includes, for example, the following data.

The safety index value data associated with the driver information and the environment information, the manual driving recoverable time (the time required to recover safe manual driving) (=optimal preceding notification time of the manual driving start request) associated with the driver information and the environment information, abnormality of the driver information, abnormality of the environment information, and recovery required time after the manual driving start request notification, and the learning devices can be stored in the storage unit 240.

The data stored in the storage unit 240 is regularly transmitted to the learning server 300.

The learning server 300 stores the data received from the mobile device 200 in the storage unit 304, and the learning data generation unit 301 performs the learning processing based on the received data.

The learning server 300 receives a large amount of data from a large number of mobile devices (automobiles) and can perform learning processing based on the large amount of data. As a result, the input and output data (learning device) with high versatility and high reliability can be obtained.

The learning server 300 updates the learning device by the learning processing based on the large amount of data and stores the learning device in the storage unit 304 of the learning server 300.

The learning device stored in the storage unit 304 of the learning server 300 includes data similar to the above-described data stored in the storage unit 240 of the mobile device 200. That is, the learning device, the safety index value data associated with the driver information and the environment information, the manual driving recoverable time (the time required to recover safe manual driving) (=optimal preceding notification time of the manual driving start request) associated with the driver information and the environment information, and the abnormality of the driver information, abnormality of the environment information, and recovery required time after the manual driving start request notification can be stored in the storage unit 304 of the learning server 300.

The learning device stored in the storage unit 304 of the learning server 300 is provided to the mobile device 200, as needed, and is used to calculate, for example, the safety index value and the manual driving recoverable time based on the driver information acquired by the driver information acquisition unit 201 and the environment information acquired by the environment information acquisition unit 202, in the safety determination processing unit 212 of the safety determination unit 210 of the mobile device 200.

Note that the learning processing unit 211 can generate a learning device capable of predicting the safety index value and the manual driving recoverable time associated with an individual person, automobile (vehicle type or the like), or time by including the personal identification information, vehicle type information, time information, or the like in the learning data.

The personal identification information can be acquired via the personal authentication processing unit 213.

The vehicle type information can be acquired from the environment information acquisition unit 202. Alternatively, a configuration of using data stored in advance in the storage unit may be adopted.

The safety determination processing execution unit (manual driving recoverable time estimation unit) 212 applies the learning device calculated as a result of the learning processing by the learning processing unit 211 to acquire the manual driving recoverable time, and issues the manual driving recovery request notification based on the acquired manual driving recoverable time.

Moreover, the learning processing unit 211 acquires driving operation information of the driver after the notification from the driver information acquisition unit 201 and the environment information acquisition unit 202, and determines whether or not normal driving is being executed.

The learning device is updated and/or relearned such that the notification time is advanced in the case where the frequency of abnormalities is high and the notification time is delayed in the frequency of abnormalities is low on the basis of the determination, for example. The notification time control can be performed in accordance with the driver and a health state at that time by the update and/or relearning processing.

In the latter half, the case of using the learning server has been described. However, actual processing sharing and handling classification of personalized information differs depending on an allowable bandwidth of the communication capacity, the processing capability of the server side, the processing capability of the vehicle-mounted learning device, and the like, and are mere example, and does not limit the processing performed on the infrastructure side.

Next, a specific example of the processing of estimating the manual driving recoverable time executed in the safety determination processing unit 212 of the safety determination unit 210 of the mobile device 200 will be described.

As described above, the driver can perform various types of processing (secondary tasks) during the automatic driving, and the arousal level greatly varies depending on the secondary task being executed.

For example, there are a case where the driver is looking at the front of the vehicle while the driver is merely releasing a steering wheel, similarly to the case of driving, a case where the driver is reading a book, and a case where the driver falls asleep. The arousal level (consciousness level) of the driver varies depending on the difference in these types of processing.

For example, falling asleep reduces the driver's arousal level. That is, the consciousness level is lowered. In such a state where the arousal level is lowered, normal manual driving cannot be performed, and if the mode is switched to the manual driving mode in the state, an accident may occur in the worst case.

Therefore, to execute the processing of estimating the manual driving recoverable time in the safety determination processing unit 212, it is favorable that the driver information acquisition unit 201 acquires information by which a secondary task execution situation of the driver at the time of executing the automatic driving is confirmable, and the learning processing unit 211 performs the learning processing using the acquired data.

As a configuration of the driver information acquisition unit 201 for this purpose, it is favorable to include a camera installed for observing the inside of the vehicle, a pressure sensor installed in the steering wheel or the seat, a temperature sensor, and the like.

The learning processing unit 211 calculates results of face authentication, head posture estimation, line-of-sight estimation, body posture estimation, and action identification, using an image obtained from the camera, and uses these data for the learning processing.

At the time of executing the secondary task, it is managed in the form that additional information is given so that it is the input information acquired in the automatic driving state. When recovering from the secondary task, it is necessary to presenting information to the driver at timing before the recoverable time calculated by some method, and to return to the manual driving state. At the time when there is not enough data to estimate the manual driving recoverable time, it is necessary to issue the recovery notification at a time when the recovery is surely possible. Information is presented using a fixed definition time that does not depend on the information because the characteristics of the individual are unlearned. This fixed definition time for recovering at a target success ratio may be set using statistical data obtained by, for example, statistically evaluating the actual usage data of various driver populations, acquiring the time when the evaluation users can be successfully take over a certain ratio in advance, and learning the driver population average of the recovery delay time collected in advance in offline or the like.

In addition, since the user who uses the system for the first time is cautious in using this fixed time, offset settings may be performed in consideration of the characteristics.

At that time, the time from the presentation of the information to recovery to the manual driving is measured every time a takeover event occurs, and is recorded as a record log as the manual driving recoverable time.

Furthermore, when determining recovery to the manual driving, the prior learning result may be referred to. By repeating similar procedure, it is possible to collect data for estimating the recoverable time of a specific individual and vehicle.

In the case where enough data for safety index value estimation and manual driving recoverable time estimation are collected, for example, it is possible to construct a learning device that predicts the safety index value and the optimal recoverable time by machine learning processing using the following input and output data.

Input: driver information, environmental information, and the like.

Output: Safety index value and manual driving recoverable time

Furthermore, uniquely authenticated unique recovery characteristics may have different recovery times depending on the driver's past driving experience and environmental conditions. The time to start recovery and required for recovery is not unique according to situations such as, for example, poor visibility in rainy weather, nighttime conditions, visual impairment under backlight, accumulated fatigue in early morning and evening, or depending on the situation such as behavior when using a private car when commuting, vehicle characteristics of large crew bus and cargo loading vehicle, even if the same driver. Many of these situation factors are examples, and these factors are roughly classified into two groups and they are collectively referred to as "driver information" and "environmental information", respectively.

The LDM information provision server 310 includes a requested recovery ratio (RRR) information attached local dynamic map (LDM) generation and update unit 311 and a communication unit 312.

The RRR information attached LDM generation and update unit 311 generates or updates RRR information attached LDM obtained by adding RRR information for each road section to the LDM including an information group of a plurality of types (type 1 to type 4) of hierarchical layers described above with reference to FIG. 1, and transmits the RRR information attached LDM to the mobile device 100 via the communication unit 312.

That is, the LDM information provision server 310 generates and updates, as needed, the LDM to which the requested recovery ratio (RRR) that is a target success ratio for recovery from the automatic driving to the manual driving is added as information for each road section, that is, the RRR information attached local dynamic map (LDM), and provides the generated LDM to the mobile device 100.

Figure 12:
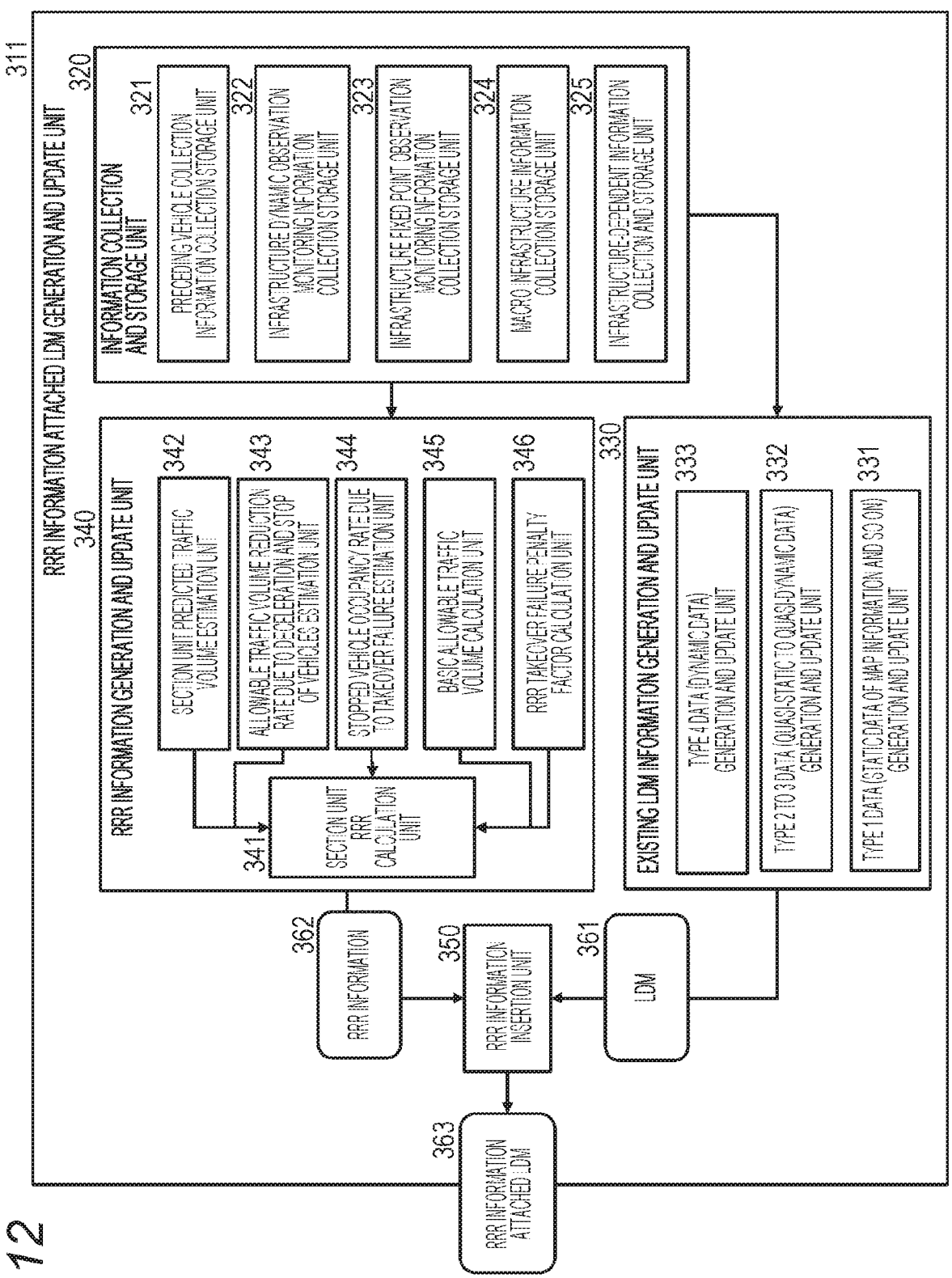
FIG. 12 is a diagram for describing a specific configuration example of an RRR information attached LDM generation and update unit of an LDM information provision server.

FIG. 12 illustrates a specific configuration example of the RRR information attached LDM generation and update unit 311 of the LDM information provision server 310.

The RRR information attached LDM generation and update unit 311 includes, as illustrated in FIG. 12, an information collection storage unit 320, an existing LDM information generation and update unit 330, an RRR information generation and update unit 340, and an RRR information insertion unit 350.

As illustrated in FIG. 12, the information collection storage unit 320 includes a preceding vehicle collection information collection storage unit 321, an infrastructure dynamic observation monitoring information collection storage unit 322, an infrastructure fixed point observation monitoring information collection storage unit 323, a macro infrastructure information collection storage unit 324, an infrastructure-dependent information collection and storage unit 325.

The above-described configuration units performs processing of collecting and storing information necessary for generating and updating the existing LDM including a plurality of layers described above with reference to FIG. 1 and information necessary for calculating the requested recovery ratio (RRR) that is a target success ratio for recovery from the automatic driving to the manual driving.

The preceding vehicle collection information collection storage unit 321 collects and stores information from the vehicle traveling in each road section. The infrastructure dynamic observation monitoring information collection storage unit 322 collects and stores information collection vehicle (probe car) traveling in each road section, for example. The infrastructure fixed point observation monitoring information collection storage unit 323 collects and stores information from cameras and sensors installed in each road section, for example. The macro infrastructure information collection storage unit 324 collects and stores traffic jam information and accident information provided by a traffic information provision server, for example. The infrastructure-dependent information collection and storage unit 325 collects and stores various pieces of external information that affects road traffic, such as map information, and weather information, for example.

The above-described information are the information necessary for generating and updating the existing LDM including a plurality of layers described above with reference to FIG. 1 and the information necessary for calculating the requested recovery ratio (RRR) that is a target success ratio for recovery from the automatic driving to the manual driving.

The existing LDM information generation and update unit 330 inputs the information in the information collection storage unit 320 and generates the existing local dynamic map (LDM). As illustrated in FIG. 12, the existing LDM information generation and update unit 330 includes a type 1 data (static data such as map information) generation and update unit 331, a type 2 and 3 data (quasi-static to quasi-dynamic data) generation and update unit 332, and a type 4 data (dynamic data) generation and update unit 333.

These configuration elements receive the information of the information collection storage unit 320 as inputs and generate the local dynamic map (LDM) including an information group of a plurality of types (types 1 to 4) of hierarchical layers described above with reference to FIG. 1.

The RRR information generation and update unit 340 receives the information from the information collection storage unit 320 as inputs, calculates the requested recovery ratio (RRR) from the automatic driving to the manual driving for each road section, and updates the RRR as needed.

As illustrated in FIG. 12, the RRR information generation and update unit 340 includes a section unit RRR calculation unit 341, a section unit predicted traffic volume estimation unit 342, an allowable traffic volume reduction rate due to deceleration and stop of vehicles estimation unit 343, a stopped vehicle occupancy rate due to takeover failure estimation unit 344, a basic allowable traffic volume calculation unit 345, and an RRR takeover failure penalty factor calculation unit 346.

The section unit RRR calculation unit 341 calculates the requested recovery ratio (RRR) for each calculation section (road section) from the automatic driving to the manual driving. Parameters necessary for this calculation are acquired from the section unit predicted traffic volume estimation unit 342 to the RRR takeover failure penalty factor calculation unit 346.

The section unit predicted traffic volume estimation unit 342 receives the information of the information collection storage unit 320 as inputs, and estimates a predicted traffic volume for each RRR calculation section (road section).

The allowable traffic volume reduction rate due to deceleration and stop of vehicles estimation unit 343 receives the information of the information collection storage unit 320 as inputs, and estimates an allowable traffic volume reduction rate due to deceleration and stop of vehicles for each RRR calculation section (road section). Note that reduction in an allowable traffic volume actively varies over time due to various factors such as shifted to rush hour due to situational changes, occurrence of unexpected events, blocking some lanes on the road by flying objects such as falling rocks and blasts, other than accidents, even if a road maintenance scheduled time normally avoids snowfall and rush hours when traffic is heavy, such as late at night.

The stopped vehicle occupancy rate due to takeover failure estimation unit 344 receives the information of the information collection storage unit 320 as inputs, and estimates a stopped vehicle occupancy rate due to takeover failure for each RRR calculation section (road section).

The basic allowable traffic volume calculation unit 345 receives the information of the information collection storage unit 320 as inputs, and calculates a basic allowable traffic volume for each RRR calculation section (road section).

The RRR takeover failure penalty factor calculation unit 346 receives the information of the information collection storage unit 320 as inputs, and calculates a takeover failure penalty factor for each RRR calculation section (road section). Note that the takeover failure penalty factor is a penalty element that imposes on the driver in the case where the driver of a vehicle fails to take over from the automatic driving to the manual driving, and is, for example, a mode of setting a penalty similar to general traffic violation, such as a predetermined training session, a fine, and a driver license suspension. The penalty factor is set for each RRR calculation section (road section). For example, in a section where a heavy traffic jam occurs due to occurrence of a vehicle failing to take over from the automatic driving to the manual driving, the penalty factor is set to have a large value. Meanwhile, in a section where a heavy traffic jam does not occur due to occurrence of a vehicle failing to take over from the automatic driving to the manual driving, the penalty factor is set to have a small value.

The section unit RRR calculation unit 341 calculates the requested recovery ratio (RRR) for each calculation section (road section), using the parameters acquired from the section unit predicted traffic volume estimation unit 342 to the RRR takeover failure penalty factor calculation unit 346. That is, the section unit RRR calculation unit 341 calculates the requested recovery ratio (RRR) from the automatic driving to the manual driving for each section.

The RRR information insertion unit 350 inserts RRR information 362 that is the requested recovery ratio (RRR) for each road section generated by the RRR information generation and update unit 340 to a local dynamic map (LDM) 361 generated by the existing LDM information generation and update unit 330 to generate an RRR information attached LDM 363, and transmits the RRR information attached LDM 363 to each vehicle via the communication unit 312.

Note that the RRR information 362 that is the requested recovery ratio (RRR) for each road section generated by the RRR information generation and update unit 340 is inserted as data of type 3 or type 4, for example, in the configuration data of the local dynamic map (LDM) having the hierarchical configuration described above with reference to FIG. 1.

Note that the requested recovery ratio (RRR) for each road section is updated as needed according to a change in the road conditions or the like.

The RRR information attached LDM 363 generated by the RRR information insertion unit 350 is distributed to each vehicle traveling on the road.

Note that the LDM information provision server 310 may be set to individually distribute, to an automobile, the local dynamic map (LDM) 361 generated by the existing LDM information generation and update unit 330 and the RRR information 362 that is the requested recovery ratio (RRR) for each road section generated by the RRR information generation and update unit 340.

Figure 13:
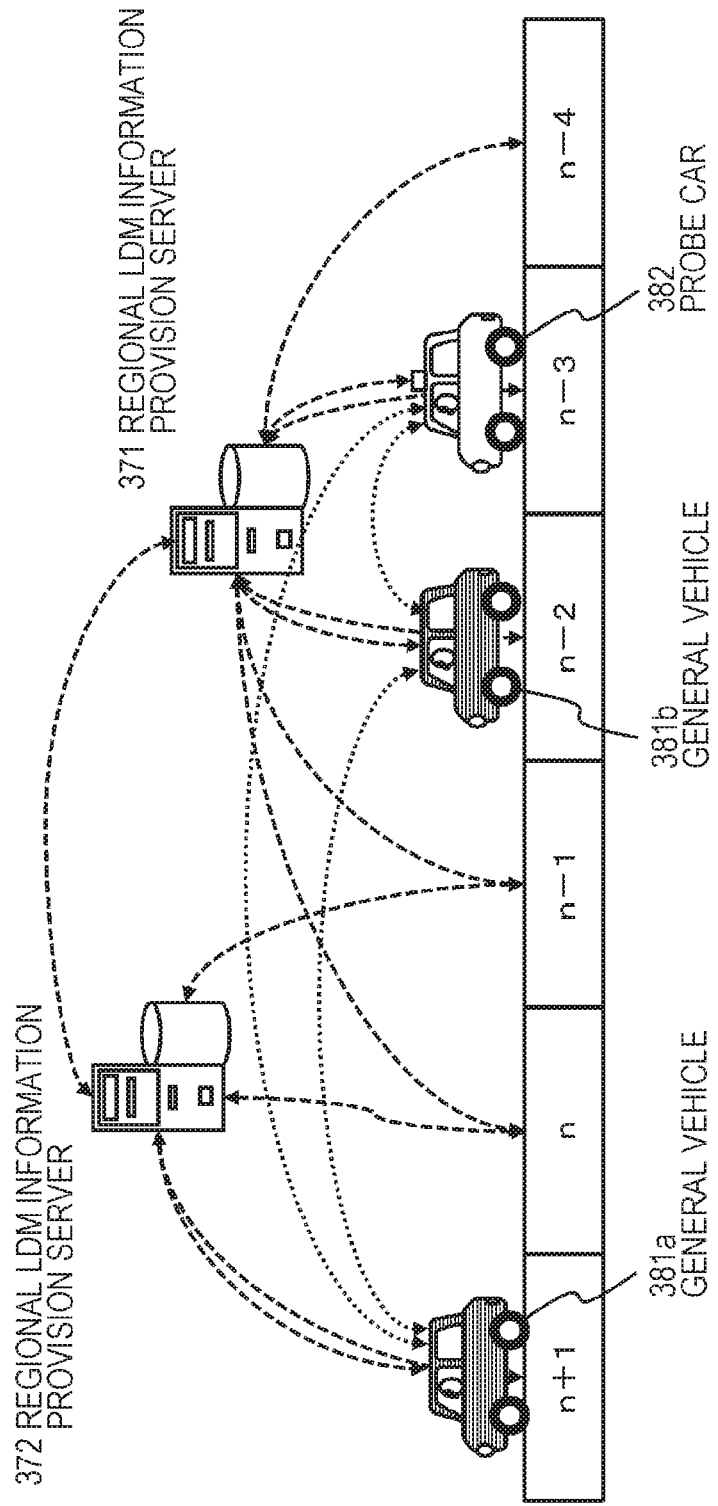

FIG. 13 illustrates an example of a distribution configuration of the RRR information attached LDM and an information collection configuration example for generating the RRR information attached LDM. FIG. 13 illustrates a plurality of automobiles traveling on the road divided into predetermined sections (segment sections (n−4) to (n+1)). Each section (segment) corresponds to a calculation section of the requested recovery ratio (RRR). A plurality of general vehicles 381a, 381b, and the like is traveling on the road. Furthermore, a probe car 382, which is an information collector, is also traveling.

Regional LDM information provision servers 371 and 372 are servers that respectively generate and update LDMs of predetermined areas in charge thereof and provide the LDMs to each vehicle. Note that, in the configuration of the present disclosure, each of the regional LDM information provision servers 371 and 372 has the configuration described above with reference to FIG. 12, and generates the RRR information attached LDM and distributes the RRR information attached LDM to each vehicle.

A dotted line illustrated in FIG. 13 represents an example of a communication path of information between the configuration elements. Note only the communication paths through which the RRR information attached LDM is provided from the regional LDM information provision servers 371 and 372 to each vehicle but also communication paths for generating and updating the latest RRR information attached LDMs by the regional LDM information provision servers 371 and 372 are illustrated.

The regional LDM information provision servers 371 and 372 have the configuration described above with reference to FIG. 12. That is, the information collection storage unit 320 is included, and the preceding vehicle collection information collection storage unit 321, the infrastructure dynamic observation monitoring information collection storage unit 322, the infrastructure fixed point observation monitoring information collection storage unit 323, the macro infrastructure information collection storage unit 324, and the infrastructure-dependent information collection and storage unit 325 are included.

A part of the communication paths for acquiring each information of the aforementioned units is a dotted line illustrated in FIG. 13.

Note that it is also possible that the general vehicle and the probe car can execute vehicle-to-vehicle communication and can perform the processing of updating the RRR information attached LDM on the basis of received data.

[7. Information Processing Sequence Executed by Mobile Device, Information Processing Device, or Server of Present Disclosure]

Next, an information processing sequence of the present disclosure executed in the mobile device, the information processing device, or the server will be described.

First, a sequence example of the learning processing executed in the learning processing unit 211 of the mobile device 200 or the learning processing unit 302 of the learning server 300 described above with reference to FIG. 11 will be described with reference to the flowchart illustrated in FIG. 14.

As described above, the learning processing unit 211 of the mobile device 200 and the learning processing unit 302 of the learning server 300 construct the learning device capable of calculating the "safety index value" and the "manual driving recoverable time estimation value" corresponding to the "driver information" and "environmental information" is constructed.

First, in step S31, the "driver information" and "environmental information" are input.

Next, in step S32, the time from the manual driving start request notification time to the start of the manual driving is measured.

Next, in step S33, the operation information of the driver after the start of the manual driving is acquired from the driver information acquisition unit, and the safety index value according to whether or not a safe operation is being performed is calculated. As described above, the driver information acquisition unit 12 has the function to acquire the operation information of the driver, that is, the operation information of the operation units (the steering wheel, accelerator, brake, and the like), in addition to the processing of acquiring information for determining the arousal level of the driver.

Note that, in the safety index value calculation processing in step S33, the processing of calculating the safety index value may be performed using not only the operation information of the driver but also, for example, specific event handling information and accident information. For example, the safety index value may be calculated using not only the "driver information" and "environment information" but also accident information corresponding to time and road information. The event handling information is information obtained by continuously and comprehensively evaluating steering stability of a change in generated acceleration when correcting fluctuation amplitude or steering, such as whether or not steering wheel operation for correction is performed at appropriate timing when the vehicle starts to deviate from the lane, whether or not there is a delay in regular observation, whether or not over-correction operation has occurred, or whether or not occurrence of correction interval becomes irregular, for example, through continuous monitoring of the driving steering situation as an accurate steering judgment evaluation level of the driver. The system passively monitoring and analyzing the steering stability of the driver with respect to the steering device is one of methods for monitoring the driver, which have been conventionally used for estimating reduction in driving quality of the driver, such as the fatigue level or drowsiness of the driver. However, if the uniform passive monitoring is used for short-term recovery quality evaluation of the driver's arousal level in the automatic driving, the driver intervention varies depending on a difference in monotonicity of the road or an emergency level at a takeover request point. Therefore, the steering correction stability may be further confirmed by appropriately injecting an operation noise requiring the driver to respond at the takeover point, and detecting an active reflex response.

Once the system begins to give the driver control of the vehicle system, the driver performs steering intention inputs to the steering wheel, brake, and accelerator. Therefore, as can be seen in the above corrected steering of the steering wheel, the system can begin to evaluate a difference between ideal speed driving control within an allowable range as normal traveling, which can be determined to be desirable in steering by the system, and the control by the driver. Therefore, quantitative evaluation of the arousal recovery level of the driver becomes possible from the steering appropriateness of the driver. The system completes the steering intervention at a stage where the system control is entrusted to the driver. As a result, the system obtains a log data set of the history of the "driver information" and "environment information" such as the driver state, vehicle state, environmental state before the start of the takeover, success or failure of the takeover, an actual delay time required for normal takeover, a recovery behavior characteristic change curve required for complete recovery, and the like.

In next step S34, an elapsed time (manual driving recoverable time) from the notification time to the manual driving start time, which is necessary for making the safety index value be a fixed value or more (safe), the safety index value being based on the operation information after the start of the manual driving, is calculated.

In next step S35, the input and output data including correspondence data of the input information (driver information, environment information, and the like), the safety index value, and the manual driving recoverable time, is generated, and the learning device is updated.

The processing of steps S31 to S35 is repeatedly executed, and the learning device configured using the correspondence data of the input information (driver information, environment information, and the like), the safety index value, and the manual driving recoverable time, is sequentially updated, using large amount of the learning data.

Processing in step S36 is processing in the case where the learning device is constructed by the learning processing unit 302 of the learning server 300.

In step S36, the latest learning device generated by the learning server 300 is transmitted to the mobile device (automobile).

By the learning processing illustrated in FIG. 14, correspondence data of the safety index value and the manual driving recoverable time, and correspondence data of the recovery delay time and the recovery ratio can be generated. A specific example of these data is illustrated in FIGS. 15A and 15B.

Figure 15B:
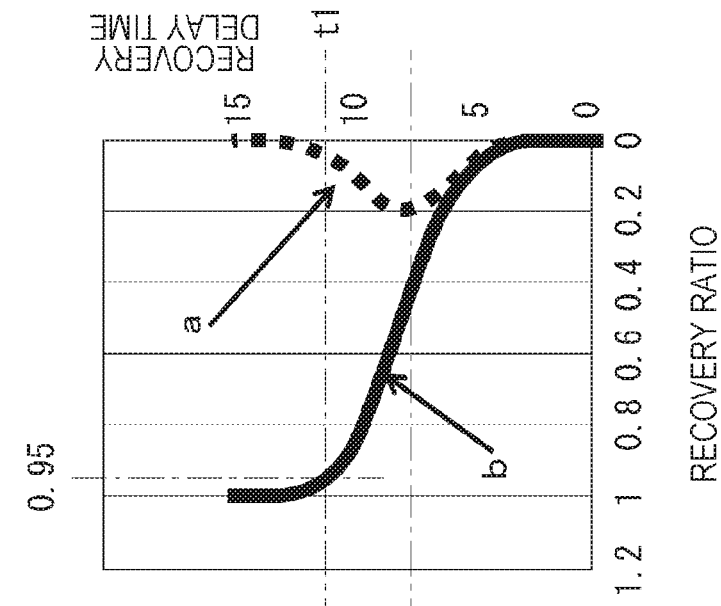
FIGS. 15A and 15B are graphs for describing a distribution example of a plurality of pieces of relationship information (observation plots) between an observable evaluation value corresponding to an observation value and a recovery delay time (=manual driving recoverable time), and a recovery ratio.
Figure 15A:
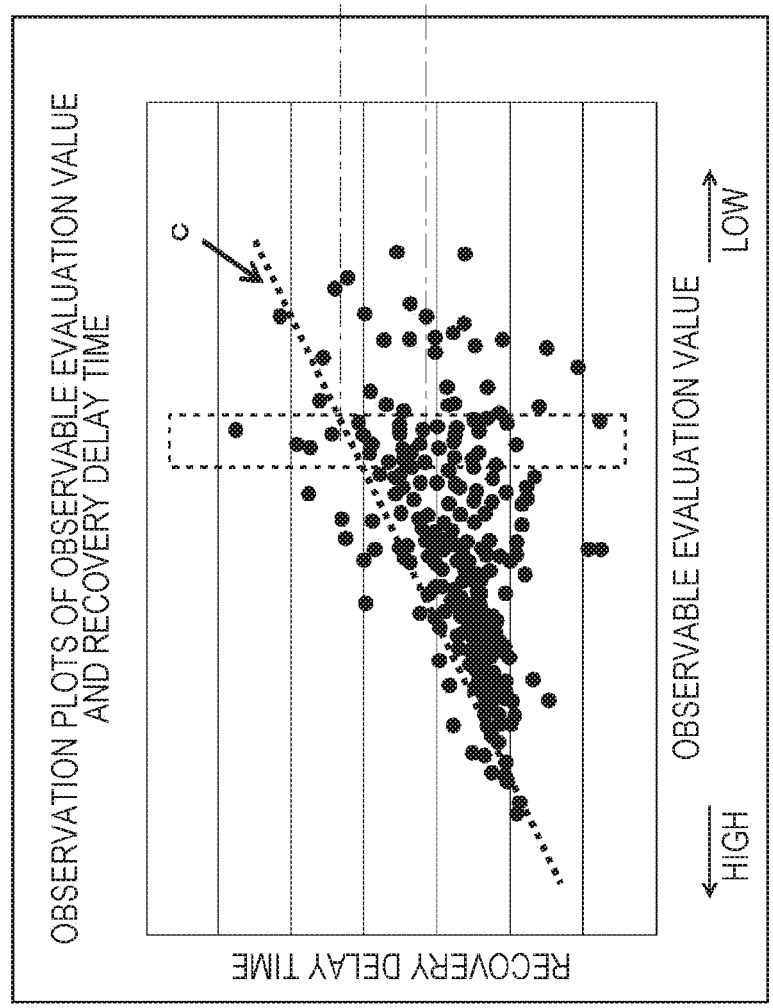

FIG. 15A illustrates an example of distribution of a plurality of pieces of relationship information (observation plots) between the observable evaluation value corresponding to an observation value and the recovery delay time (=manual driving recoverable time). This example corresponds to a type of a certain secondary task of a certain driver. To calculate the recovery delay time from the plurality of pieces of relationship information (observation plots), the relationship information (observation plot) in an area (illustrated by the broken-line rectangular frame) having a certain width in an evaluation value direction corresponding to the acquired observation value is extracted. A dotted line c in the figure represents a boundary line of when the recovery delay time at which the recovery ratio is 0.95 in FIG. 15B described below is observed with different observation values of the driver.

By issuing the recovery notification from the automatic driving to the manual driving or an alarm to the driver for a longer time, that is, in an earlier time, than the dotted line c, the driver's successful recovery from the automatic driving to the manual driving is secured at the ratio of 0.95 or higher.

FIG. 15B illustrates a relationship between the recovery delay time and the recovery ratio obtained from the plurality of pieces of extracted relationship information (observation plots). Here, a curve a illustrates an independent success ratio at each recovery delay time, and a curve b illustrates a cumulative success ratio at each recovery delay time. In this case, a recovery delay time t1 is calculated such that the success ratio becomes a predetermined ratio, that is, the success ratio becomes 0.95 in the illustrated example, on the basis of the curve b.

This calculation processing is executed in the safety determination unit 210 described above with reference to FIG. 11, for example. For example, the calculation processing is performed in the safety determination unit 210, using the distribution information of the plurality of pieces of relationship information (observation plots) between the observable evaluation value and the recovery delay time stored in and acquired from the storage unit 240 in the past.

The above-described requested recovery ratio (RRR) that is a target success ratio for recovery from the automatic driving to the manual driving corresponds to the recovery ratio illustrated in the graph in FIG. 15B.

In the configuration of the present disclosure, a requested recovery ratio (RRR) that is a target success ratio for recovery from automatic driving to manual driving is set for each road section, and the timing of the recovery request notification to the manual driving for an automatically driving vehicle is controlled according to the requested recovery ratio (RRR).

For example, in the section where the success ratio of 95% is required, that is, in the setting section of RRR=0.95, the recovery delay time t1 corresponding to an intersection of the line of the recovery ratio=0.95 and the curve b illustrated in FIG. 15B is obtained, the recovery delay time t1 is acquired, and the recovery request notification is issued to the driver at a time earlier by the recovery delay time t1 than the time to enter the manual driving start section. The recovery notification is issued by the display processing, the alarm output, or the like described above with reference to FIG. 3, for example.

Figure 16:
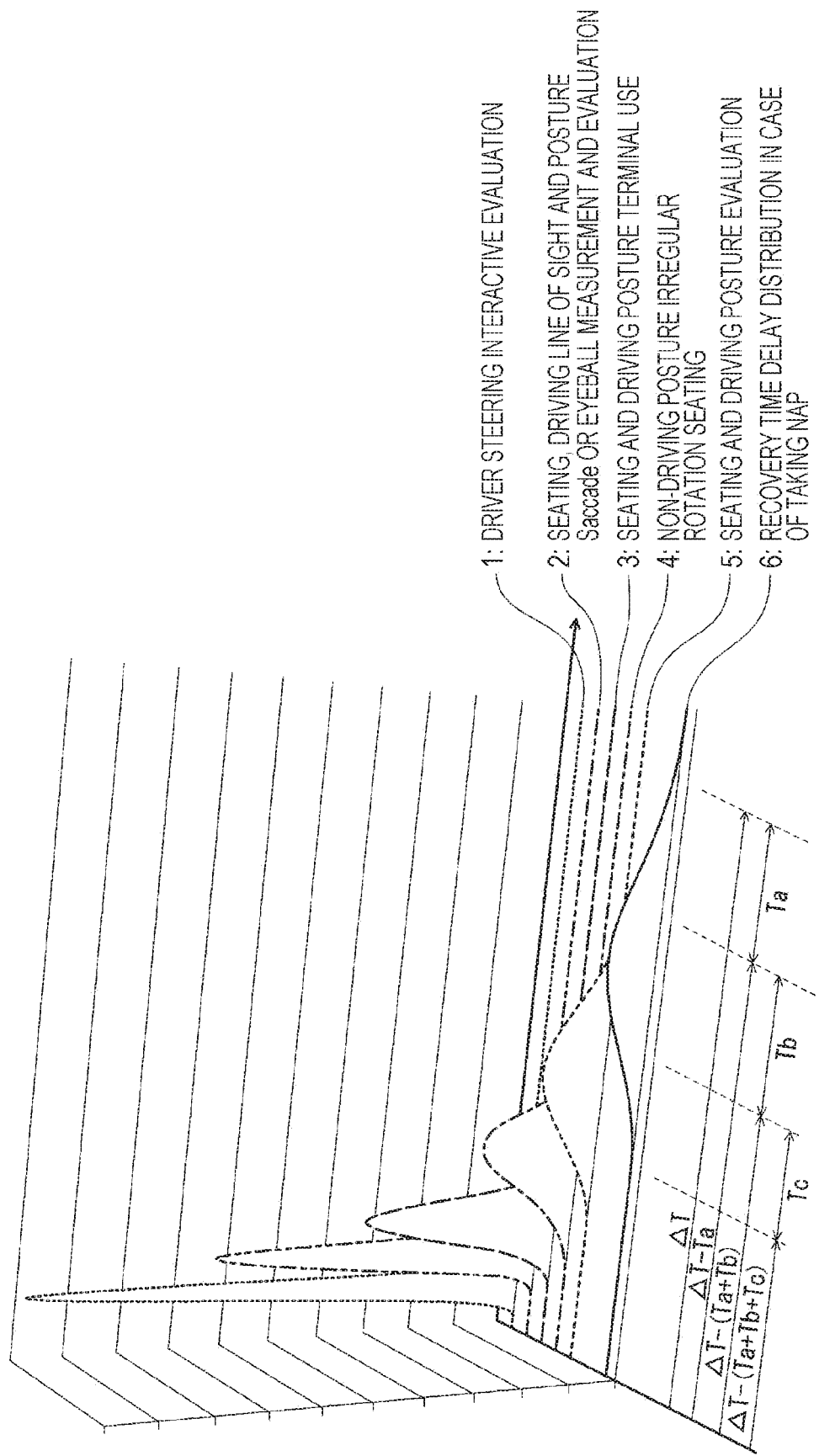
FIG. 16 is a graph for describing a manual driving recoverable time according to a type of processing (secondary task) executed by a driver in the automatic driving mode.

FIG. 16 is a graph for describing the manual driving recoverable time according to a type of processing (secondary task) executed by the driver in the automatic driving mode when the driver is detached from the driving and steering operation.

Each distribution profile corresponds to the curve a illustrated in FIG. 15B, which is predicted on the basis of the observed value, that is, the driver information indicating the driver state. That is, to complete the takeover from the automatic driving to the manual driving at the takeover point with a necessary recovery ratio, whether or not a state actually reaches a necessary state required for recovery at each recovery stage is monitored until the takeover is completed on the basis of the time t1 when the profile (the recovery ratio profile in FIG. 15B) becomes a desired value by reference to the past characteristics required for the driver to recover, according to the content of the secondary task being executed or histories before and after recovery, for example, from observation values capable of evaluating the arousal level of the driver detected at each stage.

For example, the initial curve in the case of taking a nap has cumulative average distribution in the case of estimating a sleep level from observation information such as breathing and pulse waves that are passively monitored during the nap period in the automatic driving, and viewing recovery delay characteristics of the driver after issuing a wakeup alarm. Each halfway distribution is determined according to the driver information indicating the driver's state observed after the driver wakes up and in a subsequent movement recovery procedure. "6. In the case of taking a nap" illustrated in the drawing is observed and the right timing in time for the wakeup alarm is determined, and a halfway process thereafter shows the recovery time distribution in a recovery budget predicted from an observable driver state evaluation value at a predicted intermediate point.

Observation as to not violating a remaining takeover time limit, which gradually decreases until the takeover, is continued halfway, and in the case where there is a violation risk, the vehicle is decelerated, and a time delay is generated, for example. Note that, for example, regarding distribution of recovery starting from "4. Non-driving posture irregular rotation seating" without the steps of "6. In the case of taking a nap" and "5. Seated", the process of recovery starts from initial situation recognition grasping. Therefore, in the case of starting from the situation recognition in the "4. Non-driving posture irregular rotation seating" posture from the beginning, the time to recognize the situation is long. Whereas in the state of "4. Non-driving posture irregular rotation seating" posture as an on-going process starting from "6. In the case of taking a nap", the thinking process is in a recovery consciousness process even through the item is the same.

As described above, the recovery delay time for obtaining a predetermined recovery ratio significantly varies according to the driver state (driver information) reflecting the arousal level of the driver. The data processing unit of the information processing device of the present disclosure calculates the manual driving recoverable time, using the learning data for each driver and for each driver state (driver information) reflecting the arousal level of the driver. The learning data is, for example, correspondence data between the recovery delay time from the automatic driving to the manual driving and the recovery ratio illustrated in FIG. 15B, for example.

Note that the relationship information between the observable evaluation value and the recovery delay time of the driver currently driving may not be sufficiently stored in the storage unit. In that case, for example, recovery characteristic information generated on the basis of information collected from driver population of the same age group is stored in the storage unit, and the recovery delay time t1 can be calculated using the recovery characteristic information as assumed distribution information of recovery provided in advance. In the recovery information, the driver specific characteristics have not sufficiently been learned. Therefore, the same recovery ratio may be used on the basis of the information, or a higher recovery ratio may be set. Note that an ergonomically inexperienced user is expected to recover early in the beginning of use because the user is cautious. Then, the driver himself/herself adapts to the action in accordance with the notification of the system as he/she gets accustomed to the system. Note that, in the case of using different vehicles in logistics business that operates many vehicles, in vehicle operation business that operates buses, taxis, or the like, or sharing cars and rental cars, personal authentication of the driver is performed, the observable information and recovery characteristics of driving are managed and learned in a concentrated or distributed manner on a remote server or the like, and the data of the recovery characteristics is not necessarily stored in the individual vehicles and may be remotely learned and processed, and stored.

Furthermore, because the notification timing is important, the recovery ratio has been described using the uniform time to success or failure. However, the success or failure from the automatic driving to the manual driving is not limited to the binary success or failure, and determination further extended to recovery takeover quality may be made. That is, delay time of recovery procedure transition to actual recovery confirmation, recovery start delay to the notification, stagnation in a halfway recovery operation, and the like within allowed time may be further input to the learning device as recovery quality evaluation values.

As described above with reference to FIGS. 15A and 15B, as the data generated by the learning processing according to the flowchart in FIG. 14, the correspondence data of the safety index value and the manual driving recoverable time, and the correspondence data of the recovery delay time and the recovery ratio can be generated.

The information processing device according to the present disclosure calculates and determines the timing of the recovery request notification to the manual driving for the automatically driving vehicle, using the correspondence data of the recovery delay time and the recovery ratio generated by the learning processing according to the flowchart in FIG. 14 and the requested recovery ratio (RRR) for each road section included in the local dynamic map (LDM).

A specific example will be described with reference to FIGS. 17A and 17B.

Figure 17A:
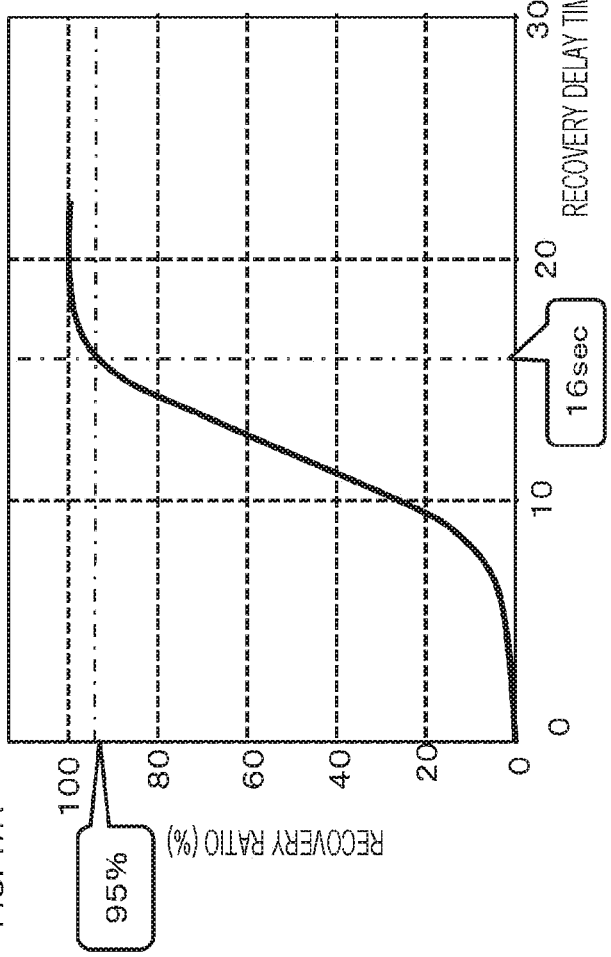
FIGS. 17A and 17B are graphs for describing a specific example of processing of calculating switching notification timing from automatic driving to manual driving.

FIG. 17A is the correspondence data of the recovery delay time and the recovery ratio of a certain driver generated by the learning processing according to the flowchart in FIG. 14.

Note that the correspondence data of the recovery delay time and the recovery ratio is different data for each driver, and also depending on the driver's state in the automatic driving (for example, during a nap, working, looking ahead, or the like). The data (the correspondence data of the recovery delay time and the recovery ratio) corresponding to each of the above states is generated by the learning processing according to the sequence described with reference to FIG. 14.

When performing the processing of determining the timing of the recovery request notification to the manual driving for the automatically driving vehicle, the information processing device acquires the identification information of the current driver, and the driver information indicating the driver state of the driver who is executing the automatic driving, and performs processing to which the learning data (the correspondence data of the recovery delay time and the recovery ratio) corresponding to the driver information indicating the driver state of the identified driver is applied.

The data illustrated in FIG. 17A is data generated by the learning processing for a certain driver, and is data (correspondence data of the recovery delay time and the recovery ratio) corresponding to the case where the driver is working while using the terminal in the sitting and driving posture.

Figure 17B:
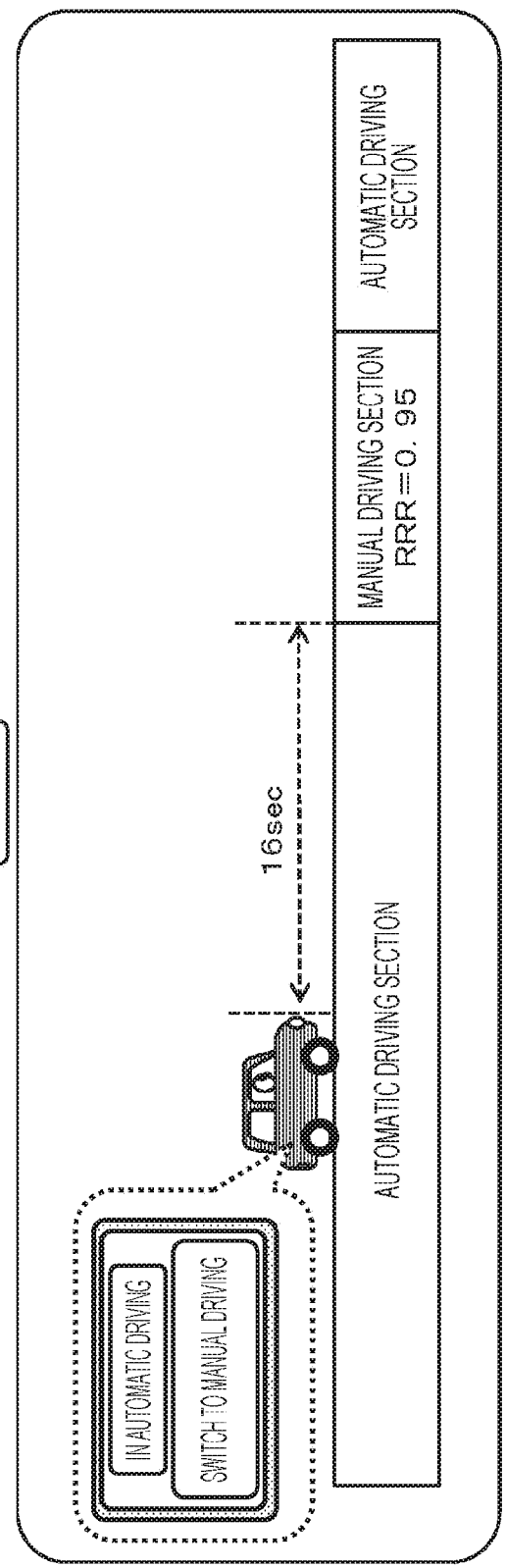

The driver who has acquired the learning data is currently traveling in a road section as illustrated in FIG. 17B. That is, the vehicle is currently traveling in the automatic driving section, and next to the traveling automatic driving section, a manual driving section in which the requested recovery ratio (RRR)=0.95 is set is present. The section information and the requested recovery ratio (RRR) are information acquirable from the RRR information attached LDM.

Note that the driver is working while using the terminal in a sitting and driving posture.

In such a setting, the information processing device in the mobile device (automobile) that the driver is driving acquires the driver information indicating the driver state of the driver who is currently executing the automatic driving, and further performs the processing of determining the timing of the recovery request notification to the manual driving for the automatic driving vehicle, applying the learning data (correspondence data of the recovery delay time and the recovery ratio in FIG. 17A) corresponding to the driver information indicating the driver state of the identified driver.

In the illustrated example, the manual driving section in which the requested recovery ratio (RRR)=0.95 (95%) is set is present next to the automatic driving section in which the driver's vehicle is traveling.

The data processing unit of the information processing device acquires the recovery delay time of the case where the recovery ratio=0.95 (=95%) of the correspondence data of the recovery delay time and the recovery ratio illustrated in FIG. 17A. In the illustrated example, the recovery delay time is 16 seconds in the case where the recovery ratio=0.95 (=95%). The data processing unit of the information processing device determines timing 16 seconds before the automobile enters the manual driving section as the timing of the recovery request notification to the manual driving, on the basis of the acquired data (16 seconds), and executes the recovery request notification at the determined timing. This notification is executed by, for example, output of the display data or the alarm described with reference to FIG. 3, or the vibration processing for the seat, steering wheel, or the like.

Note that, to determine the timing 16 seconds before the automobile enters the manual driving section as the timing of the recovery request notification to the manual driving by the information processing device, speed information of the automobile during execution of the automatic driving is necessary. The information processing device acquires the speed information during the automatic driving and performs the processing of determining the notification timing.

By issuing the recovery request notification to the manual driving 16 seconds before the automobile enters the manual driving section, as illustrated in FIG. 17B, the driver can start safe manual driving with the probability of 95% after 16 seconds. As a result, the driver can start the safe manual driving with the probability of 95% at the timing when the automobile enters the manual driving section set to have the requested recovery ratio (RRR)=0.95 (=95%).

As described above, the data processing unit of the information processing device of the present disclosure, for example, the safety determination unit 210 illustrated in FIG. 11 determines the timing when the time to enter a road section requiring the manual driving is equal to or larger than the manual driving recoverable time as the manual driving recovery request notification timing, and executes the manual driving recovery request notification at the determined timing.

Next, processing in the case where manual driving sections having different requested recovery ratios (RRRs) are present will be described with reference to FIGS. 18A and 18B. As illustrated in FIG. 18B, the processing is processing in the case where the manual driving section in which the requested recovery ratio (RRR)=0.50 (=50%) is set is present next to the automatic driving section in which the driver's vehicle is traveling. Note that the section information and the requested recovery ratio (RRR) are information acquirable from the RRR information attached LDM.

Note that the driver is working while using the terminal in a sitting and driving posture.

Figure 18A:
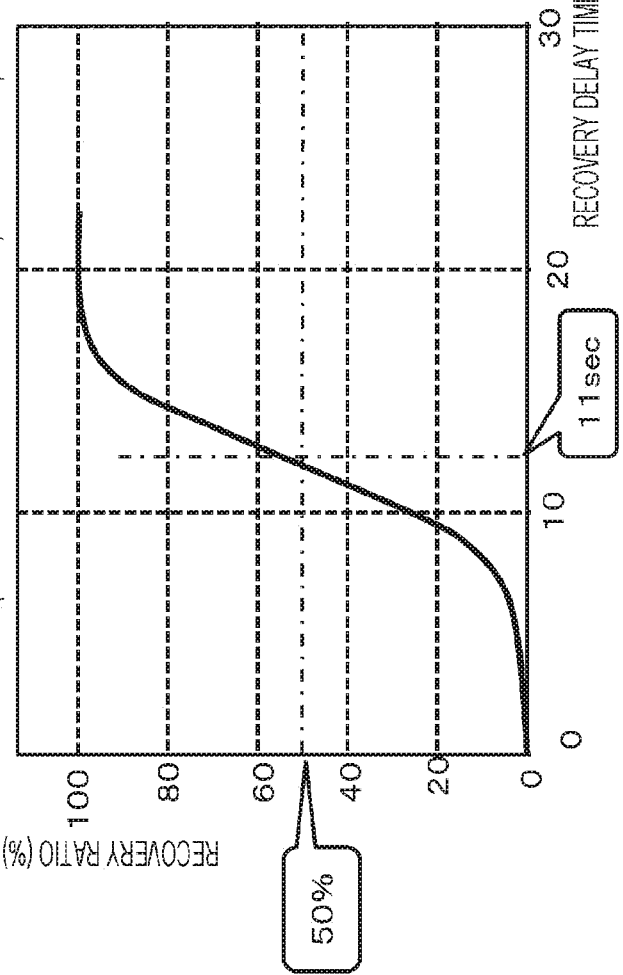
FIGS. 18A and 18B are graphs for describing a specific example of the processing of calculating switching notification timing from automatic driving to manual driving.
Figure 18B:
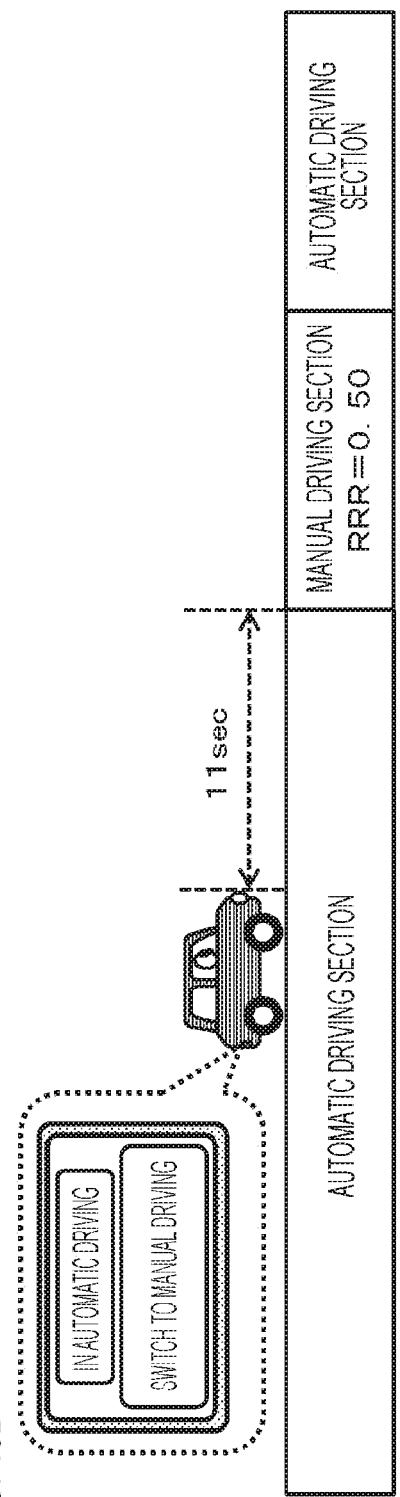

In this case, the data processing unit of the information processing device acquires the recovery delay time of the case where the recovery ratio=0.50 (=50%) of the correspondence data of the recovery delay time and the recovery ratio illustrated in FIG. 18A. In the illustrated example, the recovery delay time is 11 seconds in the case where the recovery ratio=0.50 (=50%). The data processing unit of the information processing device determines timing 11 seconds before the automobile enters the manual driving section as the timing of the recovery request notification to the manual driving, on the basis of the acquired data (11 seconds), and executes the recovery request notification at the determined timing. This notification is executed by, for example, output of the display data or the alarm described with reference to FIG. 3, or the vibration processing for the seat, steering wheel, or the like.

By issuing the recovery request notification to the manual driving 11 seconds before the automobile enters the manual driving section, as illustrated in FIG. 18B, the driver can start safe manual driving with the probability of 50% after 11 seconds. As a result, the driver can start the safe manual driving with the probability of 50% at the timing when the automobile enters the manual driving section set to have the requested recovery ratio (RRR)=0.50 (=50%).

Next, a processing example of a case where the driver's state is different from the state (working using a terminal in the sitting and driving posture) described with reference to FIGS. 17A, 17B, 18A, and 18B will be described with reference to FIGS. 19A and 19B.

As described above, when performing the processing of determining the timing of the recovery request notification to the manual driving for the automatically driving vehicle, the information processing device acquires the identification information of the current driver, and the driver information indicating the driver state of the driver who is executing the automatic driving, and performs processing to which the learning data (the correspondence data of the recovery delay time and the recovery ratio) corresponding to the driver information indicating the driver state of the identified driver is applied.

Figure 19A:
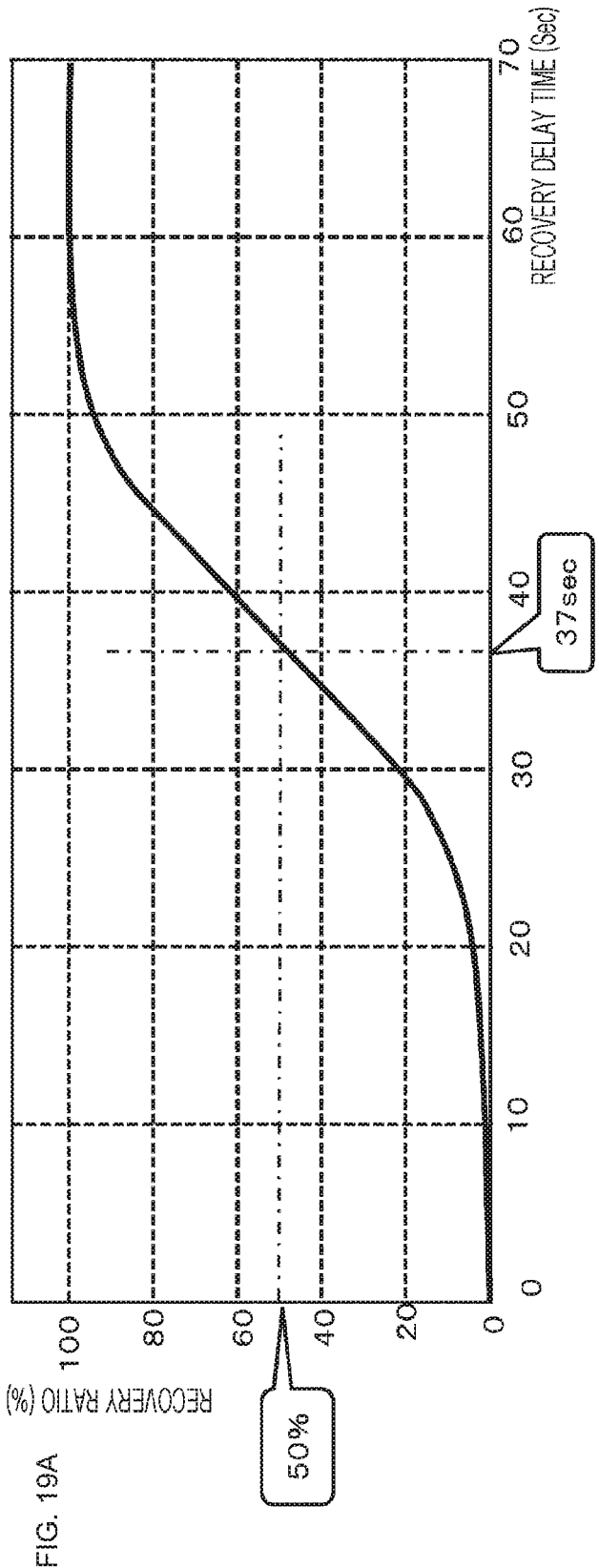
FIGS. 19A and 19B are graphs for describing a specific example of the processing of calculating switching notification timing from automatic driving to manual driving. processing of calculating switching notification timing from automatic driving to manual driving.

The data illustrated in FIG. 19A is data generated by the learning processing for a certain driver, and is data (correspondence data of the recovery delay time and the recovery ratio) corresponding to the case where the driver is taking a nap.

The graph illustrated in FIG. 19A has a gentle slope of the recovery ratio, unlike the graph illustrated in FIG. 18A. That is, in the graph illustrated in FIG. 19A, the recovery delay time for obtaining a predetermined recovery ratio is set to a longer time than the graph illustrated in FIG. 18A. This means that in the case where the driver is taking a nap, the manual driving recovery notification needs to be issued at earlier timing.

Figure 19B:
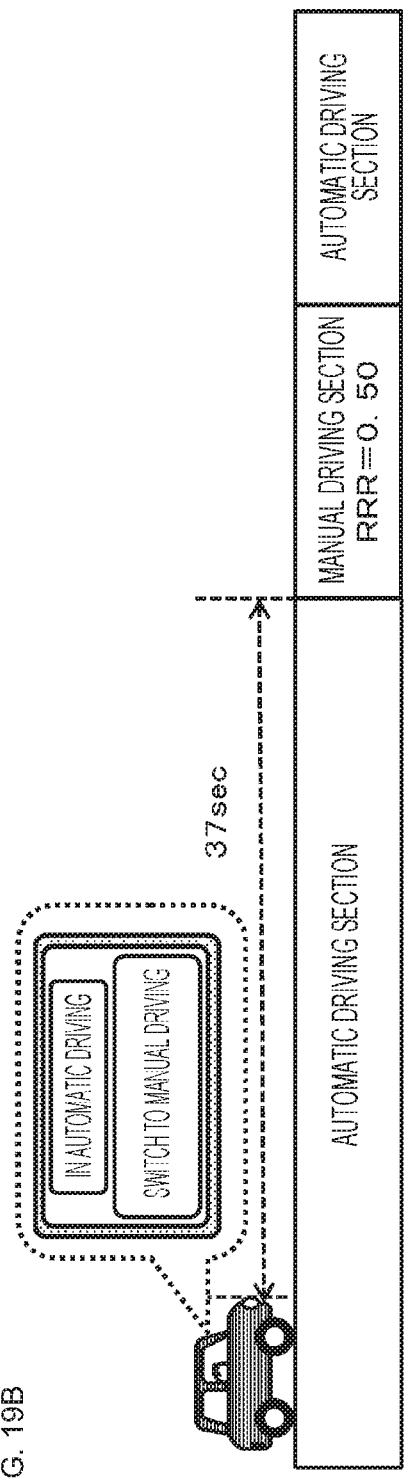

The driver of which the data illustrated in FIG. 19A is to be acquired is currently traveling in a road section as illustrated in FIG. 19B. That is, the vehicle is currently traveling in the automatic driving section, and next to the traveling automatic driving section, a manual driving section in which the requested recovery ratio (RRR)=0.50 is set is present.

The section information and the requested recovery ratio (RRR) are information acquirable from the RRR information attached LDM.

Note that the driver is taking a nap.

In this case, the data processing unit of the information processing device acquires the recovery delay time of the case where the recovery ratio=0.50 (=50%) of the correspondence data of the recovery delay time and the recovery ratio illustrated in FIG. 19A. In the illustrated example, the recovery delay time is 37 seconds in the case where the recovery ratio=0.50 (=50%). The data processing unit of the information processing device determines timing 37 seconds before the automobile enters the manual driving section as the timing of the recovery request notification to the manual driving, on the basis of the acquired data (37 seconds), and executes the recovery request notification at the determined timing. This notification is executed by, for example, output of the display data or the alarm described with reference to FIG. 3, or the vibration processing for the seat, steering wheel, or the like.

By issuing the recovery request notification to the manual driving 37 seconds before the automobile enters the manual driving section, as illustrated in FIG. 19B, the driver can start safe manual driving with the probability of 50% after 37 seconds. As a result, the driver can start the safe manual driving with the probability of 50% at the timing when the automobile enters the manual driving section set to have the requested recovery ratio (RRR)=0.50 (=50%).

Note that the timing of the recovery request notification to the manual driving calculated by the information processing device (system) being set to timing considering the shortest time when the driver can start the manual driving is one example. Moreover, a configuration to calculate timing earlier than the timing and issues the manual driving recovery notification to the driver may be adopted. It is favorable to issue the notification at earlier timing under the following situations, for example.

It is favorable to issue the notification at earlier timing under the following situations, for example:

(a) a case where the vehicle is traveling in a dangerous section with many curves in a mountain area where the driver's intervention is required;

(b) a case where it is necessary to perform steering while understanding an interrelationship with a complicated traveling vehicle near the vehicle;

(c) a case where the takeover is required in a large roundabout; and (d) a case where the vehicle is in a situation where driving by human is not easy, such as the vehicle being traveling in an environment such as at night or in a dense fog, in a vehicle driving system using a millimeter wave radar, a night vision, or the like.

Note that, in this case as well, the requested recovery ratio is a basic index used in calculating a required baseline notification time.

[8. Sequence of Processing of Acquiring and Using Local Dynamic Map (LDM) and Requested Recovery Ratio (RRR)]

Next, a processing sequence of acquiring and using a local dynamic map (LDM) and a requested recovery ratio (RRR) executed by a data processing unit of the mobile device or a data processing unit of an information processing device mounted on the mobile device will be described with reference to the flowchart in FIG. 20.

The processing of each step of the flow illustrated in FIG. 20 will be sequentially described.

(Step S101)

First, in step S101, the data processing unit of the mobile device or the data processing unit of the information processing device attached to the mobile device takes in base map information. Note that, hereinafter, the data processing unit of the mobile device or the data processing unit of the information processing device attached to the mobile device will be simply described as data processing unit.

In step S101, the data processing unit acquires the data from the local storage unit in the case where the data acquired from the local dynamic map (LDM) information provision server is stored in the local storage unit in the mobile device, for example. In the case where the data is not stored in the local storage unit, the data processing unit acquires the data from the LDM information provision server.

(Step S102)

Next, in step S102, the data processing unit checks the update information of the LDM and performs the update processing in the case where there is the update information. The update information is acquired from the local dynamic map (LDM) information provision server.

By the processing in steps S101 and S102, acquisition of the local dynamic map (LDM) including the plurality of layers of type 1 to type 4 described above with reference to FIG. 1 is completed.

(Step S103)

Next, in step S103, the data processing unit acquires a road section scheduled to travel. This is processing of acquiring a road section scheduled to travel from preset traveling route information at the time of starting the automatic driving, for example.

(Step S104)

Next, in step S104, the data processing unit makes a request to acquire the requested recovery ratio (RRR) of the road section scheduled to travel. This is an acquisition request of the requested recovery ratio (RRR) generated by the LDM information provision server as the ancillary information of the local dynamic map (LDM) acquired in steps S101 and S102.

(Step S105)

Next, in step S105, the data processing unit acquires the requested recovery ratio (RRR) of the road section scheduled to travel, and executes the data update processing of associating the requested recovery ratio (RRR) with the local dynamic map (LDM) acquired in steps S101 and S102.

Note that, in the present processing example, the setting of individually acquiring the existing local dynamic map (LDM), that is, the LDM including the data of type 1 to type 4 described with reference to FIG. 1, and the requested recovery ratio (RRR) for each road section has been described. However, the setting is an example, and a configuration in which the LDM information provision server generates an RRR attached LDM in which the requested recovery ratio (RRR) information for each road section is recorded in the LDM, and the mobile device acquires the RRR attached LDM may be adopted.

(step S106)

Next, in step S105, the data processing unit executes the processing based on the requested recovery ratio (RRR) for the road section scheduled to travel.

Specifically, as described above with reference to FIGS. 17A, 17B, 18A, 18B, 19A, and 19B, the data processing unit determines the notification timing of the manual driving recovery request notification to be executed before entering the manual driving section, using the learning data (correspondence data of the recovery delay time and the recovery ratio) according to the driver situation and the requested recovery ratio (RRR) for the road section scheduled to travel, and executes the notification processing at the determined notification timing.

Note that details of the processing in step S106 will be further described with reference to the flowchart in FIG. 21 below.

(Step S107)

Step S107 is processing of determining completion of RRR attached LDM use processing. When completion of the RRR attached LDM use processing is determined, the processing is terminated, Meanwhile, when incompletion of the RRR attached LDM use processing is determined, the processing returns to step S103 and processing in S103 and the subsequent steps is repeatedly executed.

[9. Sequence of Manual Driving Recovery Notification Processing Using Requested Recovery Ratio (RRR)]

Next, a sequence of manual driving recovery notification processing using the requested recovery ratio (RRR) executed by the mobile device and the information processing device of the present disclosure will be described.

The flowchart illustrated in FIG. 21 is a flowchart for describing an example of a sequence of processing executed when an automobile as the mobile device of the present disclosure switches the automatic driving mode to the manual driving mode.

Processing of steps will be sequentially described.

(Step S201)

First, in step S201, the data processing unit of the mobile device or the data processing unit of the information processing device attached to the mobile device observes an occurrence event of a request for switching the automatic driving mode to the manual driving mode. Note that, hereinafter, the data processing unit of the mobile device or the data processing unit of the information processing device attached to the mobile device will be simply described as data processing unit.

In step S201, the data processing unit observes the occurrence event of the request for switching the automatic driving mode to the manual driving mode. This observation information is based on the local dynamic map (LDM) information.

(Step S202)

Next, in step S202, the observation value is acquired. The observation value acquisition processing is performed in the driver information acquisition unit 201, the environment information acquisition unit 202, and the driver personal identification information acquisition unit 203 illustrated in FIG. 11, for example. Note that these configurations correspond to the configurations of the data acquisition unit 102 and the detection unit 131 illustrated in FIG. 5.

As described above, the driver information acquisition unit 201 includes a camera and various sensors, and acquires the driver information, such as information for determining the arousal level of the driver, for example. The information is, for example, a line-of-sight direction, an eyeball behavior, and a pupil diameter acquired from an image including an eyeball area, and a facial expression acquired from an image including a face area. The driver information acquisition unit 201 further acquires the operation information of the operation units (steering wheel, accelerator, brake, and the like) of the driver.

In the observation value acquisition processing, the driver information indicating the driver's state, for example, whether or not the driver is taking a nap, whether or not the driver is looking ahead, or whether or not the driver is operating a tablet terminal, is acquired.

Furthermore, the environment information acquisition unit 202 acquires, for example, an image by an imaging unit installed in the mobile device 200, depth information, three-dimensional structure information, topographical information by sensors such as an LiDAR installed on a moving body, position information by a GPS, traffic light conditions, sign information, information from a communication device installed on an infrastructure such as a road, and the like.

(Step S203)

Next, in step S203, the requested recovery ratio (RRR) of a manual driving recovery request section is acquired. The requested recovery ratio (RRR) is acquired from the requested recovery ratio (RRR)-attached local dynamic map (LDM) provided by the LDM information provision server.

(step S204)

Next, in step S204, the manual driving recoverable time (=recovery delay time) for implementing the requested recovery ratio (RRR) is calculated using the observation value acquired in step S202, specifically, the driver information indicating the driver state, and the requested recovery ratio (RRR) of the manual driving recovery request section acquired in step S203.

This processing corresponds to the processing described above with reference to FIGS. 17A, 17B, 18A, 18B, 19A, and 19B.

The processing in step S204 is the processing executed by the safety determination processing execution unit (manual driving recoverable time estimation unit) 212 of the safety determination unit 210 illustrated in FIG. 11.

The safety determination processing execution unit (manual driving recoverable time estimation unit) 212 receives the driver information acquired by the driver information acquisition unit 201 and the environment information and the like acquired by the environment information acquisition unit 202 as inputs. Moreover, the safety determination processing execution unit (manual driving recoverable time estimation unit) 212 estimates the manual driving recoverable time (=recovery delay time) required by safe manual driving recovery on the basis of the current driver information and the requested recovery ratio (RRR) of the manual driving recovery request section, using the learning device as a learning result in the learning processing unit 211 or the learning device acquired from the learning server 300.

Here, the learning data to be used is data according to the driver information corresponding to the driver and indicating the driver state. Specifically, the learning data is the correspondence data of the recovery delay time and the recovery ratio according to the driver information corresponding to the driver and indicating the driver state, described with reference to FIGS. 17A, 17B, 18A, 18B, 19A, and 19B.

In the processing of estimating the manual driving recoverable time (=recovery delay time) required by safe manual driving recovery, the processing (manual driving recoverable time estimation processing) using the personal identification information of the driver who is currently driving and the information of the type of the secondary task being currently executed as the observation information is performed. Note that, in the case where the driver history before getting in the vehicle is available, log information of the driver history or the like is not excluded from comprehensive evaluation determination because, for example, rest time, bedtime, sleep time, activities such as sports, which are life information before driving, cause residual accumulated fatigue and greatly affect the driver's recovery characteristics.

(Step S205)

In step S205, a notification for prompting the driver to recover to driving is executed at the notification timing determined according to the recovery delay time calculated in step S204, that is, timing when an event to be taken over (the takeover section from the automatic driving to the manual driving or the cautioned traveling section from the automatic driving) approaches the recovery delay time. This notification is executed as, for example, the display processing described above with reference to FIG. 3. Alternatively, the notification may be executed as an alarm output or vibration of the steering wheel or the seat. For example, in the case where the driver is taking a nap, a notification method for waking the driver from the sleeping state is selected.

(Steps S206 to S209)

Next, in step S206, the recovery transition of the driver is monitored. Then, in step S207, whether or not the driver can recover to driving within the recovery delay time on the basis of a monitoring result in step S206. In the case where it is determined that the driver can recover to driving, the driver recovers to driving in step S208. Then, in step S209, the learning data is updated. That is, one sample value of the relationship information (observation plot) between the observable evaluation value and the actual recovery delay time regarding the initial type of the secondary task of the driver when the above-described recovery to driving is performed is added. After that, the processing is terminated. Note that, in the present embodiment, the learning is limited to the plot data generated at each event. However, in reality, the learning largely depends on the previous state (history) until the event occurs. Therefore, the estimation accuracy of the recovery delay required time from the observation value of the driver state may be further improved by performing multidimensional learning.

(Steps S211 and S212)

Furthermore, when it is determined that recovery to driving is not possible in step S207, a deceleration slowdown evacuation sequence is executed from the start to stop in step S211. Next, in step S212, a record of penalty of a takeover defect event is issued, and the processing is terminated. Note that the record of the penalty is stored in the storage unit.

Note that this penalty has an effect of prompting accurate and desirable early recovery of the driver in response to the notification. For use in individual events, for example, operation settings are performed such that when the start of takeover is delayed depending on the automatic driving of the system, the vehicle is decelerated and slowdown, and an upper traveling speed in a certain travel period is decreased and suppressed more than an upper speed desired by the driver, the vehicle is stopped in a service area or the like in the middle of itinerary for a certain time, or reuse in the automatic driving mode after once shifting to the manual driving is limited for a certain period or number of times. As a result of the delays for the notification or warning used in the system impedes the comfortability desired by the user. There is a large secondary effect that has a psychological effect on the user's habitual behavioral reflex, coupled with the learning effect of individual driver recovery characteristics, leading to unconscious generation of notification at timing suitable for the driver and an unconscious recovery procedure with a small delay suitable for the notification. That is, the driver's recovery optimization will gradually become habitual according to the use according to the driver's ability to early recover according to the road conditions at a requested recovery ratio set as RRR according to the traveling environment, many road users will likewise be able to optimize notifications and accordingly reduce take-over failures with a certain low ratio, whereby as a road infrastructure, negative social impact can be suppressed. Furthermore, from the user's point of view, for example, the convenience of automatic driving can be maximized depending on the situation (by not requiring unnecessary early recovery), and virtuous cycle effect is expected. That is, there is no function for the purpose of punitive use of the penalty itself, and the primary purpose is to guide users to optimize their behavioral characteristics, and the penalty imposed on each use of the individual event is secondary.

[10. Configuration Example of Information Processing Device]

The above-processing can be executed by applying the configuration of the mobile device described with reference to FIG. 5. However, part of the processing can be executed by an information processing device attachable to and detachable from the mobile device or a server, for example.

Next, a hardware configuration example of the information processing device or the server will be described with reference to FIG. 22.

FIG. 22 is a diagram illustrating a hardware configuration example of the information processing device or the server.

A central processing unit (CPU) 501 functions as a data processing unit that execute various types of processing according to a program stored in a read only memory (ROM) 502 or a storage unit 508. For example, the CPU 501 executes processing according to the sequence described in the above embodiment.

A random access memory (RAM) 503 stores the program executed by the CPU 501, data, and the like. These CPU 501, ROM 502, and RAM 503 are mutually connected by a bus 504.

The CPU 501 is connected to an input/output interface 505 via the bus 504. An input unit 506 including various switches, a keyboard, a touch panel, a mouse, a microphone, and a state data acquisition unit such as a sensor, a camera, and GPS, and an output unit 507 including a display, a speaker, and the like are connected to the input/output interface 505.

Note that input information from a sensor 521 is also input to the input unit 506.

Furthermore, the output unit 507 also outputs drive information for a drive unit 522 of the mobile device.

The CPU 501 receives commands, state data, and the like input from the input unit 506, executes various types of information, and outputs processing results to the output unit 507, for example.

The storage unit 508 connected to the input/output interface 505 includes, for example, a hard disk and the like, and stores the program executed by the CPU 501 and various data. A communication unit 509 functions as a transmission/reception unit for data communication via a network such as the Internet or a local area network, and communicates with an external device.

A drive 510 connected to the input/output interface 505 drives a removable medium 511 such as a magnetic disk, an optical disk, a magneto-optical disk, or a semiconductor memory such as a memory card, and executes data recording or reading.

[11. Conclusion of Configurations of Present Disclosure]

The examples of the present disclosure have been described in detail with reference to the specific examples. However, it is obvious that those skilled in the art can make modifications and substitutions of the examples without departing from the gist of the present disclosure. That is, the present invention has been disclosed in the form of exemplification, and should not be restrictively interpreted. To judge the gist of the present disclosure, the scope of claims should be taken into consideration.

Note that the technology disclosed in the present specification can have the following configurations.

(1) An information processing device including:

a data processing unit configured to calculate a manual driving recoverable time required for a driver who is executing automatic driving in order to achieve a predefined requested recovery ratio (RRR) from automatic driving to manual driving and determine notification timing of manual driving recovery request notification on the basis of the calculated time.

(2) The information processing device according to (1), in which the data processing unit acquires the requested recovery ratio (RRR) for each road section set as ancillary information of a local dynamic map (LDM), and calculates the manual driving recoverable time for each road section scheduled to travel.

(3) The information processing device according to (1) or (2), in which the data processing unit determines timing when a time to enter a road section requiring the manual driving is equal to or larger than the manual driving recoverable time as the manual driving recovery request notification timing.

(4) The information processing device according to any one of (1) to (3), in which the data processing unit calculates the manual driving recoverable time, using learning data for each driver.

(5) The information processing device according to any one of (1) to (4), in which the data processing unit calculates the manual driving recoverable time, using learning data for each driver and for each driver information indicating a driver state.

(6) The information processing device according to any one of (1) to (5), in which the data processing unit calculates the manual driving recoverable time, using correspondence data between a recovery delay time from the automatic driving to the manual driving, the recovery delay time being learning data for each driver and for each driver state, and a recovery ratio.

(7) The information processing device according to (6), in which the driver state is a driver state analyzed on the basis of acquired information by a sensor.

(8) The information processing device according to (6) or (7), in which the driver state is driver information reflecting an arousal level of the driver.

(9) The information processing device according to any one of (1) to (8), in which the data processing unit acquires operation information of the driver after switching from the automatic driving to the manual driving and executes learning data update processing.

(10) The information processing device according to any one of (1) to (9), further including:

a notification control unit configured to execute notification processing of manual driving recovery request notification for the driver via a notification unit at timing determined on the basis of the manual driving recoverable time calculated by the data processing unit.

(11) The information processing device according to (10), in which
the notification unit is configured by at least one of a display unit, a sound output unit, or a vibrator.

(12) An information processing device as a server that provides a local dynamic map (LDM) to a mobile device, the information processing device including:
an RRR information attached LDM generation and update unit configured to generate and update a requested recovery ratio (RRR) attached local dynamic map (LDM) in which a requested recovery ratio (RRR) from automatic driving to manual driving is set for each road section.

(13) The information processing device according to (12), in which
the RRR information attached LDM generation and update unit performs processing of updating the requested recovery ratio (RRR) according to a traffic state of each road section.

(14) A mobile device including:
a driver information acquisition unit configured to acquire driver information of the mobile device;
an environment information acquisition unit configured to acquire requested recovery ratio (RRR) attached local dynamic map (LDM) in which a requested recovery ratio (RRR) from automatic driving to manual driving is set for each road section; and
a data processing unit configured to calculate a manual driving recoverable time required by a driver who is executing automatic driving in order to achieve the requested recovery ratio (RRR) and determine notification timing of manual driving recovery request notification on the basis of the calculated time.

(15) The mobile device according to (14), in which
the data processing unit determines timing when a time to enter a road section requiring the manual driving is equal to or larger than the manual driving recoverable time as the manual driving recovery request notification timing.

(16) The mobile device according to (14) or (15), in which
the data processing unit calculates the manual driving recoverable time, using correspondence data between a recovery delay time from the automatic driving to the manual driving, the recovery delay time being learning data for each driver and for each driver information indicating a driver state, and a recovery ratio.

(17) The mobile device according to any one of (14) to (16), further including:
a notification control unit configured to execute notification processing of manual driving recovery request notification for the driver via a notification unit at timing determined on the basis of the manual driving recoverable time calculated by the data processing unit.

(18) An information processing system including a server and a mobile device, in which
the server is a server that provides a local dynamic map (LDM) to the mobile device, and
generates and updates a requested recovery ratio (RRR) attached local dynamic map (LDM) in which a requested recovery ratio (RRR) from automatic driving to manual driving is set for each road section, and transmits the requested recovery ratio (RRR) attached local dynamic map (LDM) to the mobile device, and
the mobile device
calculates a manual driving recoverable time required for a driver who is executing the automatic driving in order to achieve the requested recovery ratio (RRR) recorded in the requested recovery ratio (RRR) attached local dynamic map (LDM) received from the server, and determines notification timing of a manual driving recovery request notification on the basis of the calculated time.

(19) An information processing method executed in an information processing device, the information processing method including
by a data processing unit,
calculating a manual driving recoverable time required for a driver who is executing automatic driving in order to achieve a predefined requested recovery ratio (RRR) from automatic driving to manual driving and determining notification timing of manual driving recovery request notification on the basis of the calculated time.

(20) A program for causing an information processing device to execute information processing including
causing a data processing unit to calculate a manual driving recoverable time required for a driver who is executing automatic driving in order to achieve a predefined requested recovery ratio (RRR) from automatic driving to manual driving and determine notification timing of manual driving recovery request notification on the basis of the calculated time.

Furthermore, the series of processing described in the description can be executed by hardware, software, or a combined configuration of the hardware and software. In the case of executing the processing by software, a program, in which the processing sequence is recorded, can be installed in a memory of a computer incorporated in dedicated hardware and executed by the computer, or the program can be installed in and executed by a general-purpose computer capable of executing various types of processing. For example, the program can be recorded in the recording medium in advance. Other than the installation from the recording medium to the computer, the program can be received via a network such as a local area network (LAN) or the Internet and installed in a recording medium such as a built-in hard disk.

Note that the various types of processing described in the description may be executed not only in chronological order as described but also in parallel or individually depending on the processing capability of the device that executes the process or as required. Furthermore, the system in the present description is a logical aggregate configuration of a plurality of devices, and is not limited to devices having respective configurations within the same housing.

INDUSTRIAL APPLICABILITY

As described above, according to the configuration of an embodiment, the configuration to calculate a manual driving recoverable time required for a driver who is executing automatic driving in order to achieve a requested recovery ratio (RRR) for each road section, and issue a manual driving recovery request notification on the basis of the calculated time is implemented.

Specifically, for example, included is a data processing unit configured to calculate a manual driving recoverable time required for a driver who is executing automatic driving in order to achieve a predefined requested recovery ratio (RRR) from automatic driving to manual driving and determine notification timing of a manual driving recovery request notification on the basis of the calculated time. The data processing unit acquires the requested recovery ratio (RRR) for each road section set as ancillary information of a local dynamic map (LDM), and calculates the manual driving recoverable time for each road section scheduled to travel, using learning data for each driver.

When a delay occurs in the driving action recovered on the basis of the requested recovery ratio and the effective transition that occurs in the process, the driver naturally learns early treatment by repeatedly using the system, coupled with the mechanism that directly penalizes the driver. Therefore, the effect of implementation is not limited to the simple suppression of occurrence of takeover failure for each infrastructure. When the driver uses the automatic drive system, it largely affects improvement of responsiveness to system requests, and maintenance of attention sensitivity to the system request (or natural development of sense for the need for early response) during the execution of the secondary task.

With the present configuration, the configuration to calculate a manual driving recoverable time required for a driver who is executing automatic driving in order to achieve a requested recovery ratio (RRR) for each road section, and issue a manual driving recovery request notification on the basis of the calculated time is implemented.

REFERENCE SIGNS LIST

10 Automobile
11 Data processing unit
12 Driver information acquisition unit
13 Environment information acquisition unit
14 Communication unit
15 Notification unit
20 Driver
30 Server
100 Mobile device
101 Input unit
102 Data acquisition unit
103 Communication unit
104 In-vehicle device
105 Output control unit
106 Output unit
107 Drive system control unit
108 Drive system
109 Body system control unit
110 Body system
111 Storage unit
112 Automatic driving control unit
121 Communication network
131 Detection unit
132 Self-position estimation unit
133 State analysis unit
134 Planning unit
135 Motion control unit
141 Vehicle exterior information detection unit
142 Vehicle interior information detection unit
143 Vehicle state detection unit
151 Map analysis unit
152 Traffic rule recognition unit
153 State recognition unit
154 State prediction unit
155 Safety determination unit (learning processing unit)
161 Route planning unit
162 Action planning unit
163 Motion planning unit
171 Emergency avoidance unit
172 Acceleration and deceleration control unit
173 Direction control unit
200 Mobile device
201 Driver information acquisition unit
202 Environment information acquisition unit
203 Driver personal identification information acquisition unit
210 Safety determination unit
211 Learning processing unit
212 Safety determination processing execution unit (manual driving recoverable time estimation unit)
213 Personal authentication processing unit
221 Notification control unit
222 Notification unit
230 Communication unit
240 Storage unit
300 Learning server
301 Learning data acquisition and generation unit
302 Learning processing unit
303 Communication unit
304 Storage unit
310 LDM information provision server
311 RRR information attached LDM generation and update unit
312 Communication unit
320 Information collection and storage unit
330 Existing LDM information generation and update unit
340 RRR information generation and update unit
350 RRR information insertion unit
501 CPU
502 ROM
503 RAM
504 Bus
505 Input/output interface
506 Input unit
507 Output unit
508 Storage unit
509 Communication unit
510 Drive
511 Removable medium
521 Sensor
522 Drive unit

The invention claimed is:

1. An information processing device, comprising:
a central processing unit (CPU) configured to:
calculate a manual driving recoverable time required for a driver who executes automatic driving to achieve a specific requested recovery ratio (RRR) from the automatic driving to manual driving; and
determine notification timing of manual driving recovery request notification based on the calculated manual driving recoverable time.

2. The information processing device according to claim 1, wherein
the CPU is further configured to:
acquire the specific requested recovery ratio (RRR) for each road section set as ancillary information of a local dynamic map (LDM); and
calculate the manual driving recoverable time for the each road section scheduled to travel.

3. The information processing device according to claim 1, wherein the CPU is further configured to determine, as the manual driving recovery request notification timing, timing based on a time to enter a road section that requires the manual driving is equal to or larger than the manual driving recoverable time.

4. The information processing device according to claim 1, wherein the CPU is further configured to calculate the manual driving recoverable time based on learning data for each driver.

5. The information processing device according to claim 1, wherein the CPU is further configured to calculate the manual driving recoverable time based on learning data for each driver and a driver state of the each driver.

6. The information processing device according to claim 1, wherein
the CPU is further configured to calculate the manual driving recoverable time based on correspondence data between a recovery delay time from the automatic driving to the manual driving, and
the recovery delay time includes a recovery ratio and learning data for each driver and for each driver state.

7. The information processing device according to claim 6, wherein the driver state is a driver state analyzed based on acquired information by a sensor.

8. The information processing device according to claim 6, wherein the driver state is driver information that reflects an arousal level of the driver.

9. The information processing device according to claim 1, wherein the CPU is further configured to:
acquire operation information of the driver after switching from the automatic driving to the manual driving; and
execute learning data update processing.

10. The information processing device according to claim 1, further comprising:
a notification control unit configured to execute notification processing of the manual driving recovery request notification for the driver via a notification unit at a specific timing, wherein the specific timing is based on the manual driving recoverable time.

11. The information processing device according to claim 10, wherein the notification unit comprises at least one of a display unit, a sound output unit, or a vibrator.

12. An information processing device that provides a local dynamic map (LDM) to a mobile device, the information processing device comprising:
a server configured to generate and update a requested recovery ratio (RRR) attached local dynamic map (LDM) in which the requested recovery ratio (RRR) from automatic driving to manual driving is set for each road section.

13. The information processing device according to claim 12, wherein the server is further configured to perform, based on a traffic state of the each road section, processing to update the requested recovery ratio (RRR).

14. A mobile device, comprising:
at least one first sensor configured to acquire driver information of the mobile device;
at least one second sensor configured to acquire requested recovery ratio (RRR) attached local dynamic map (LDM) in which the requested recovery ratio (RRR) from automatic driving to manual driving is set for each road section; and
a central processing unit (CPU) configured to:
calculate a manual driving recoverable time required by a driver who executes the automatic driving to achieve the requested recovery ratio (RRR); and
determine notification timing of manual driving recovery request notification based on the calculated manual driving recoverable time.

15. The mobile device according to claim 14, wherein the CPU is further configured to determine, as the manual driving recovery request notification timing, timing based on a time to enter the each road section that requires the manual driving is equal to or larger than the manual driving recoverable time.

16. The mobile device according to claim 14, wherein the CPU is further configured to calculate the manual driving recoverable time based on correspondence data between a recovery delay time from the automatic driving to the manual driving, and
the recovery delay time includes a recovery ratio and learning data for each driver and a driver state of the each driver.

17. The mobile device according to claim 14, further comprising:
a notification control unit configured to execute notification processing of manual driving recovery request notification for the driver via a notification unit at a specific timing, wherein the specific timing is based on the manual driving recoverable time.

18. An information processing system, comprising:
a server configured to:
provide a local dynamic map (LDM) to a mobile device; and
generate and update a requested recovery ratio (RRR) attached local dynamic map (LDM) in which the requested recovery ratio (RRR) from automatic driving to manual driving is set for each road section; and
transmit the requested recovery ratio (RRR) attached local dynamic map (LDM) to the mobile device; and
the mobile device is configured to:
calculate a manual driving recoverable time required for a driver who executes the automatic driving to achieve the requested recovery ratio (RRR) recorded in the requested recovery ratio (RRR) attached local dynamic map (LDM); and
determine notification timing of a manual driving recovery request notification based on the calculated manual driving recoverable time.

19. An information processing method, comprising:
in an information processing device:
calculating a manual driving recoverable time required for a driver who executes automatic driving to achieve a specific requested recovery ratio (RRR) from the automatic driving to manual driving; and
determining notification timing of manual driving recovery request notification based on the calculated manual driving recoverable time.

20. A non-transitory computer-readable medium having stored thereon, computer-executable instructions which, when executed by a computer, cause the computer to execute operations, the operations comprising:
calculating a manual driving recoverable time required for a driver who executes automatic driving to achieve a specific requested recovery ratio (RRR) from the automatic driving to manual driving; and
determining notification timing of manual driving recovery request notification based on the calculated manual driving recoverable time.

* * * * *